US012747630B2

(12) United States Patent
James et al.

(10) Patent No.: US 12,747,630 B2
(45) Date of Patent: Sep. 29, 2026

(54) RETRACTABLE SCREEN SYSTEMS

(71) Applicant: Defender Screens International, LLC, Sarasota, FL (US)

(72) Inventors: Arthur James, Sarasota, FL (US); Ryan Fitzgerald, Richardson, TX (US)

(73) Assignee: Defender Screens International, LLC, Sarasota, FL (US)

(*) Notice: Subject to any disclaimer, the term of this patent is extended or adjusted under 35 U.S.C. 154(b) by 421 days.

(21) Appl. No.: 18/308,779

(22) Filed: Apr. 28, 2023

(65) Prior Publication Data

US 2023/0349231 A1 Nov. 2, 2023

Related U.S. Application Data

(60) Provisional application No. 63/337,363, filed on May 2, 2022.

(51) Int. Cl.
*E06B 9/58* (2006.01)

(52) U.S. Cl.
CPC .................................... *E06B 9/581* (2013.01)

(58) Field of Classification Search
CPC ...... E06B 9/581; E06B 9/58; E06B 2009/587; E06B 2009/588; E06B 9/56
See application file for complete search history.

(56) References Cited

U.S. PATENT DOCUMENTS 3,078,917 A 2/1963 Recchione
3,248,899 A 5/1966 Anderson
4,282,023 A 8/1981 Hammel
4,884,617 A 12/1989 Coenraets
4,934,437 A 6/1990 Kraeutler
(Continued)

FOREIGN PATENT DOCUMENTS

| | | | |
|---|---|---|---|
| CA | 2746178 | | 1/2013 |
| CH | 561389 | A1 | 4/1975 |

(Continued)

OTHER PUBLICATIONS

Machine translation EP2977540 (Year: 2016).*
International Search Report—Retractable Screen Systems—Application No. PCT/US23/20323—Aug. 24, 2023.

*Primary Examiner* — Daniel P Cahn
*Assistant Examiner* — Jeremy C Ramsey
(74) *Attorney, Agent, or Firm* — Christopher A. Proskey; BrownWinick Law Firm

(57) ABSTRACT

In one or more arrangements, a retractable screen system is provided. The system includes a roller tube having an exterior surface. A screen is connected to the roller tube and an upper edge of the screen. The system includes magnetic track assemblies having screen receivers configured to connect with and hold sides of the screen while permitting the screen to be raised and lowered. The magnetic track assemblies include tracks configured to attached to a structure and receive and hold the screen receivers in a channel between first and second side walls of the track. Magnetic attraction between the screen receivers and the tracks pulls screen receivers into the tracks and places tension on the screen. In one or more arrangements, the system includes retainers configured to connect with the first and second side walls of the track and prevent the screen receiver from coming out of the track.

32 Claims, 79 Drawing Sheets

(56) References Cited

U.S. PATENT DOCUMENTS

| | | | |
|---|---|---|---|
| D310,775 | S | 9/1990 | Ruonala |
| 4,993,468 | A | 2/1991 | Hackman |
| 5,351,742 | A | 10/1994 | Lichy |
| 5,479,979 | A | 1/1996 | Hayashiguchi |
| 5,526,865 | A | 6/1996 | Coenraets |
| 5,638,883 | A | 6/1997 | Schulte |
| 5,944,086 | A | 8/1999 | Gruben |
| 5,957,187 | A | 9/1999 | Gruben |
| 6,021,837 | A | 2/2000 | Miller |
| 6,065,525 | A | 5/2000 | Wells |
| 6,112,799 | A | 9/2000 | Mullet |
| 6,230,782 | B1 | 5/2001 | Reichert |
| 6,263,949 | B1 | 7/2001 | Guthrie, Jr. |
| 6,598,648 | B1 | 7/2003 | Schulte |
| 6,873,461 | B1 | 3/2005 | McPherson, Jr. |
| 6,964,289 | B2 | 11/2005 | Schulte |
| 7,028,741 | B2 | 4/2006 | Coenraets |
| 7,034,682 | B2 | 4/2006 | Beggs |
| 7,360,575 | B2 | 4/2008 | Weiss |
| 7,726,377 | B2 | 6/2010 | Okachi |
| 7,793,702 | B2 | 9/2010 | Biewer |
| 8,006,736 | B2 | 8/2011 | Hoffmann |
| 8,006,737 | B2 | 8/2011 | Popa |
| 8,051,993 | B1 | 11/2011 | Tu |
| 8,371,355 | B2 | 2/2013 | Santoro |
| 8,607,841 | B2 | 12/2013 | Hayashiguchi |
| 8,616,261 | B2 | 12/2013 | Miller |
| 9,194,178 | B2 | 11/2015 | Andre de la Porte |
| 9,458,666 | B2 | 10/2016 | Murray |
| 9,689,201 | B2 | 6/2017 | Riemelmoser et al. |
| 9,719,292 | B1 | 8/2017 | James et al. |
| 9,982,483 | B2 | 5/2018 | Nakae |
| 10,036,195 | B2 | 7/2018 | Iglesias Ballester |
| 10,036,198 | B2 | 7/2018 | James et al. |
| 10,260,279 | B2 | 4/2019 | Nakae |
| 10,472,886 | B2 | 11/2019 | Nelson |
| 10,619,376 | B2 | 4/2020 | Hoffmann |
| 10,662,705 | B2 | 5/2020 | Hall |
| 10,927,597 | B2 | 2/2021 | James et al. |
| 11,028,639 | B2 | 6/2021 | Ouyang |
| D936,388 | S | 11/2021 | Schwandt |
| 11,326,395 | B2 | 5/2022 | Heissenberg |
| 11,434,692 | B2 * | 9/2022 | Lombardini .............. E06B 9/38 |
| 11,530,573 | B2 | 12/2022 | James |
| 2002/0066845 | A1 | 6/2002 | Pitlor |
| 2003/0051410 | A1 | 3/2003 | Cloutier |
| 2003/0136527 | A1 | 7/2003 | Weiss |
| 2004/0154753 | A1 | 8/2004 | Tagtow et al. |
| 2006/0137836 | A1 | 6/2006 | Harbison |
| 2006/0256434 | A1 | 11/2006 | Shopp |
| 2008/0066399 | A1 | 3/2008 | Akdag |
| 2008/0141599 | A1 | 6/2008 | Akdag |
| 2008/0179021 | A1 | 7/2008 | Biewer |
| 2009/0078377 | A1 | 3/2009 | Ohara |
| 2012/0012260 | A1 | 1/2012 | Elinson et al. |
| 2012/0325416 | A1 | 12/2012 | Hayashiguchi |
| 2013/0174990 | A1 | 7/2013 | Asbury |
| 2015/0041076 | A1 | 2/2015 | Andre de la Porte |
| 2015/0345215 | A1 | 12/2015 | Roberts |
| 2016/0108666 | A1 | 4/2016 | Lewan |
| 2016/0245005 | A1 | 8/2016 | Tsuchiyama et al. |
| 2016/0369556 | A1 | 12/2016 | Fleishman |
| 2017/0044826 | A1 | 2/2017 | Nakae |
| 2017/0175441 | A1 | 6/2017 | Drifka |
| 2017/0254141 | A1 | 9/2017 | Iglesias Ballester |
| 2018/0187482 | A1 | 7/2018 | Berman |
| 2018/0298687 | A1 * | 10/2018 | Hall ...................... E04B 2/7453 |
| 2019/0187482 | A1 | 6/2019 | Lanman |
| 2020/0386047 | A1 * | 12/2020 | James ..................... E06B 9/581 |
| 2021/0262284 | A1 | 8/2021 | James |
| 2022/0136322 | A1 | 5/2022 | Hebeisen et al. |
| 2022/0349252 | A1 | 11/2022 | James et al. |

FOREIGN PATENT DOCUMENTS

| | | | | |
|---|---|---|---|---|
| CN | 110513029 | A | 11/2019 | |
| CN | 306710548 | | 4/2021 | |
| CN | 307364011 | | 11/2021 | |
| CN | 307424696 | | 12/2021 | |
| DE | 24 21368 | | 11/1975 | |
| DE | 202009014899 | U1 | 3/2010 | |
| DE | 102009004280 | A1 | 7/2010 | |
| DE | 102016120299 | | 4/2018 | |
| DE | 202018003229 | U1 | 7/2018 | |
| DE | 102017121278 | A1 | 3/2019 | |
| EP | 1609646 | A3 | 12/2005 | |
| EP | 1873348 | A2 | 1/2008 | |
| EP | 2628887 | B1 * | 1/2016 | ............... E06B 9/58 |
| EP | 3095950 | | 11/2016 | |
| EP | 3095950 | A1 | 11/2016 | |
| EP | 2977541 | B1 * | 3/2017 | ............... E06B 9/13 |
| FR | 2886332 | | 12/2006 | |
| GB | 2523672 | A | 9/2015 | |
| GR | 20090100073 | | 9/2010 | |
| TW | 455145 | | 9/2001 | |
| WO | 2014/043745 | | 3/2014 | |

* cited by examiner

10

RETRACTABLE SCREEN SYSTEMS

REFERENCE TO RELATED PATENT APPLICATIONS

This application claims priority to U.S. Provisional Patent Application No. 63/337,363, filed May 2, 2022 and titled "RETRACTABLE SCREEN SYSTEMS", which is hereby fully incorporated by reference herein. This application is related to U.S. patent application Ser. No. 17/182,428 published as U.S. Pub. No. 2021/02622884 Aug. 26, 2021 and titled "RETRACTABLE SCREEN SYSTEMS", and U.S. patent application Ser. No. 17/862,861 published as U.S. Pub. No. 2022/0349252 Nov. 3, 2022 and titled "SELF-TENSIONING MAGNETIC TRACKS AND TRACK ASSEMBLIES", each of which is hereby fully incorporated by reference herein.

TECHNICAL FIELD

The disclosed embodiments relate generally to the field of tracks and track assemblies for retractable screens, and more particularly, to adjustable roller tube assemblies, self-tensioning magnetic tracks and track assemblies, and anchor systems for motorized retractable screens.

Overview

Over the past two decades, motorized retractable screens have gained popularity due to their utility and versatility for temporarily enclosing spaces. For example, many restaurants and other businesses having patios/outdoor areas utilize retractable screens to temporarily enclose these areas thereby creating environmentally controlled areas that are shielded from inclement weather conditions (e.g., windy and/or cold weather conditions).

While these retractable screens have great versatility and utility, several problems exist with the currently marketed screens and tracks/track assemblies. For example, the currently marketed tracks and track assemblies are fixed tracks that maintain the screen in a tight, aesthetically pleasing manner once the screen has been deployed. Although these fixed tracks/track assemblies maintain the screen in a tight, aesthetically pleasing manner, these fixed tracks allow for very little play (e.g., expansion and/or contraction) of the screen during, for example, high wind conditions. Consequently, during high wind conditions, these screens may (1) twist, buckle, and/or warp the fixed tracks/track assemblies, (2) damage the screen, or (3) any combination thereof. These problems lead to frequent, costly repairs and/or replacement of the fixed tracks/track assemblies and screens. Another problem with current retractable screen system is that stretching of screen material, wrinkling/creasing of screen material, sagging of a roller tube, uneven weight distribution or tension, and/or, bunching of screen materials on a roller tube may cause undesirable artifacts to become visible in the screen.

SUMMARY

In one or more arrangements, a retractable screen system is provided. The system includes a roller tube having an exterior surface. A screen is connected to the roller tube and an upper edge of the screen. The screen rolls up around the exterior surface of the roller tube when the roller tube is rotated in a first direction, thereby retracting the screen, and unroll the screen from roller tube when the roller tube is rotated the opposite direction, thereby deploying the screen.

In one of more embodiments, the system includes track assemblies configured to operably connect side edges of the screen to a structure. In one or more arrangements, the track assemblies utilize a novel arrangement of magnets in the track assemblies that allow a screen attached thereto to expand while under high wind pressure/conditions. Specifically, in the track and track assemblies, magnets having opposite polarity separate from one another allowing for screen expansion while subjected to high wind pressure. However, after the high wind pressure subsides, the magnetic attraction of the separated magnets pulls the separated magnets into close proximity relative to one another while concurrently tensioning the screen to provide for an aesthetically pleasing, tight screen.

In one or more arrangements, the track assemblies each include a track having a first side wall and a second side wall. In one or more arrangements, the track assemblies each include a screen receiver positioned within the track between the first side wall and the second side wall. The screen receiver is configured to operably connect with and hold the first side edge of the screen while permitting the screen to be raised and lowered. In one or more arrangements, a first retainer is connected to the first side wall of the track and a second retainer connected to the second side wall of the track. The first retainer and the second retainer are configured to prevent the screen receiver from coming out of the track.

Additional features, aspects and advantages provided by some various embodiments are set forth in the detailed description which follows, and in part will be readily apparent to those skilled in the art from the specification, figures and claims described herein.

DETAILED DESCRIPTION

Figure 1:
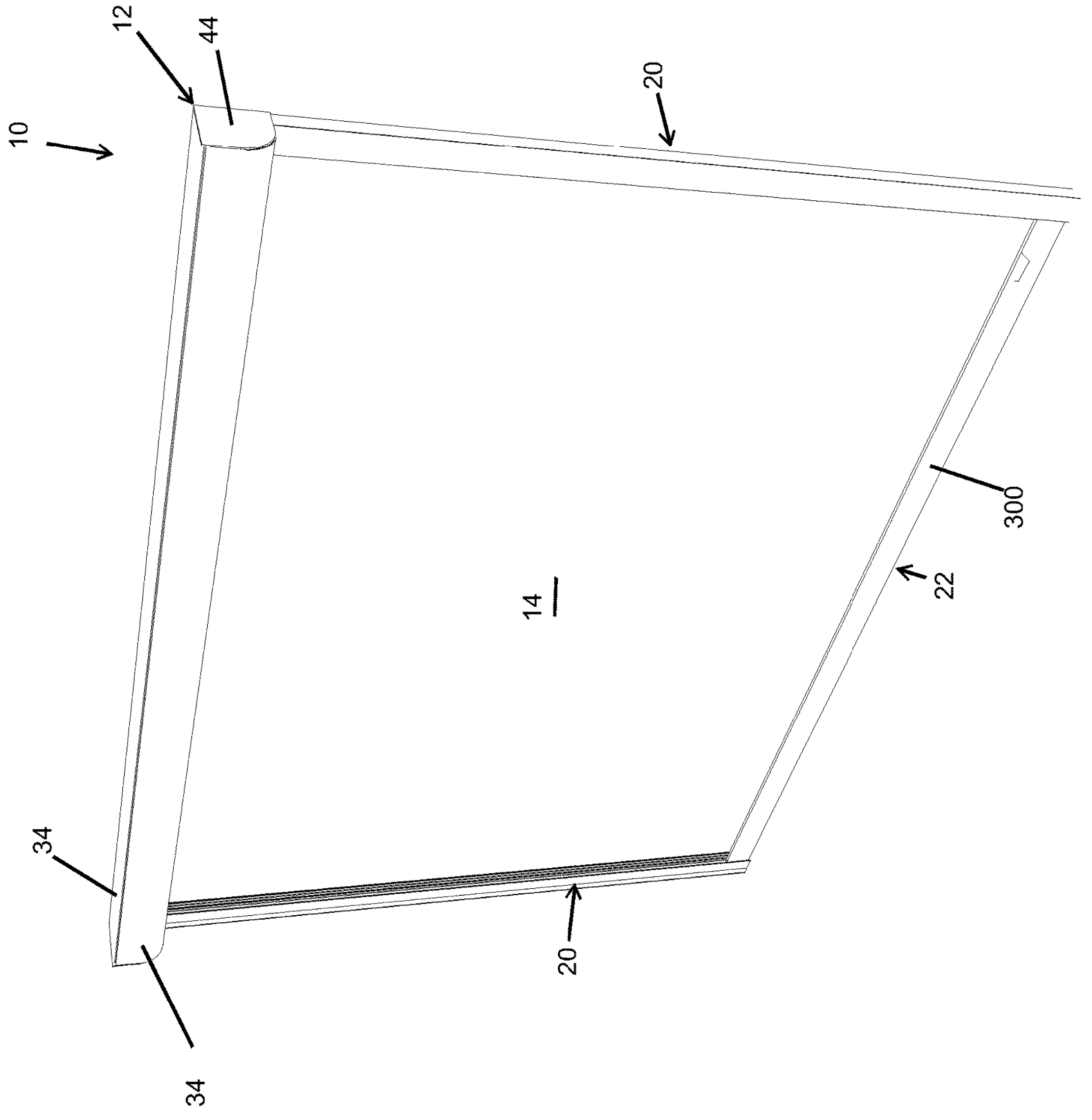
FIG. 1 shows a front perspective view of an assembled motorized screen system having a magnetic track assembly, in accordance with one or more embodiments; the view showing a housing positioned at the upper end of the motorized screen system; the view showing a screen deployed to the fully closed position; the view showing a pair of magnetic track assemblies having elongate channels and screen receivers therein positioned adjacent the outward sides of the screen; the view showing a bottom bar assembly connected to the lower end of the screen.
Figure 2:
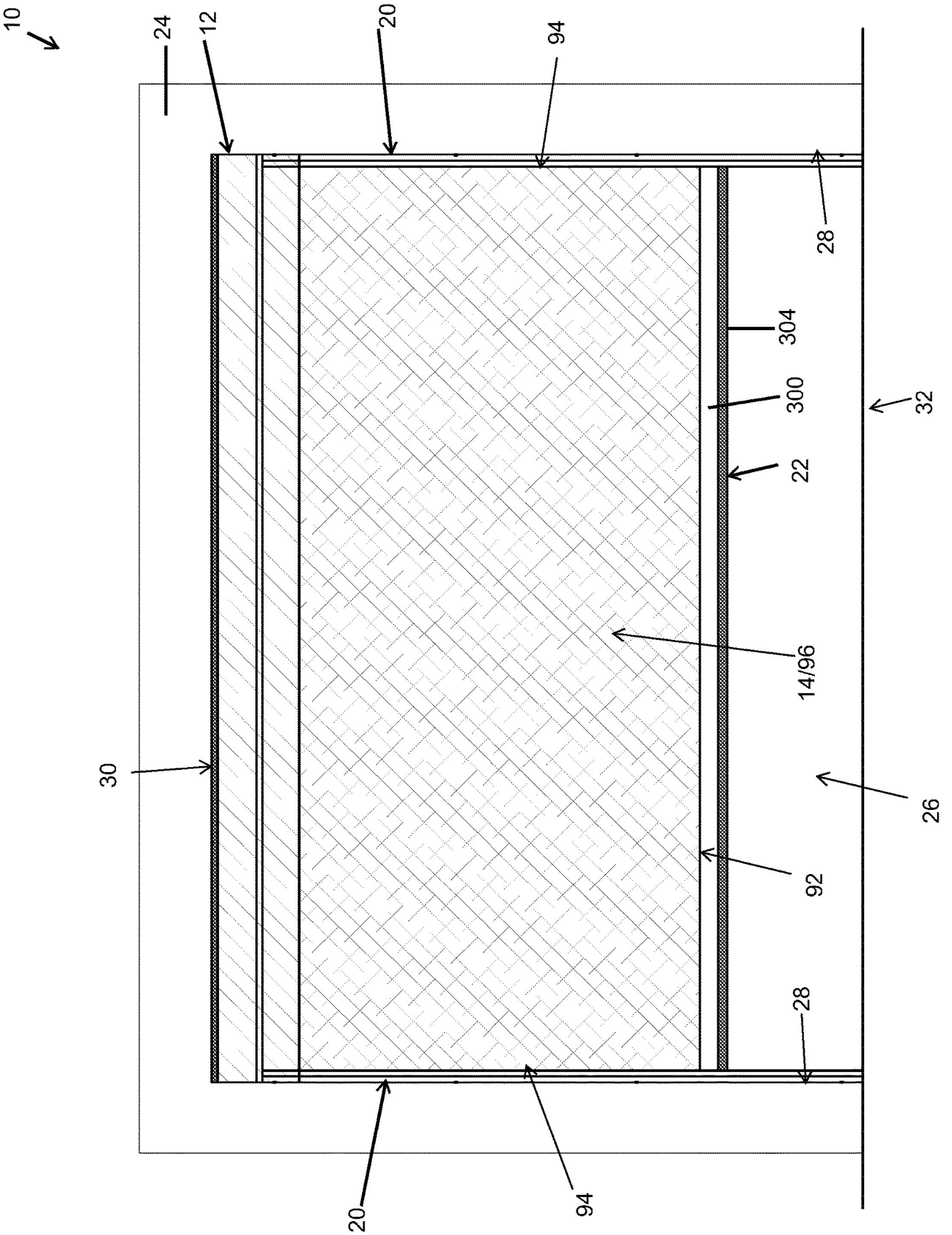
FIG. 2 is a front elevation view of an assembled motorized screen system having a magnetic track assembly, in accordance with one or more embodiments; the view showing a housing positioned at the upper end of the motorized screen system; the view showing a screen deployed approximately three-quarters of the way to the fully closed position; the view showing a pair of magnetic track assemblies having elongate channels and screen receivers therein positioned adjacent the outward sides of the screen; the view showing a bottom bar assembly connected to the lower end of the screen; the view showing the housing and the magnetic track assemblies installed into a frame member positioned around the motorized screen system having a magnetic track assembly.
Figure 3:
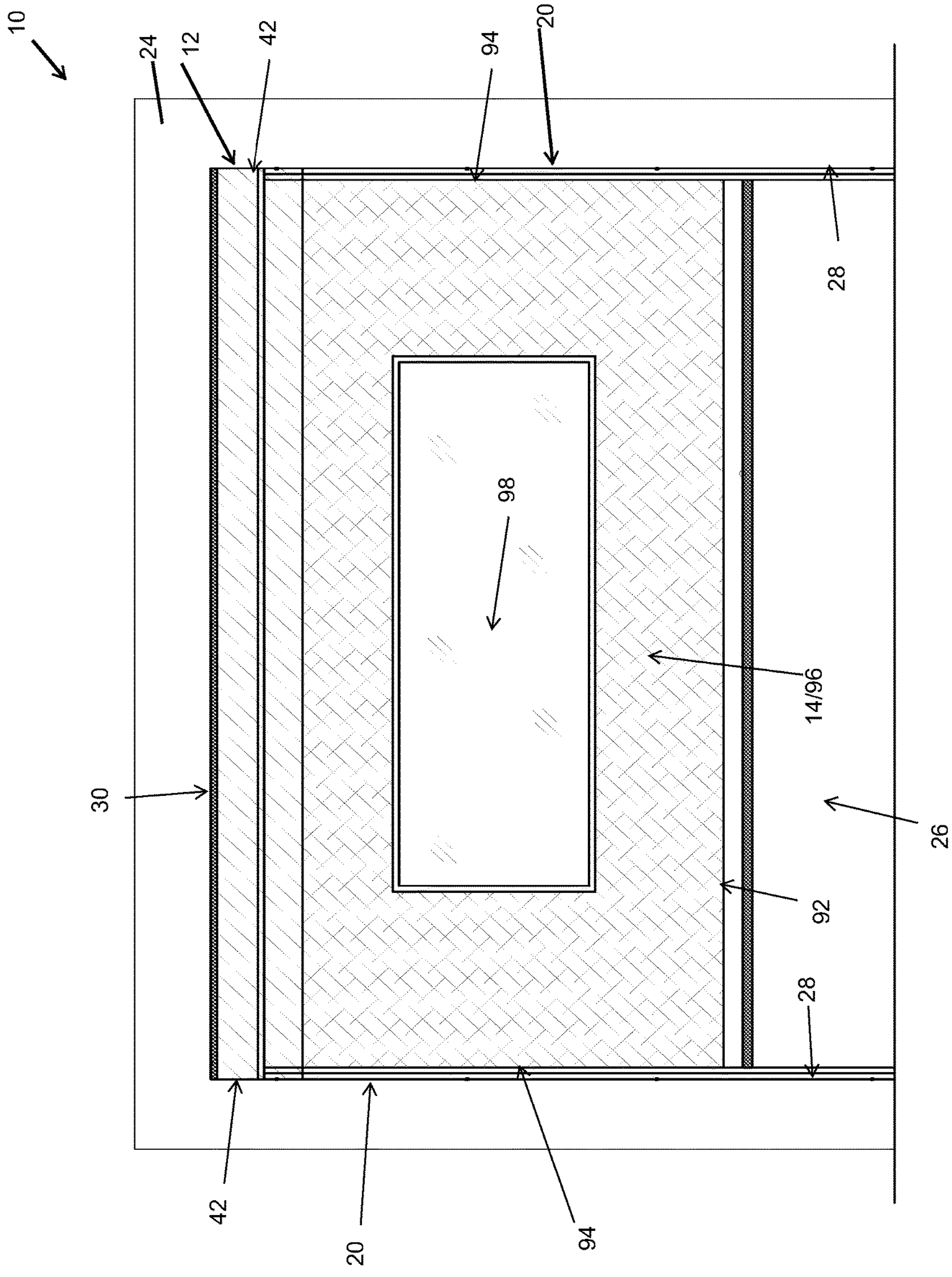
FIG. 3 is a front elevation view of an assembled motorized screen system having a magnetic track assembly, in accordance with one or more embodiments; the view showing a housing positioned at the upper end of the motorized screen system; the view showing a screen deployed approximately three-quarters of the way to the fully closed position; the view showing a pair of magnetic track assemblies having elongate channels and screen receivers therein positioned adjacent the outward sides of the screen; the view showing a bottom bar assembly connected to the lower end of the screen; the view showing the housing and the magnetic track assemblies installed into a frame member positioned around the motorized screen system having a magnetic track assembly; the view showing a window positioned within the screen.
Figure 4:
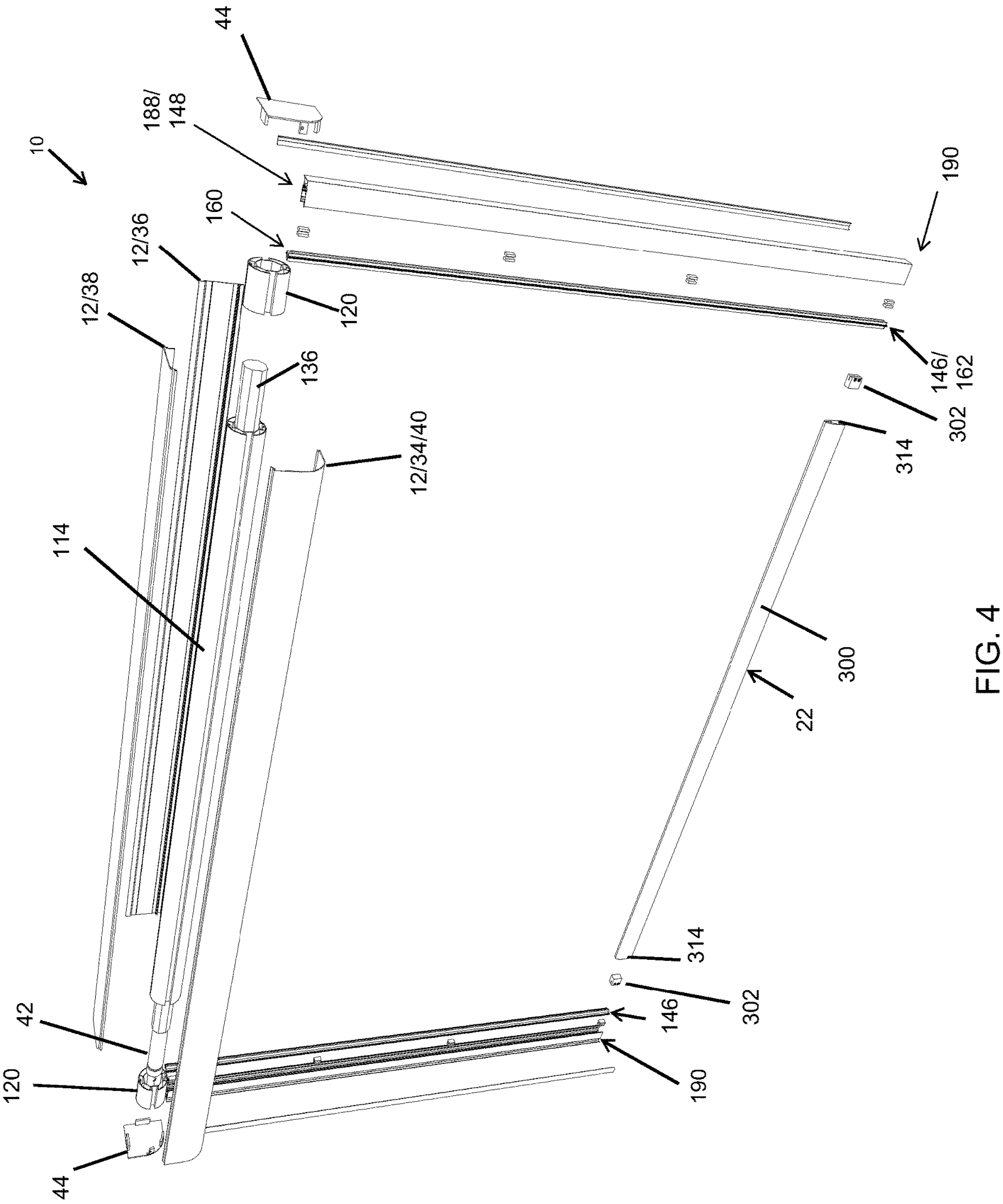
FIG. 4 is front perspective exploded view of a motorized screen system having a magnetic track assembly, in accordance with one or more embodiments; the view showing a housing positioned at the upper end of the motorized screen system; the view showing the housing having a rear member, a top member, a front member and end caps having bracket members; the view showing a pair of magnetic track assemblies having elongate channels and screen receivers positioned adjacent the outward sides of the screen; the view showing a bottom bar assembly configured to connect to the lower end of the screen; the view showing a roller assembly having a roller tube and a motor assembly configured to be positioned within the hollow interior of the housing; the view showing connection members (or axles) extending outward from the ends of the roller tube, these connection members configured to receive collars thereon that allow for adjustment of the overall length of the roller tube to provide adjustment regarding how the screen is to be raised and where the interlock lands relative to the roller tube.
Figure 5:
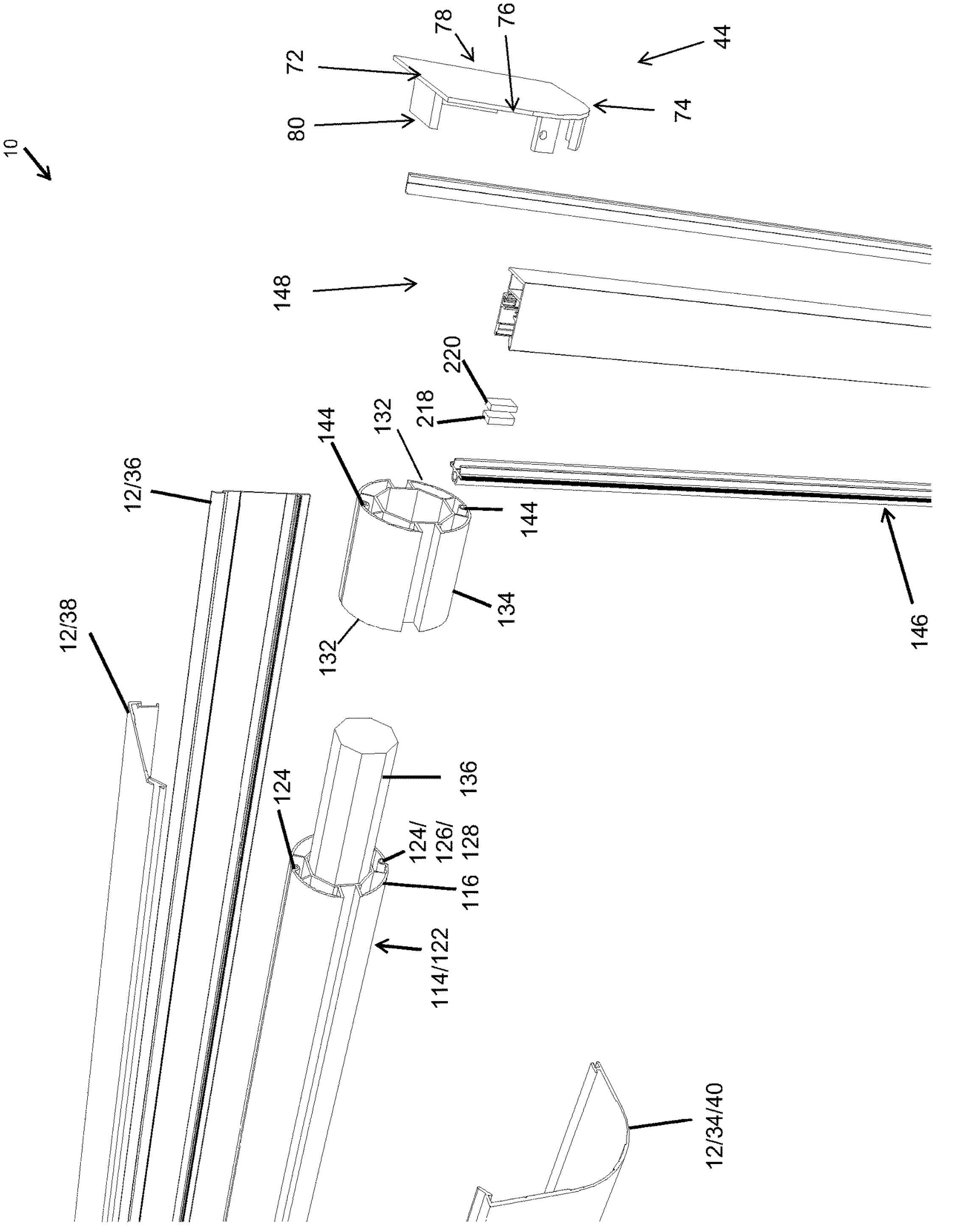
FIG. 5 is a close-up perspective exploded view of a motorized screen system having a magnetic track assembly as is shown in FIG. 4, in accordance with one or more embodiments; the view showing a close-up of the upper right hand corner of the FIG. 4.
Figure 6:
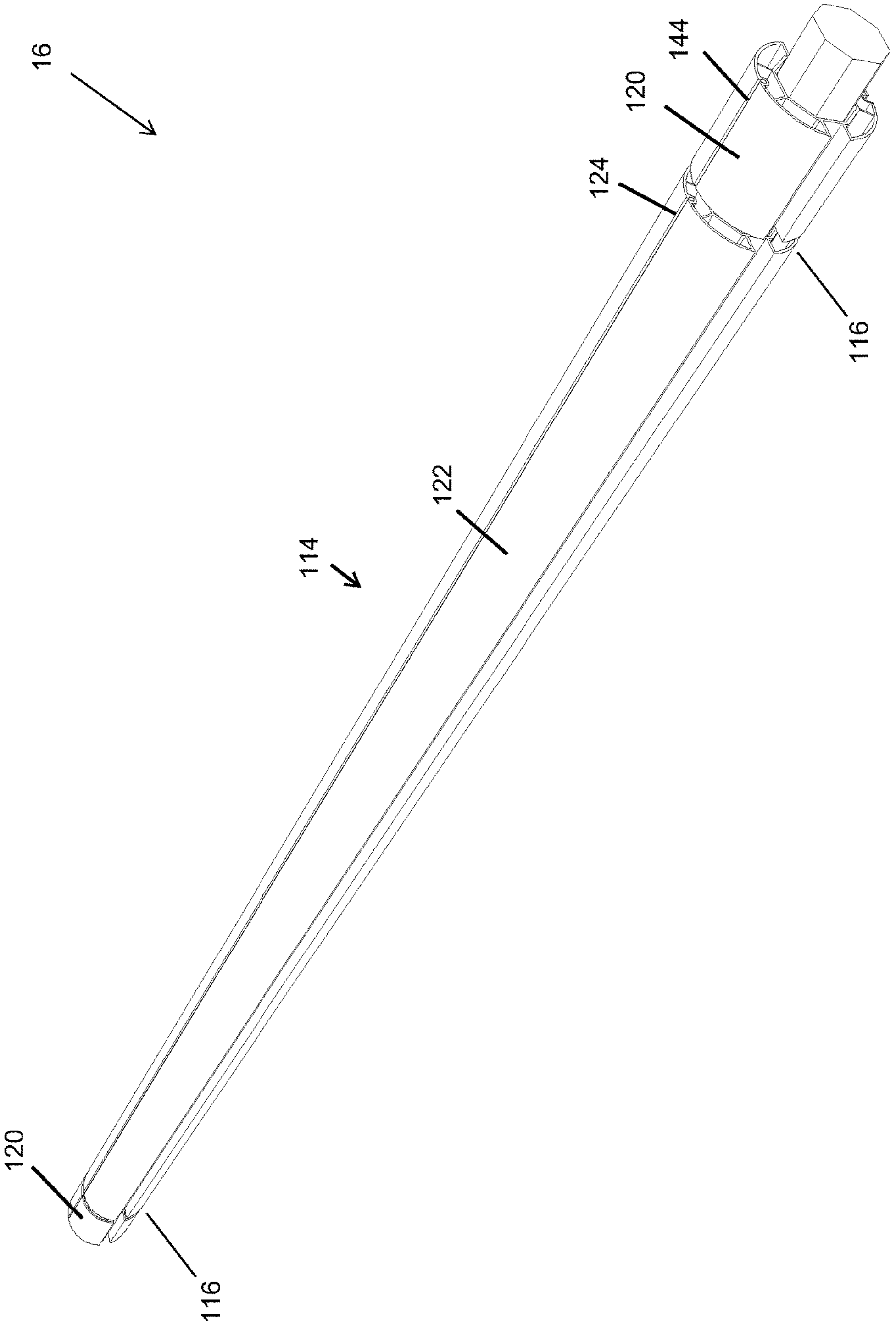
FIG. 6 is a perspective view of the roller tube assembly of a motorized screen system, in accordance with one or more embodiments; the view showing a roller tube assembly for a 5 & ½ inch housing.
Figure 7:
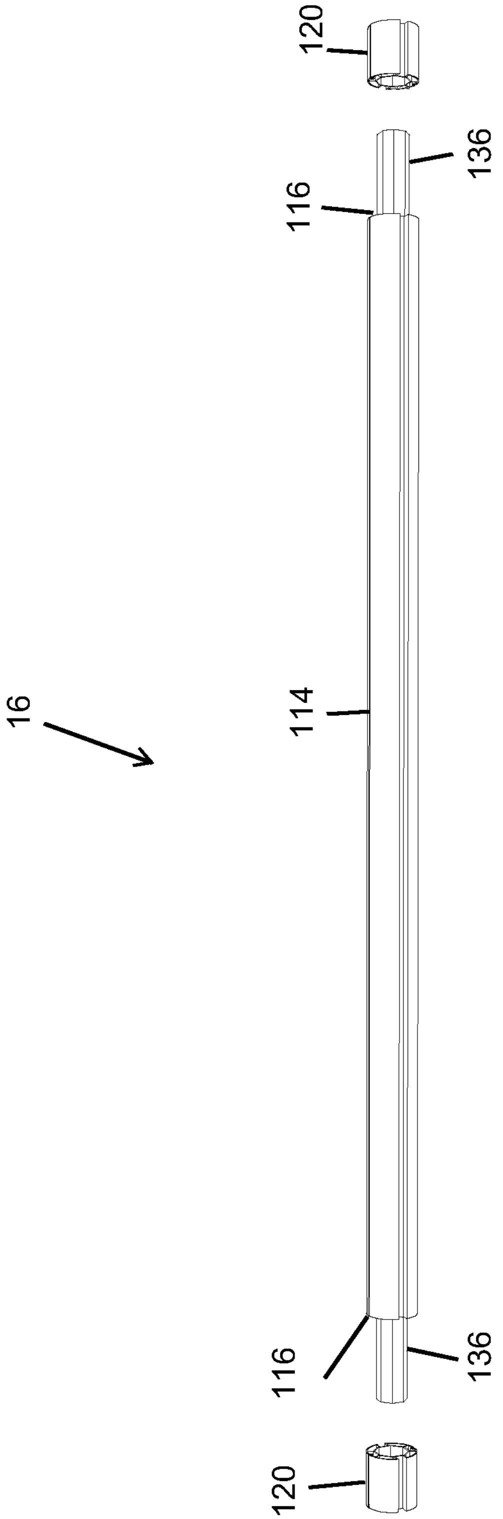
FIG. 7 is a perspective view of the roller tube assembly of a motorized screen system having a magnetic track assembly, in accordance with one or more embodiments; the view showing the collars (also known as doughnuts) exploded from the connection members of the roller tube assembly; the view showing a roller tube assembly for a 5 & ½ inch housing.
Figure 8:
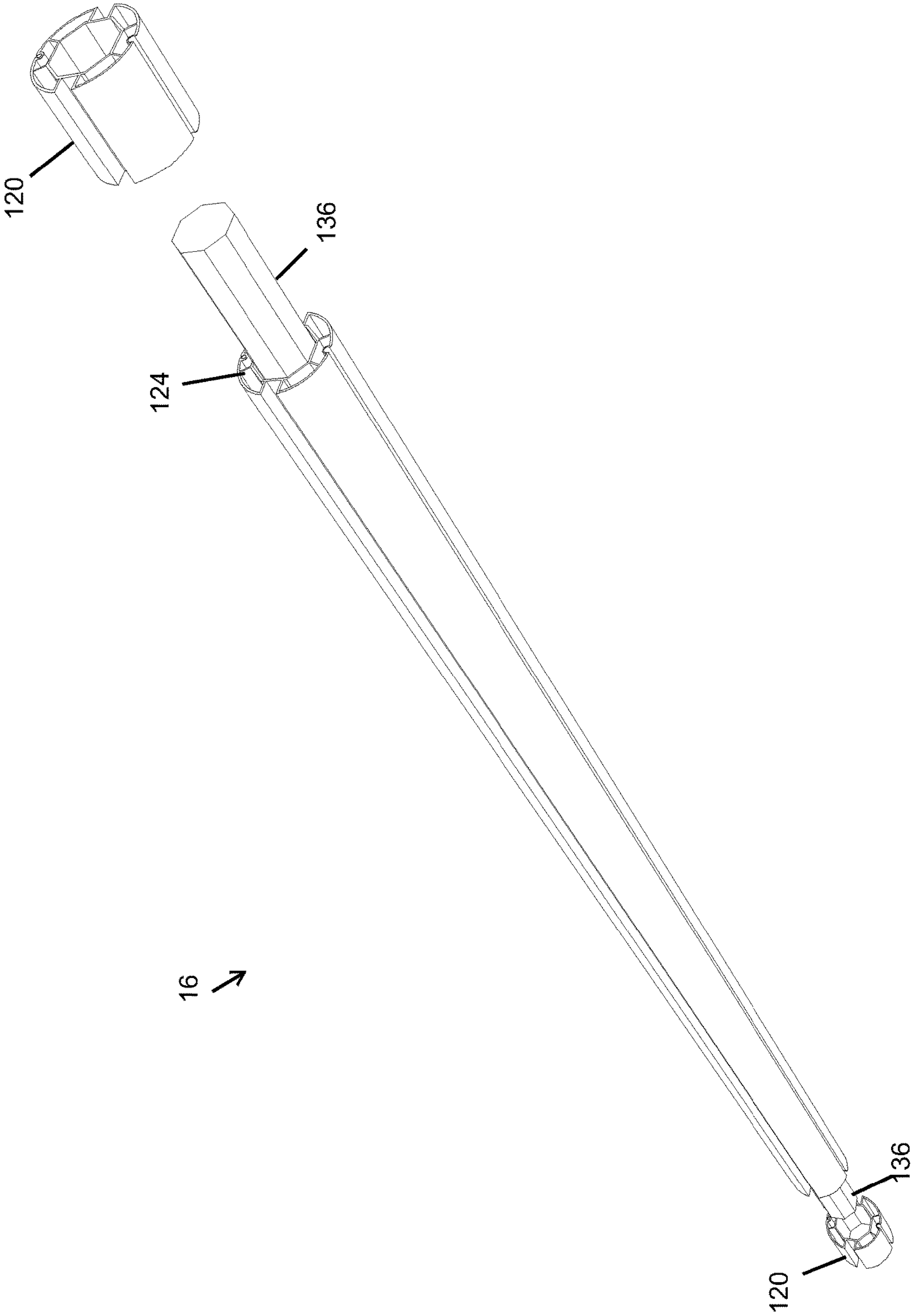
FIG. 8 is another perspective view of the roller tube assembly of a motorized screen system having a magnetic track assembly, in accordance with one or more embodiments; the view showing the collars (also known as doughnuts) exploded from the connection members of the roller tube assembly; the view showing a 5 & ½ inch housing with roller tube.
Figure 9:
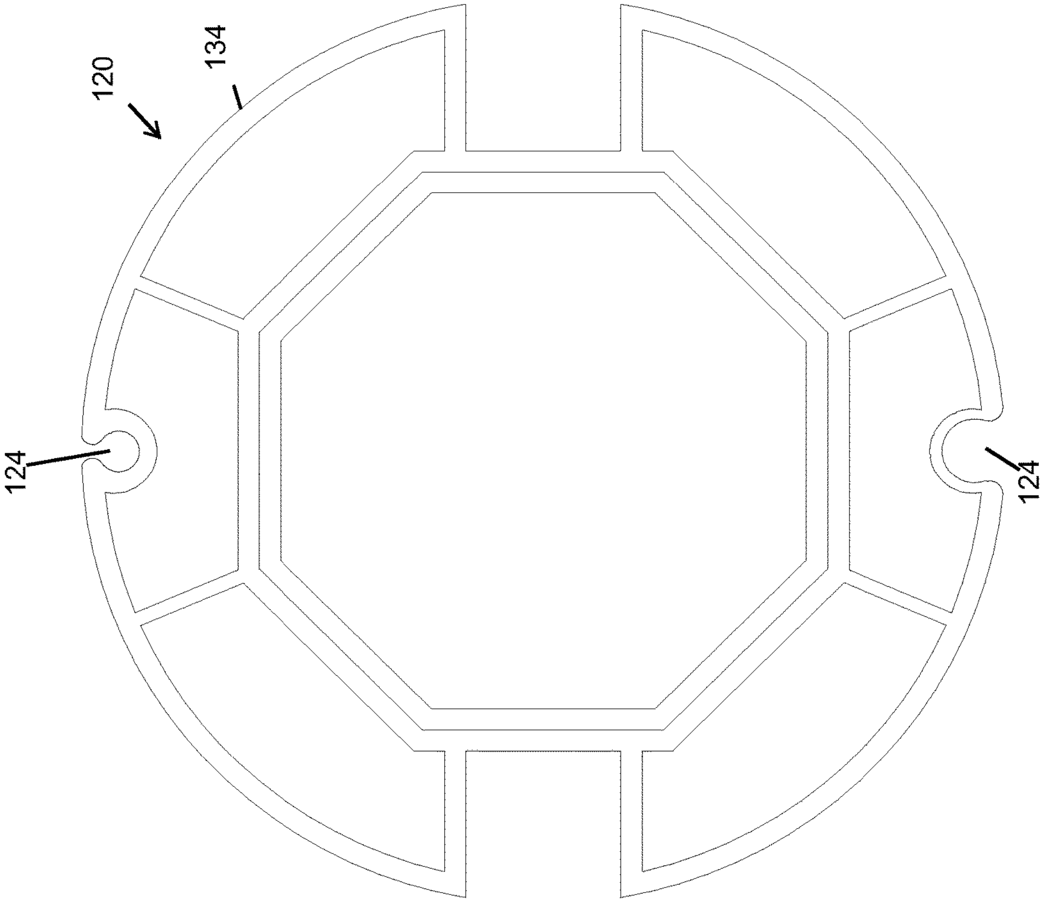
FIG. 9 is a side elevation view of the roller tube assembly of a motorized screen system having a magnetic track assembly, in accordance with one or more embodiments; the view showing a roller tube assembly for a 5 & ½ inch housing.
Figure 10:
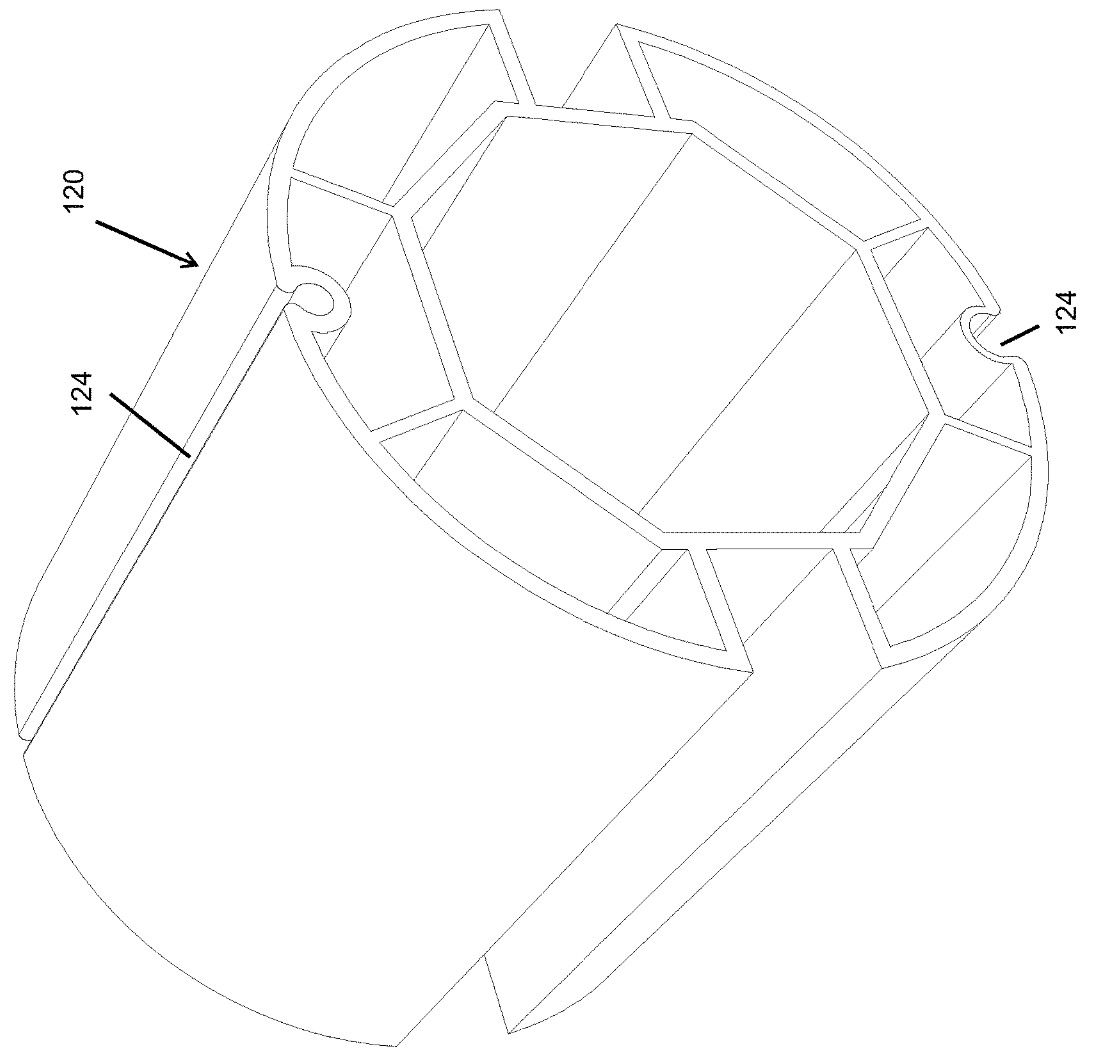
FIG. 10 is a perspective view of the collars (also known as doughnuts) of the roller tube assembly of a motorized screen system having a magnetic track assembly, in accordance with one or more embodiments; the view showing collar for a 5 & ½ inch housing.
Figure 11:
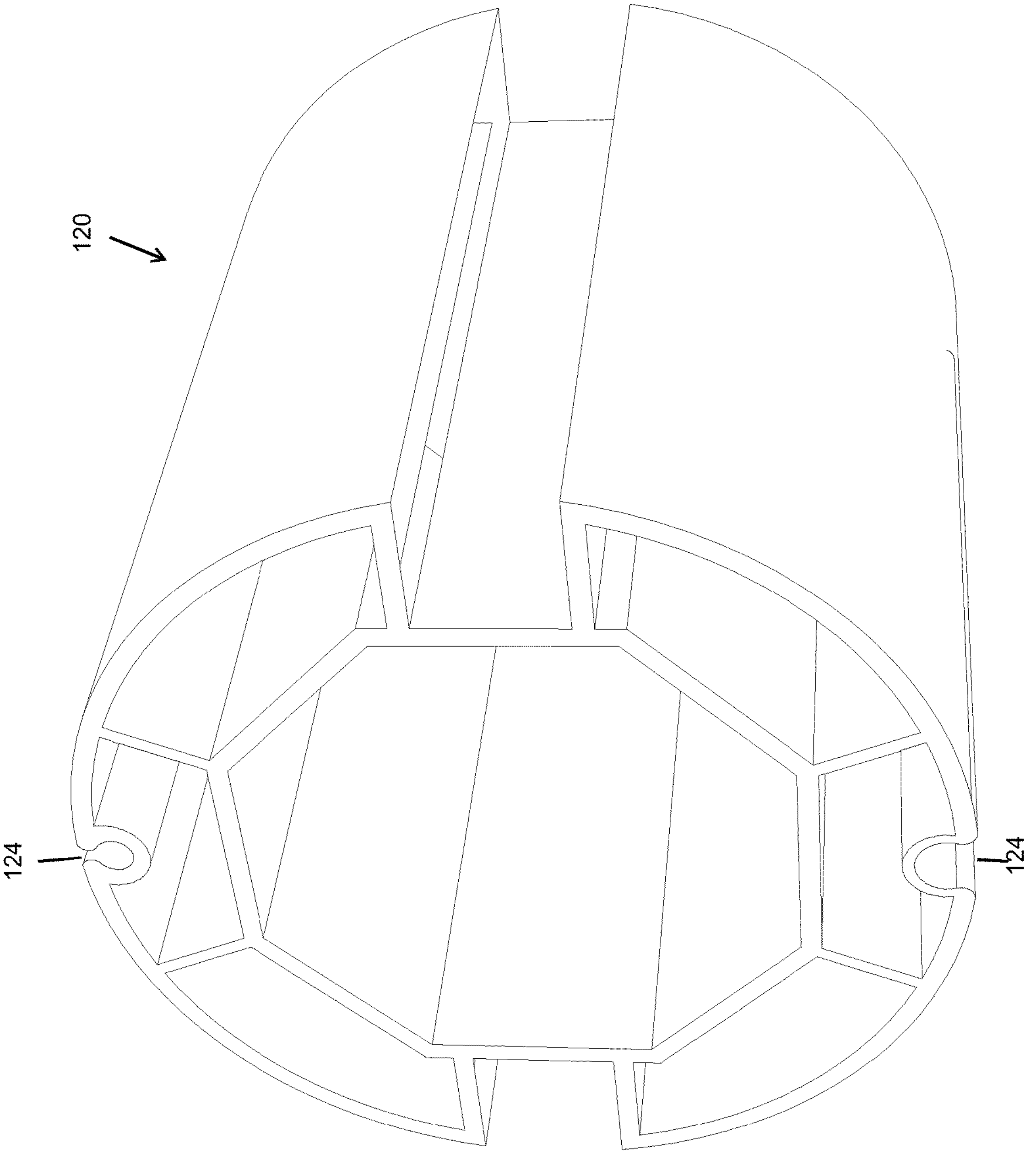
FIG. 11 is another perspective view of the collars (also known as doughnuts) of the roller tube assembly of a motorized screen system having a magnetic track assembly, in accordance with one or more embodiments; the view showing a 5 & ½ inch housing with roller tube.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the disclosed arrangements. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure that may be described herein. The contemplated embodiments are not so limited and should not be interpreted as being restricted to embodiments which address such objects of the disclosure. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the embodiments to any particular orientation or configuration.

As used herein, the term "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments. No claim element is to be construed under the provisions of 35 U.S.C. § 112(f), or analogous law in applicable, jurisdictions, unless the element is expressly recited using the phrase "means for" or, in the case of a method claim, the element is recited using the phrase "step for".

As used herein, various disclosed embodiments may be primarily described in the context of retractable roller shades. However, the embodiments are not so limited. It is appreciated that the embodiments may be adapted for use in various other applications, which may be improved by the disclosed structures, arrangements and/or methods. The support system is merely shown and described as being used in the context of retractable roller shades for ease of description and as one of countless examples.

System 10:

With reference to the figures, a retractable screen system 10 (or simply system 10) is presented. In the arrangement shown, as one example, the retractable screen system 10, includes a housing 12, a screen 14, roller tube assembly 16, a motor assembly 18 (not shown), track assemblies 20, and a bottom bar assembly 22, among other components. In one or more arrangements, when installed, system 10 is configured to move screen 14 between an extended position and a retracted position to selectably close off or open an opening 26 of a structure 24 having opposing sides 28, an upper end 30, and a lower end 32. Openings 26 may include but are not limited to, for example, windows, doorways, skylights, archways, or any other type of opening. In one or more arrangements, roller tube assembly 16, and motor assembly 18 are positioned along an upper end 30 of opening 26 and operably connect with screen 14 to extend/retract screen 14 during operation. Track assemblies 20 are positioned along each side 28 of opening 26 and operably connect with and guide screen 14 along sides 28 of opening 26 when screen is extended/retracted.

Housing 12:

Housing 12 is formed of any suitable size, shape, and design, and is configured to house and hold various components of the system 10 so as to facilitate function of the system 10 as well as to provide an aesthetically pleasing appearance, as is further described herein. In the arrangement shown, as one example, housing 12 has an elongated generally rectangular shape having a front 34, back 36, a top 38, and bottom 40 extending a length between opposing outward ends 42, end caps 44, and bracket members 46 among other components, features, and elements.

Back 36:

Back 36 is formed of any suitable size, shape, and design and is configured to form a portion of housing 12 and enclose the rear side of housing 12. In the arrangement shown, as one example, back 36 is a generally planar shaped member that extends from an upper edge 50 to a lower edge 52 between the opposing outward ends 42 of housing 12. In the arrangement shown, as one example, when housing 12 is installed in a rear-mount application, fasteners 48, such as screws, bolts, staples, nails, rivets, or the like extend through back 36 and into the structure to which housing 12 is installed. However, the arrangements are not so limited. Rather, it is contemplated that in various arrangements, back 36 may be secured to a structure using various means and/or methods including but not limited to, for example, frictional fittings, adhesive bonding, chemical bonding, welding, stitching, sewing, fasteners, and/or any other connection means or method.

Front 34:

Front 34 may also be referred to or known as in the industry as a fascia. Front 34 is formed of any suitable size, shape, and design and is configured to form a portion of housing 12 and enclose the front side of housing 12. In one example arrangement shown, as one example, front 34 has an elongated slightly curved generally planar shape that extends from an upper edge 54 to a lower edge 56 between the opposing outward ends 42 of housing 12.

In the arrangement shown, as one example, the upper edge of front 34 connects to the forward edge of top 38. In this example arrangement, a curved corner section connects the lower edge 56 of the front 34 to a forward edge of bottom 40. However, any other shape is hereby contemplated for use as front 34 including but not limited to, for example, a planar shape, a multi-faceted shape, a contoured shape, or any other shape that provides a different aesthetic appearance.

Top 38:

Top 38 is formed of any suitable size, shape, and design and is configured to form a portion of housing 12 and enclose the upper side of housing 12. In the arrangement shown, as one example, top 38 is a generally planar shaped member that extends between front edge 58 and rear edge 60 between the opposing outward ends 42 or housing 12. In the arrangement shown, as one example, the rear edge 60 of top 38 connects to the upper edge 50 of back 36, the front edge 58 of top 38 connects to the upper edge 54 of front 34.

In one or more arrangements, when housing 12 is installed in a top-mount application, fasteners 48 extend through top 38 and into the structure to which housing 12 is installed.

However, the arrangements are not so limited. Rather, it is contemplated that in various arrangements, top 38 may be secured to a structure using various means and/or methods including but not limited to, for example, frictional fittings, adhesive bonding, chemical bonding, welding, stitching, sewing, fasteners, and/or any other connection means or method.

Bottom 40:

Bottom 40 is formed of any suitable size, shape, and design and is configured to form a portion of housing 12 and enclose the lower side of housing 12. In the arrangement shown, as one example, bottom 40 is a generally planar shaped member that extends rearward between the opposing outward ends 42 from a front edge 62, where bottom 40 connects to lower edge 56 of front 34, to a rear edge 64. In the arrangement shown, as one example, housing 12 has an elongated opening 66 in bottom 40 extending between rear edge 64 of bottom 40 and lower edge 52 or back 36 a length between the opposing outward ends 42. This opening 66, which may also be referred to as a slot, allows for passage of screen 14 to pass there through while the screen 14 is lowered or raised during operation. In one or more arrangements, housing 12 has woolpile brushes 68 connected to lower edge 52 of back and rear edge 64 of bottom 40. Woolpile brushes 68 seal gaps between screen 14 and lower edge 52 of housing **12*f* and between screen 14 and rear edge 64 of housing 12**.

End Caps 44:

In the arrangement shown, as one example, housing 12 includes an end cap 44 positioned at each outward end 42 of housing 12. End caps 44 are formed of any suitable size, shape, and design and are configured to form sides of housing 12 and enclose the outward ends 42 of housing 12. In the arrangement shown, as one example, end caps 44 are generally planar shaped members extending between a top edge 72, a bottom edge 74, a front edge 76, and a rear edge 78 that respectfully align and connect with front 34, back 36, top 38, and bottom 40 at outward ends 42 of housing 12. In one or more arrangements, end caps 44 have one or more tabs 80 that extend inward from top edge 72, a bottom edge 74, a front edge 76, and/or a rear edge 78 to facilitate connection with front 34, back 36, top 38, and/or bottom 40. In one or more arrangements, when housing 12 is installed in a side-mount application, fasteners 48 extend through end caps 44 and into the structure to which housing 12 is installed. However, the arrangements are not so limited. Rather, it is contemplated that in various arrangements, end caps 44 may be secured to a structure using various additional or alternative means and/or methods.

Bracket Members 46:

Bracket members 46 (not shown) are formed of any suitable size, shape, and design and are configured to facilitate connection of roller tube assembly 16 to housing 12. In one or more arrangements, bracket members are positioned proximate to outward ends 42 of housing 12 inward of end caps 44.

In the arrangement shown, once assembled housing 12 forms a hollow interior 84 that houses and holds roller tube assembly 16 therein. In one or more arrangements, as one example, front 34, back 36, top 38, bottom 40 and/or end caps 44 may connect to one another using various known method and/or means including but not limited to, for example, clamps, snaps, pins, fasteners, adhesive bonding, chemical bonding, welding, stitching, and/or any other connection means or method for connecting. Additionally or alternatively, in one or more arrangements, one or more groups of front 34, back 36, top 38, bottom 40 and/or end caps 44 may be formed as unitary members.

However, the embodiments are not limited to the housing 12 shapes and/or components described herein. Rather, it is contemplated that any other size, shape, design, or configuration is hereby contemplated for use as housing 12. In an alternative arrangement, no housing 12 is used and instead in this arrangement, roller tube assembly 16 is connected to and/or held in place by bracket members 46 alone without the use of front 34, back 36, top 38 and/or bottom 40.

Screen 14:

Screen 14 is formed of any suitable size, shape, and design, and is configured to extend across an opening 26 of a structure 24 and operably connect with roller tube assembly 16 positioned at upper end 30 of opening 26 and with track assemblies 20 positioned on sides 28 of opening 26. In one or more arrangements, screen 14 is formed of a generally rectangular sheet of material 96 extending between a top edge 90, a bottom edge 92, opposing side edges 94.

In various different arrangements, the screen 14 may formed of various different materials to provide various different features/functions for different applications. Such features/functions may include but are not limited to, for example, shade, privacy, barrier and/or protection from adverse environmental elements (wind, rain, insects, extreme temperatures, blowing sand and/or objects, etc.), and/or any other features/function that may be desirable. In various different arrangements, materials 96 may be formed of various known materials including but not limited to, for example, natural fibers (e.g., cotton), carbon fiber, Kevlar, aramid, an ultra-high-molecular-weight polyethylene, nylon, modacrylic olefin, acrylic, polyester, or other synthetic fiber, and/or plastic sheeting, or any other screen material.

As one illustrative example, in an installation in an indoor/outdoor living space, material 96 of screen 14 may be formed of a mesh material selected to permit exchange of air with the outside while providing shade and providing a barrier from mosquitos. In the same indoor/outdoor space, material 96 of screen 14 may alternatively be formed of a translucent or transparent flexible plastic material, for example, to enclose of the space from the outside in colder months, while preserving visibility of the outdoors. As another illustrative example, in one or more arrangements, system 10 may be installed on the exterior of windows, doors, and/or other openings 26 of a structure 24 to protect the openings 26 from damage due to flying debris during high wind events (e.g., hurricanes, tropical storms, tornadoes, among other weather occurrences). For such application, in one or more embodiments, material 96 of screen 14 may be formed of extra-strength screen material that is strong enough to withstand hurricane force winds. Such material for screen 14 may include but is not limited to a ballistic material such as Kevlar, an aramid, an ultra-high-molecular-weight polyethylene, or a similarly strong material. As yet another illustrative example, in one or more arrangements, system 10 may include a screen 14 having material 96 with reflective properties suitable for use as a projection screen.

In one or more arrangements screen 14 may be formed of a combination of materials to provide a combination of desired features/functionality provided. For example, in one of more arrangements, screen 14 includes a mesh-type material 96 (e.g., to provide airflow and an insect barrier for an indoor/outdoor area) and a window 98 of translucent or transparent flexible plastic material positioned in a center of the material 96 to provide better view of the outdoors.

Interlocks 100/102/104:

In one or more arrangements, screen 14 includes interlocks 100 extending alongside edges 94 of screen 14 to facilitate operable connection of screen 14 with screen receivers 146 of track assemblies 20. Additionally or alternatively, in one or more arrangements, screen 14 includes an interlock 102 extending along top edge 90 of screen 14 to facilitate operable connection of screen 14 with roller tube assembly 16. Additionally or alternatively, in one or more arrangements, screen 14 includes an interlock 104 extending along bottom edge 92 of screen 14 to facilitate operable connection of screen 14 with bottom bar assembly 22.

Interlocks 100/102/104 are formed of any suitable size, shape, and design, and are configured to operably connect screen with a connection feature of screen receivers 146 of track assemblies 20 (and/or roller tube assembly 16 and/or bottom bar assembly 22). In the arrangement shown, interlocks 100/102/104 are circular shaped interlocks (sometime referred to as keder interlocks) that are configured to be inserted into and held within a c-shaped channel of screen receivers 146 of track assemblies 20 (or roller tube assembly 16). However, the embodiments are not so limited. Rather, it is contemplated that interlocks 100/102/104 may be implemented using various types of interlocks including but not limited to, for example, keder interlocks, zipper interlocks, rope, beaded chain, low-profile interlocks or any similar interlock known in the art).

In one example implementation, interlocks 100/102/104 include an elongated length of seam material 108 that is folded lengthwise around a length of circular cord 106 and attached to material 96 along an edge of screen 14. In some various arrangements, seam material 108 of interlocks 100/102/104 may be attached to screen 14 using various techniques known in the art, and/or various combinations thereof such as adhesive bonding, chemical bonding, welding, stitching, sewing, staples, rivets, and/or any other connection means or any combination thereof. Some additional interlocks implementations are discussed in more detail in U.S. Pat. Pub. No. 2021/0262284 titled "Retractable Screen Systems" and published Aug. 26, 2021, which is hereby incorporated by reference in its entirety.

Roller Tube Assembly 16:

Roller tube assembly 16 is formed of any suitable size, shape, and design, and is configured to connect to housing 12 as well as facilitate the connection of screen 14 to housing 12 while facilitating the opening and closing of screen 14. In the arrangement shown, roller tube assembly 16 includes a roller tube 114 configured to operably connect with bracket members 46 of housing 12.

Roller Tube 114:

Roller tube 114 is formed of any suitable size, shape, and design upon which screen 14 may wrap around to facilitate opening or closing of screen 14 when roller tube 114 is rotated. For instance, when roller tube assembly 16 rotates in a first rotational direction, screen 14 wraps around the exterior surface of the roller tube 114 thereby opening the screen 14, and when roller tube assembly 16 rotates in a second rotational direction, opposite the first rotational direction, screen 14 unwraps from around roller tube 114 thereby closing screen 14.

In the arrangement shown, as one example, roller tube 114 is a generally elongated cylindrical shaped exterior surface 122 that extends a length between opposing ends 116.

In one or more arrangements, system 10 may utilize an interlock 102 to connect the upper end of screen 14 to a receiver 124 of roller tube 114.

Receiver 124 is formed of any suitable size, shape, and design, and is configured to receive and hold onto top edge 90 of screen 14. In the arrangement shown, as one example, receiver 124 is a c-shaped channel 126 in an exterior surface 122 configured to receive and hold a circular interlock 102 via an opening 128 at an outer end of channel 126. However, the embodiments are not so limited. Rather, it is contemplated that in one or more arrangements, channel 126 may be shaped to receive an interlock 102 of any shape (e.g., circular, triangular, square, rectangular shape, T-shaped, V-shaped, L-shaped, U-shaped, or any other shape). Moreover, it is contemplated that in one or more arrangements, receivers 124 may additionally or alternatively connect with screen 14 using various known method and/or means including but not limited to, for example, clamps, snaps, pins, fasteners, adhesive bonding, chemical bonding, welding, stitching, and/or any other connection means or method for connecting.

Length Adjustment Members 120:

In one or more arrangements, interlocks 100 positioned on side edges 94 of screen 14 facilitate operable connection with screen receivers 146 of track assemblies 20. For example, in one or more arrangements, interlocks 100 positioned on side edges 94 are inserted into openings 170 of channels 166 at upper end 160 of screen receivers 146 of track assemblies 20. Screen 14 may be retracted by rotating roller tube assembly 16 and thereby rolling screen 14 up around exterior surface 122 of roller tube 114 and/or exterior surface 134 of length adjustment member 120. However, interlocks 100 are generally thicker than material 96 of screen 14, for example, in order to be held in place by screen receivers 146. In some implementations, seams 108, where interlocks 100 attach to screen 14, may have a thickness between that of material 96 and cords 106 of the interlocks 100. Due to the differences in thickness, cords 106 and/or seams 108 of interlocks 100 will add more to circumference when rolled around a tube than will material 96 of screen 14. If circumference is increased at a side edge 94 of screen 14, e.g., by an interlock 100, each rotation of roller tube 114 will cause more screen 14 to be rolled up at the edge in comparison to other points along roller tube 114, which may create undesirable defects 118 to be visible in screen 14 such as edge wrinkles. In one or more embodiments, roller tube assembly 16 includes length adjustment members 120 operably connected to roller tube 114.

Length adjustment members 120 are formed of any suitable size, shape, and design and are configured to adjust effective length of roller tube 114. As used herein, "effective length" refers to the combined length of a combination of roller tube 114 and any members attached to ends of the roller tube (e.g., length adjustment members 120). As an illustrative example, consider a hypothetical tube extending 48 inches between opposing ends of the hypothetical tube. If a 3-inch length extension member is attached to one end of the hypothetical tube, the effective length of the tube is 51 inches. If that same 3-inch extension member is slid outward two inches, the effective length of the tube is 53 inches.

In the arrangement shown, as one example, length adjustment member 120 is a generally cylindrical shaped collar having an exterior surface 134 extending between opposing ends 132. In one or more arrangements, the cylindrical exterior surface 134 of length adjustment member 120 has similar shape to that of exterior surface 122 of roller tube 114, for example, with c-shaped channels of one or more receivers 144 extending between ends 132 to facilitate insertion of interlock 102 into the c-shaped channels 126 of receivers 124 of roller tube 114. However, the embodiments are not so limited. Rather, it is contemplated that in one of more arrangements, c-shaped channels 126/receivers 124 may be omitted from length adjustment member 120. In such embodiments, interlock 102 at top edge 90 of screen 14 may be inserted into c-shaped channels 126/receivers 124 of roller tube 114 prior to attaching length adjustment member 120.

In the arrangement shown, length adjustment member 120 has a collar shape configured to fit over and operably connected to an end 116 of roller tube 114 by a connection member 136 such as an inner tube or axle.

In various implementations, the effective length may be adjusted using various mechanisms including, for example, by changing the position where length adjustment member 120 is attached to connection member 136 and/or the position where connection member 136 attaches to roller tube 114. The position at which connection member 136 attaches to roller tube 114 and/or length adjustment member 120 may be secured using any manner, method or means known in the art including but not limited to, for example, fasteners (e.g., screws, bolts, staples, rivets, and the like) compression collar, threading, frictional fittings, adhesive bonding, chemical bonding, welding, and/or any other connection means or method.

In one or more arrangements, length adjustment member 120 may be moved to and secured at an infinite number of positions relative to roller tube 114, thereby facilitating adjustment of effective length to an infinite number of different lengths.

In one or more arrangements, system 10 includes multiple fixed length adjustment members 120 of different lengths that can be added and/or removed from roller tube 114 to facilitate adjustment of roller tube 114 to various effective lengths, as required. Additionally or alternatively, in one or more arrangements, length adjustment member 120 may be adjustable in length. For example, in one or more arrangements, length adjustment member 120 may have a telescopic arrangement allowing length of length adjustment member 120 to be increased or decreased as required.

By adjusting the effective length of roller tube 114, system 10 may be adjusted so screen 14 extends beyond ends 116 of roller tube 114 to accommodate the thicker interlock 100 (e.g., cord 106 and/or seams 108) and thereby prevent interlocks 100 from increasing circumference when screen 14 is rolled up.

Similarly, the effective length of roller tube 114 may be adjusted so that screen 14, seam 108, and/or cord 106 of interlock 100 engages the exterior surface of roller tube 114 and/or length adjustment member 120 as roller tube 114 is turned. By adjusting the effective length so either screen 14, seam 108, and/or cord 106 of interlock 100 are rolled up as roller tube 114 is turned, the effective rate at which one side of screen 14 is deployed or retracted as roller tube 114 is rotated may be adjusted.

Figure 12A:
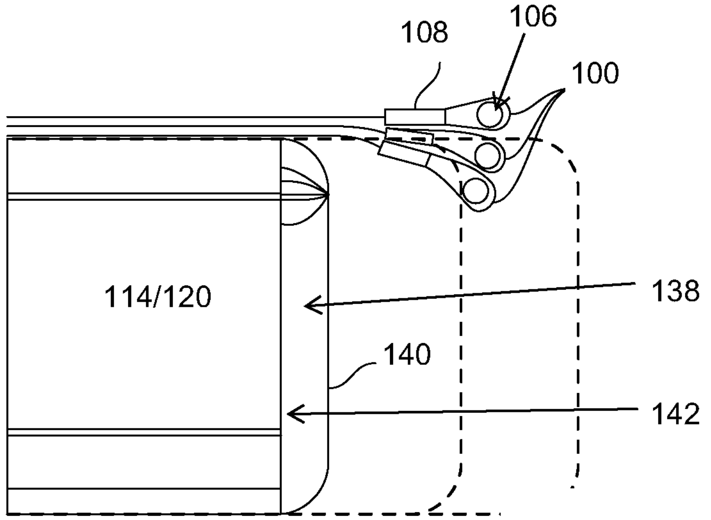
FIG. 12A shows a front view of a roller tube collar, end cap, and attached screen rolled around the roller tube and collar, in accordance with one or more embodiments; the view showing the side profile view of the end cap having an inner end positioned against the outer end of the collar, the inner end having a larger diameter that is approximately the same as the outer diameter of the roller tube and the collar; the view showing the outer end having a smaller diameter than the outer diameter of the roller tube and the collar; the view showing the exterior surface of the end cap curving in a smooth convex manner from the inner end to the outer end, the view illustrating the roller tube collar in a fully retracted position thereby causing the interlock to fold over and around the curved exterior surface of the end cap; the view also shows in dashed lines other potential positions the collar and end cap may be adjusted to along the infinite range of positions between a fully retracted position and a fully extended position; this configuration causes the screen to be raised at a minimum rate or minimum gear ratio.

With reference to FIG. 12A, in an arrangement shown, as one example, in a fully-retracted position, the effective length of roller tube 114 is reduced so seam 108 and/or cord 106 of interlock 100 on the side of screen 14 extend beyond the outer end 132 of length adjustment member 120 (attached to roller to 32 by connection member 136). In this position, screen 14 rolls up flat around an outer circumference of roller tube 114/length adjustment member 120. This represents the minimum rate or minimum gear ratio.

Figure 12B:
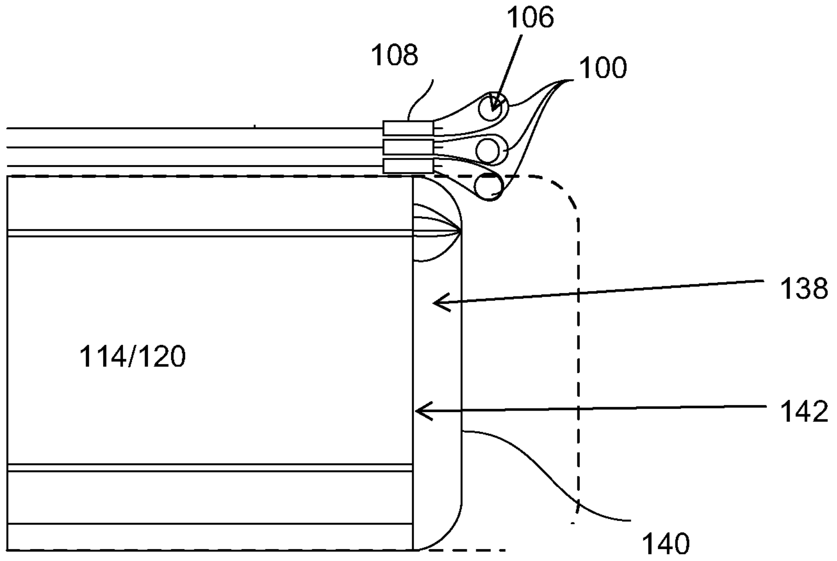
FIG. 12B shows a similar view to FIG. 12A, the view shows a front view of a roller tube collar, end cap, and attached screen rolled around the roller tube and collar, in accordance with one or more embodiments; the view illustrating the roller tube collar in an intermediary position between the fully extended position and the fully retracted position, the view showing the interlock partially supported by the exterior surface of the roller tube collar and the end cap with the outward end of the interlock hanging over and past the end of the end cap thereby causing the interlock to fold over and around the curved exterior surface of the end cap; the view also shows in dashed lines other potential positions the collar and end cap may be adjusted to along the infinite range of positions between a fully retracted position and a fully extended position; this configuration causes the screen to be raised at an intermediate rate or intermediate gear ratio.

With reference to FIG. 12B, in a partially-extended position, or intermediary position, the effective length of roller tube 114 is partially extended so cord 106 of interlock 100 extends beyond the outer end 132 of length adjustment member 120 while seam 108 rests on the exterior surface 134 of length adjustment member 120. In this position, seam 108 rolls up around length adjustment member 120 when roller tube 114 is rotated. Since seam 108 is thicker than material 96 of screen 14, each rotation of roller tube 114 in partially-extended position will roll up more of screen 14 than in fully retracted position. In this manner, the effective rate that the screen 14 is rolled up is increased. This represents an intermediate rate or intermediate gear ratio.

Figure 12C:
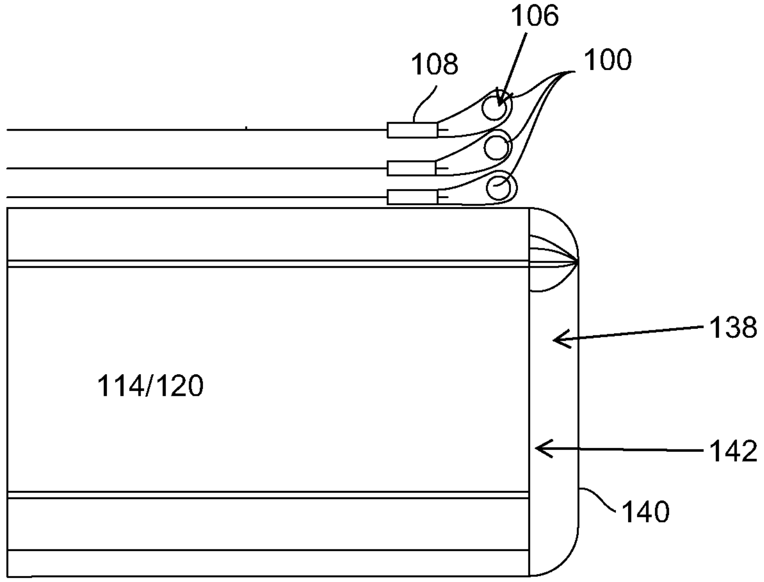
FIG. 12C shows a similar view to FIGS. 12A and 12B, the view shows a front view of a roller tube collar, end cap, and attached screen rolled around the roller tube and collar, in accordance with one or more embodiments; the view illustrating the roller tube collar in a fully extended position, the view showing the interlock fully supported by the exterior surface of the roller tube collar and the end cap with the outward end of the interlock engaging the exterior surface of the roller tube collar; this configuration causes the screen to be raised at a maximum rate or maximum gear ratio.
Figure 13:
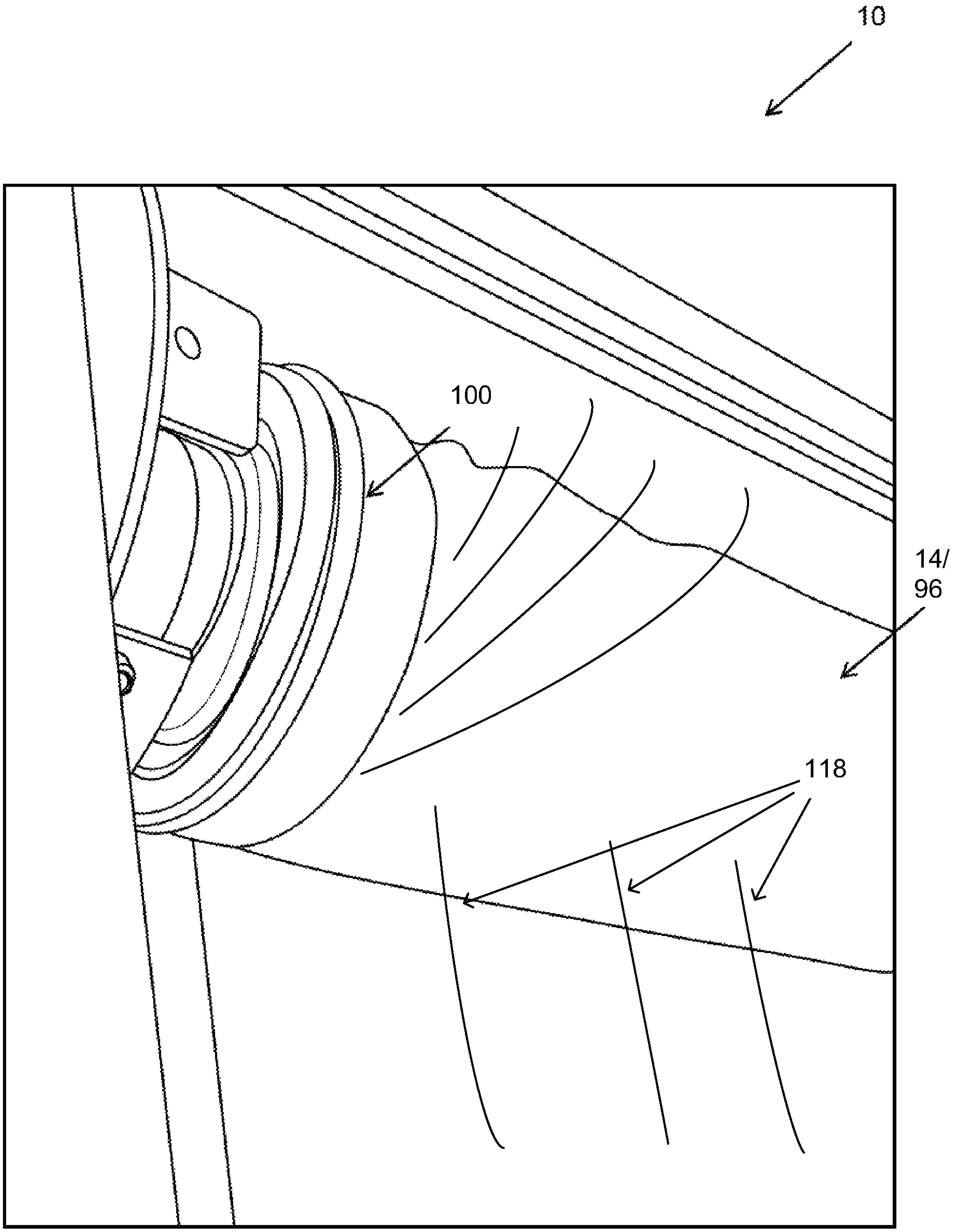
FIG. 13 shows a lower front right perspective view of a retractable screen system with the interlock of the screen bunching up on a roller tube; the view showing visible artifacts in the screen causes by the bunching.
Figure 14:
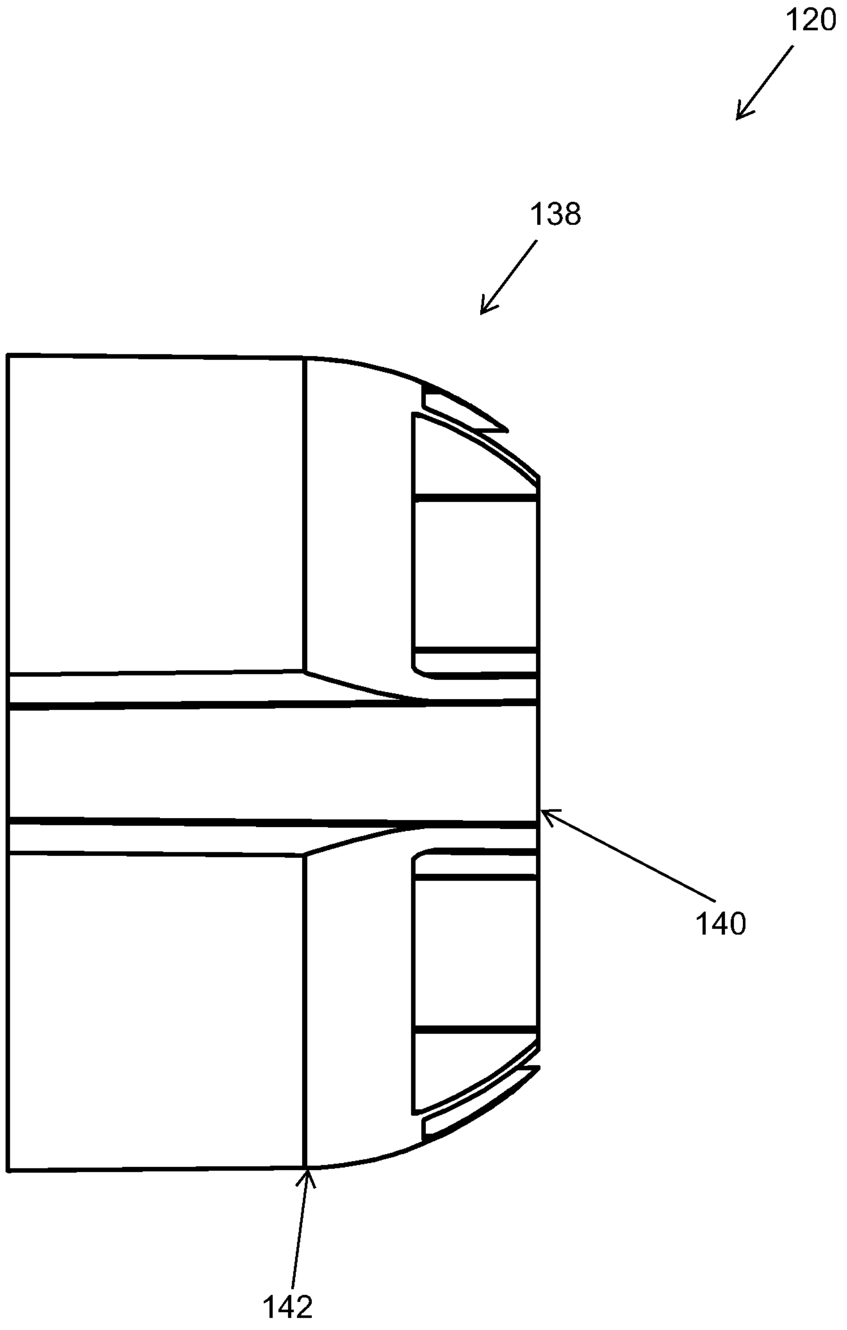
FIG. 14 shows a front view of an end cap configured to connect with end of a roller tube of a retractable screen system, in accordance with one or more embodiments.
Figure 15:
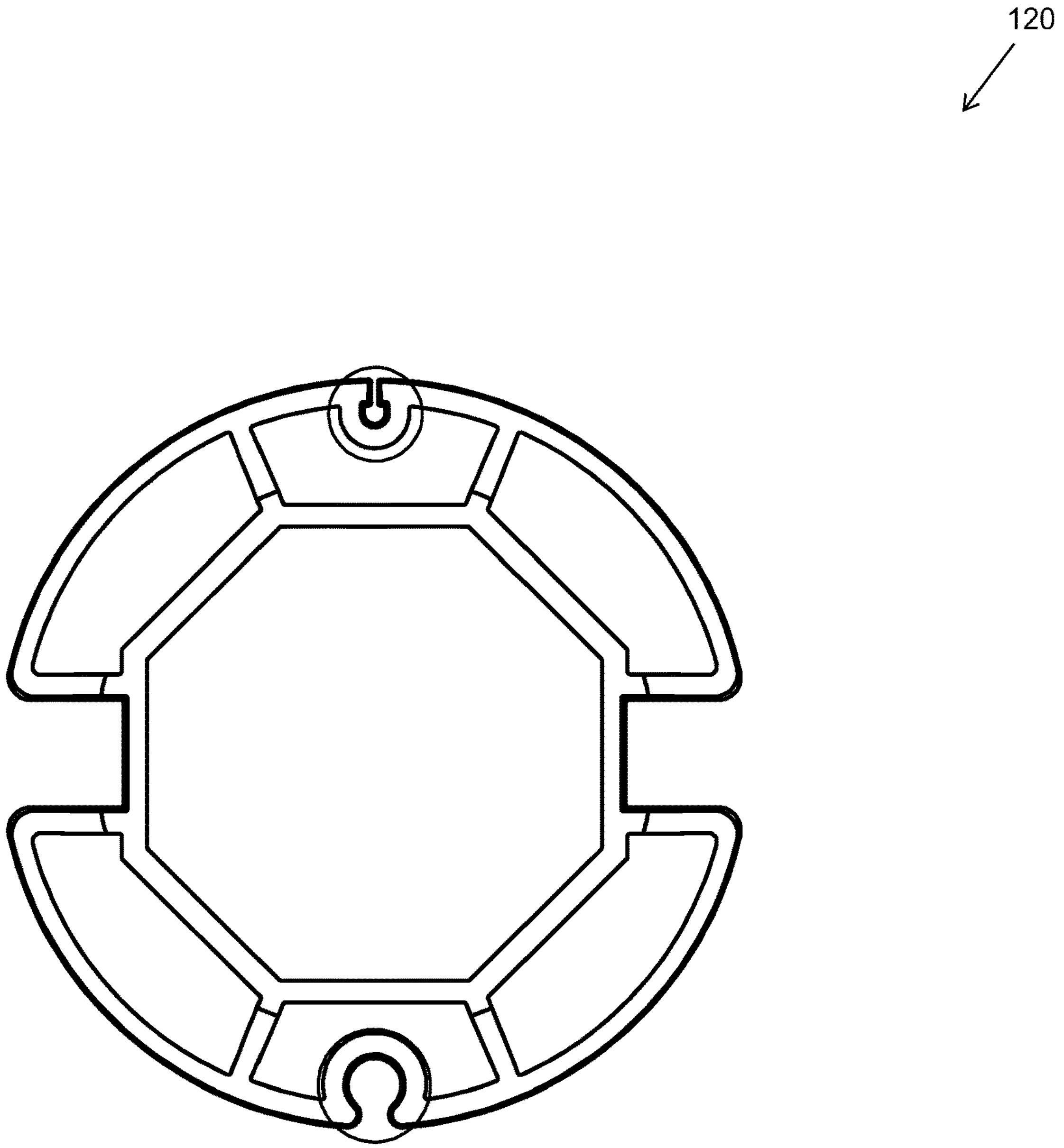
FIG. 15 shows a right side view of the end cap shown in FIG. 14, in accordance with one or more embodiments.
Figure 16:
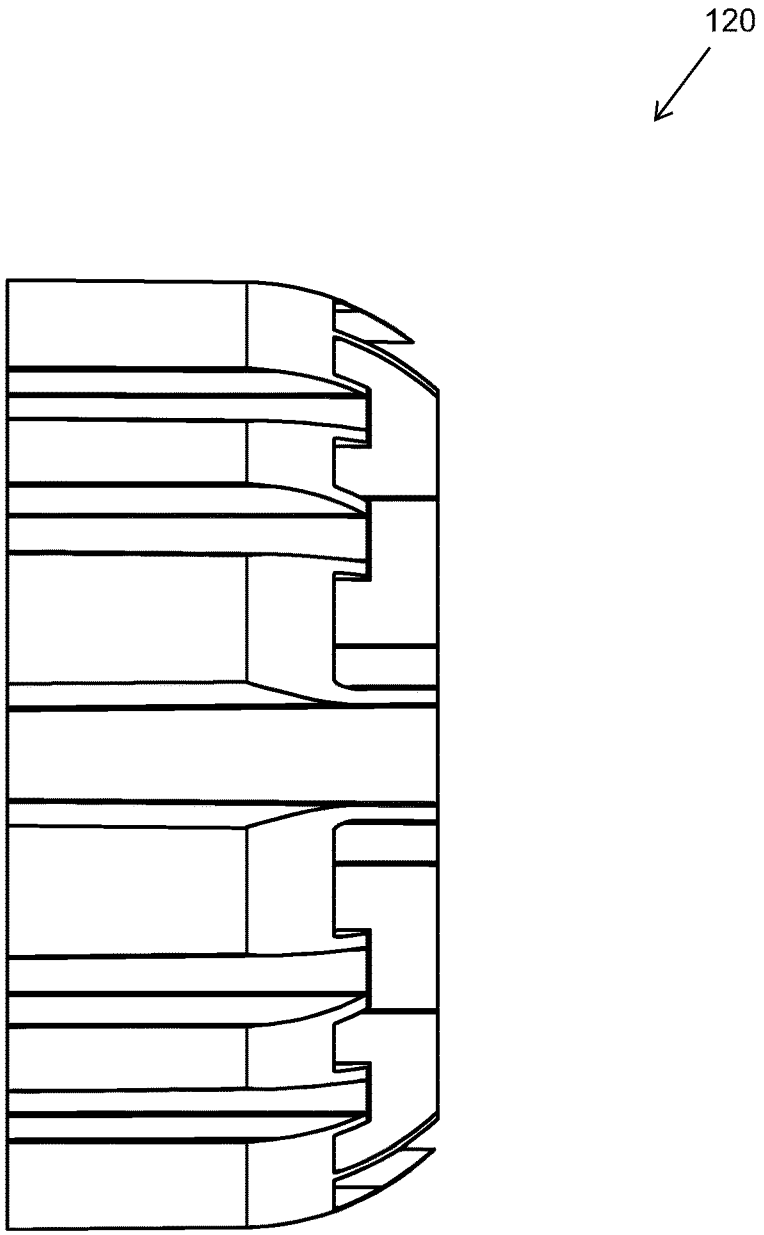
FIG. 16 shows a front view of an end cap configured to connect with end of a roller tube of a retractable screen system, in accordance with one or more embodiments.
Figure 17:
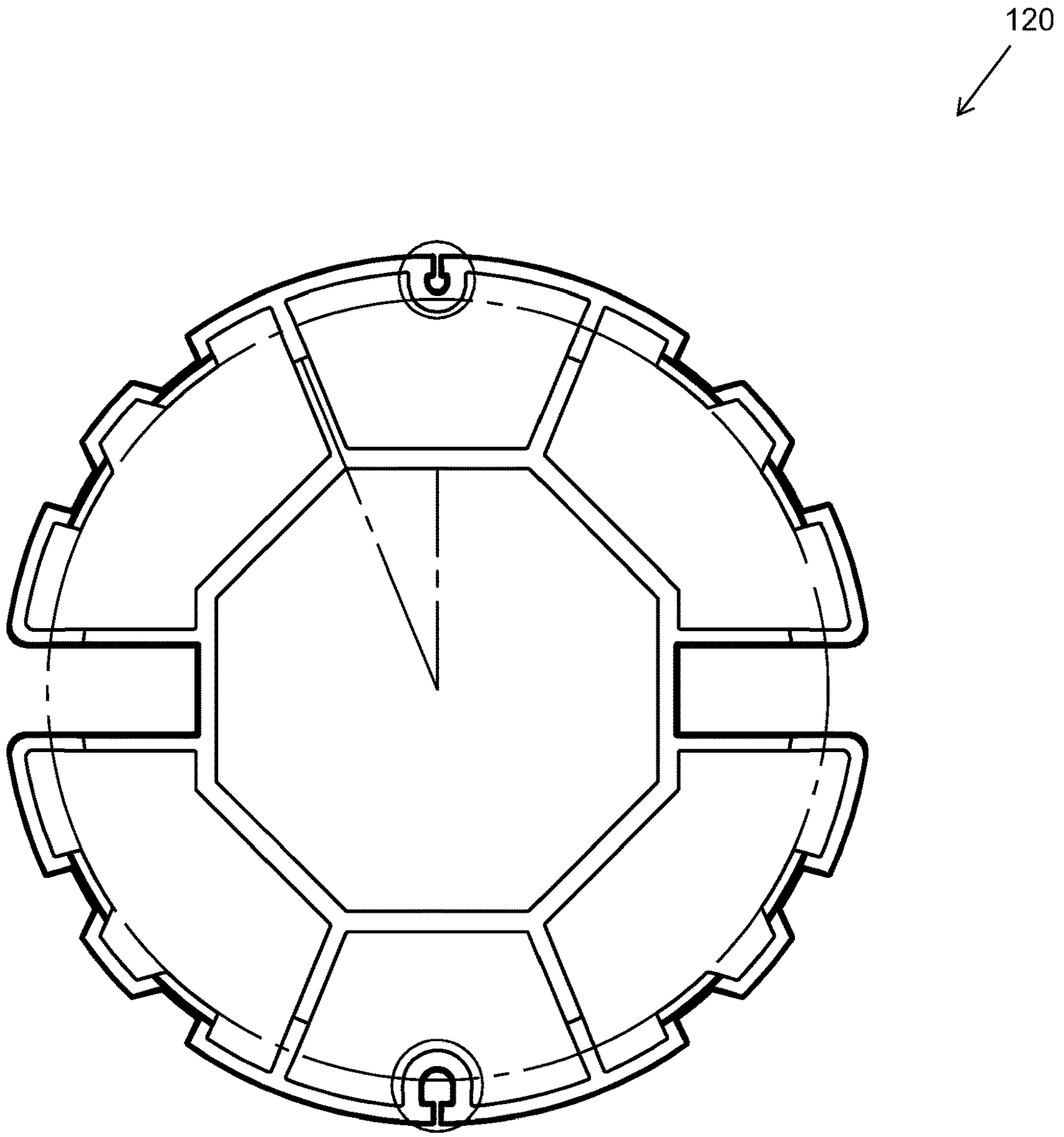
FIG. 17 shows a right side view of the end cap shown in FIG. 16, in accordance with one or more embodiments.
Figure 18:
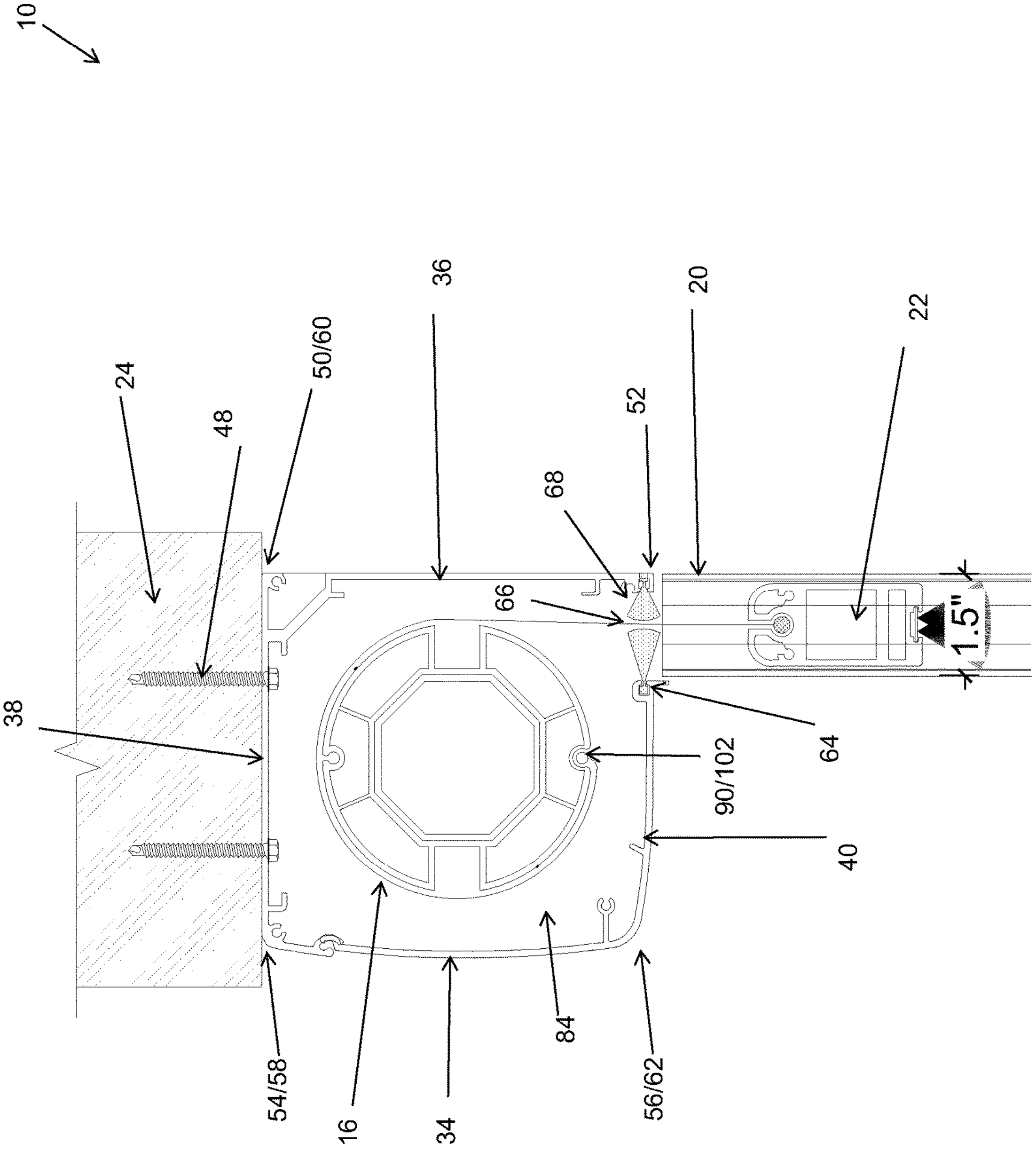
FIG. 18 shows a right side view of a roller tube assembly. housing, and an upper end of a track assembly of a retractable screen system, in accordance with one or more embodiment; the view showing the roller tube assembly and housing mounted to a structure in a top mount arrangement.
Figure 19:
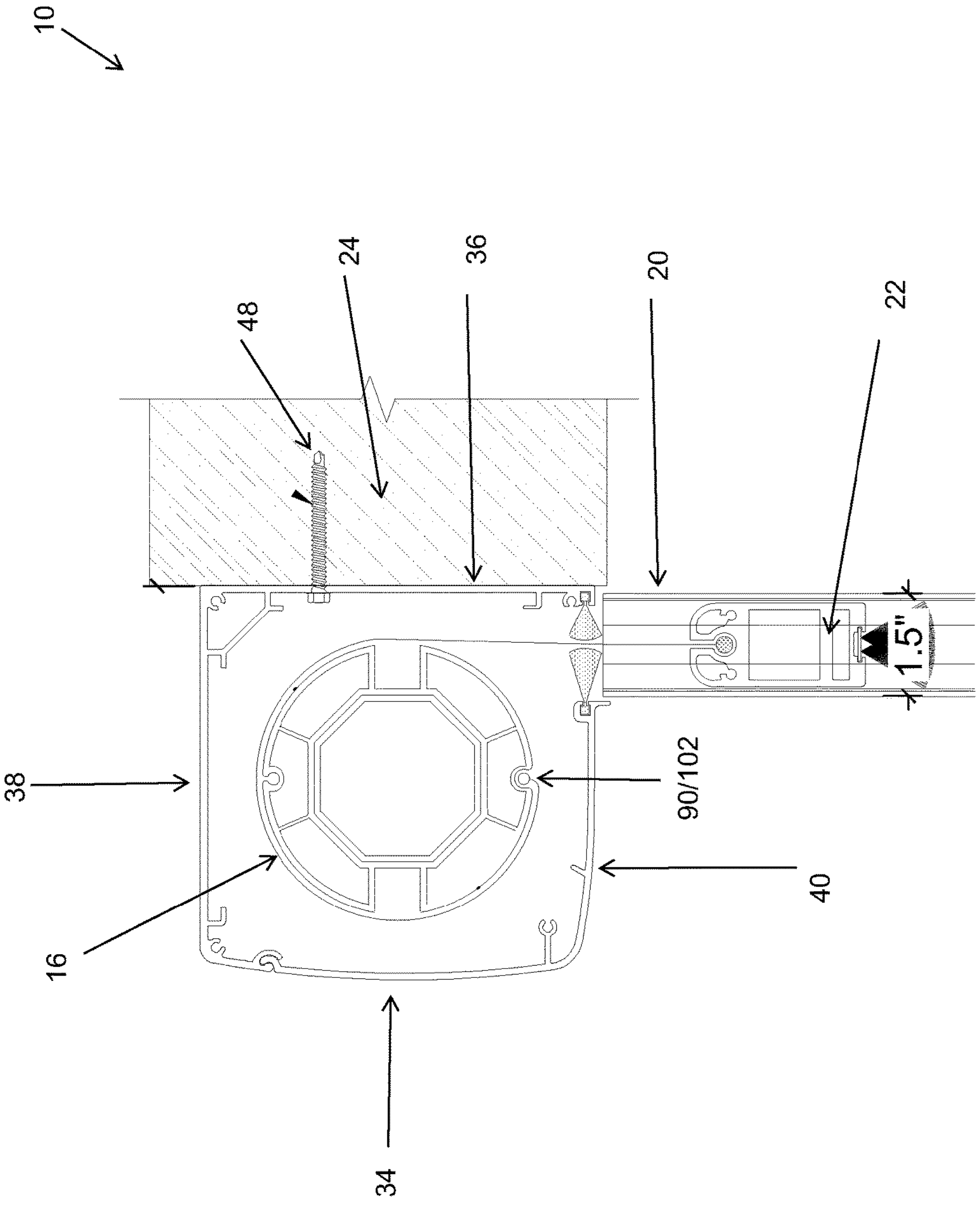
FIG. 19 shows a right side view of a roller tube assembly. housing, and an upper end of a track assembly of a retractable screen system, in accordance with one or more embodiments; the view showing the roller tube assembly and housing mounted to a structure in a side mount arrangement.
Figure 20:
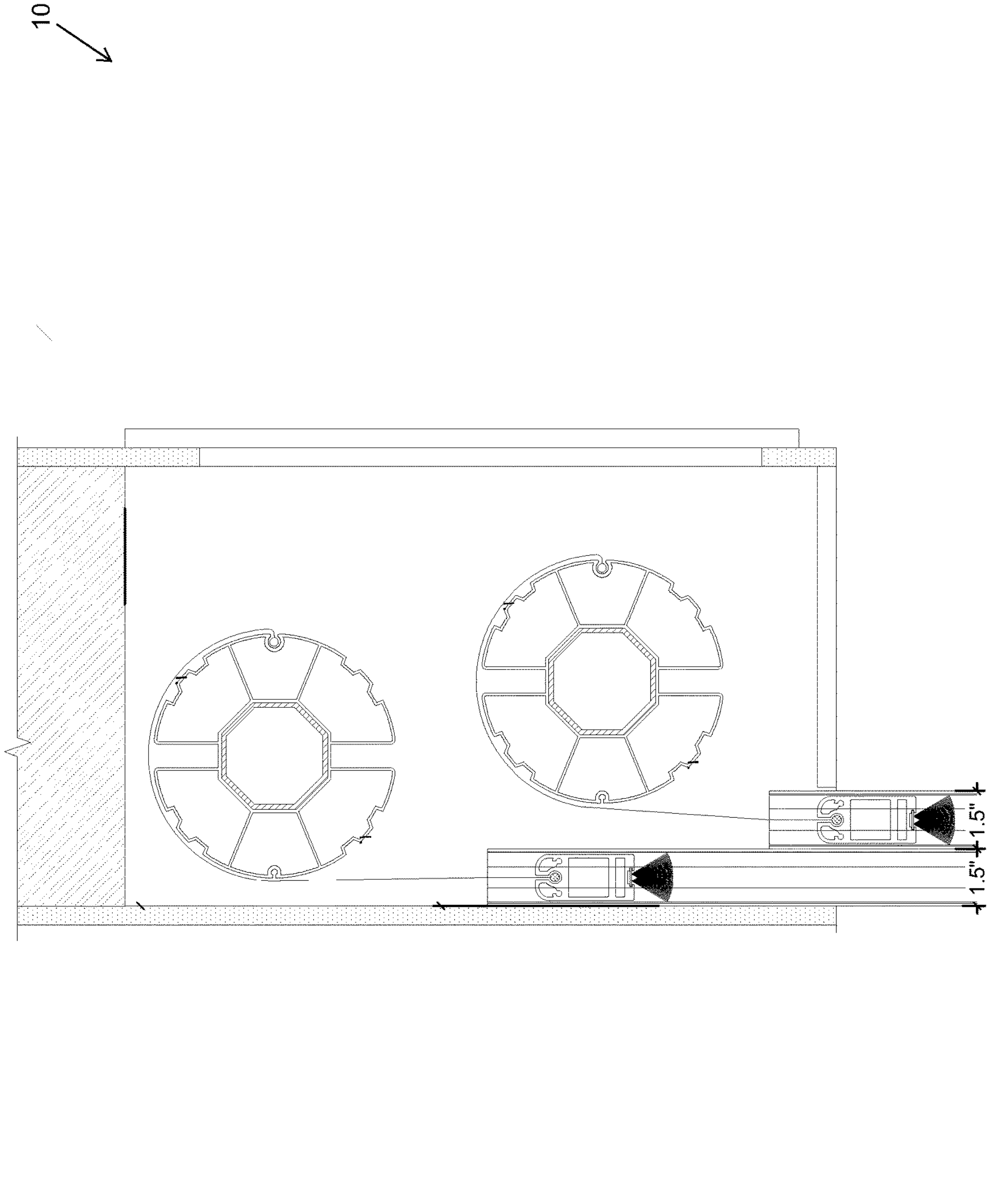
FIG. 20 shows a right side view of a pair of roller tube assembly. housing, and upper ends of a pair of track assemblies of a retractable screen system, in accordance with one or more embodiments; the view showing the roller tube assemblies and housing mounted to a structure in a top mount arrangement; the view showing the roller tube assemblies positioned in an over under arrangement.
Figure 21:
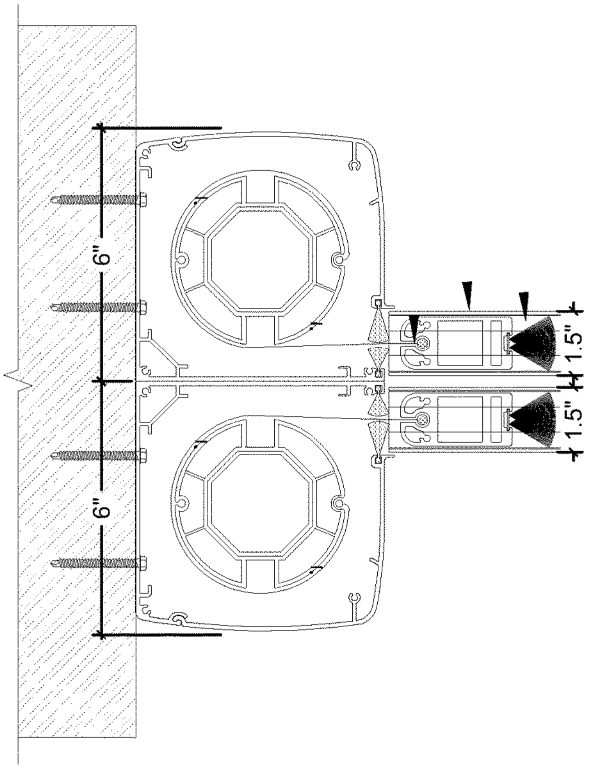
FIG. 21 shows a right side view of a pair of roller tube assembly. housing, and upper ends of a pair of track assemblies of a retractable screen system, in accordance with one or more embodiments; the view showing the roller tube assemblies and housing mounted to a structure in a top mount arrangement; the view showing the roller tube assemblies positioned in a side by side arrangement.
Figure 22:
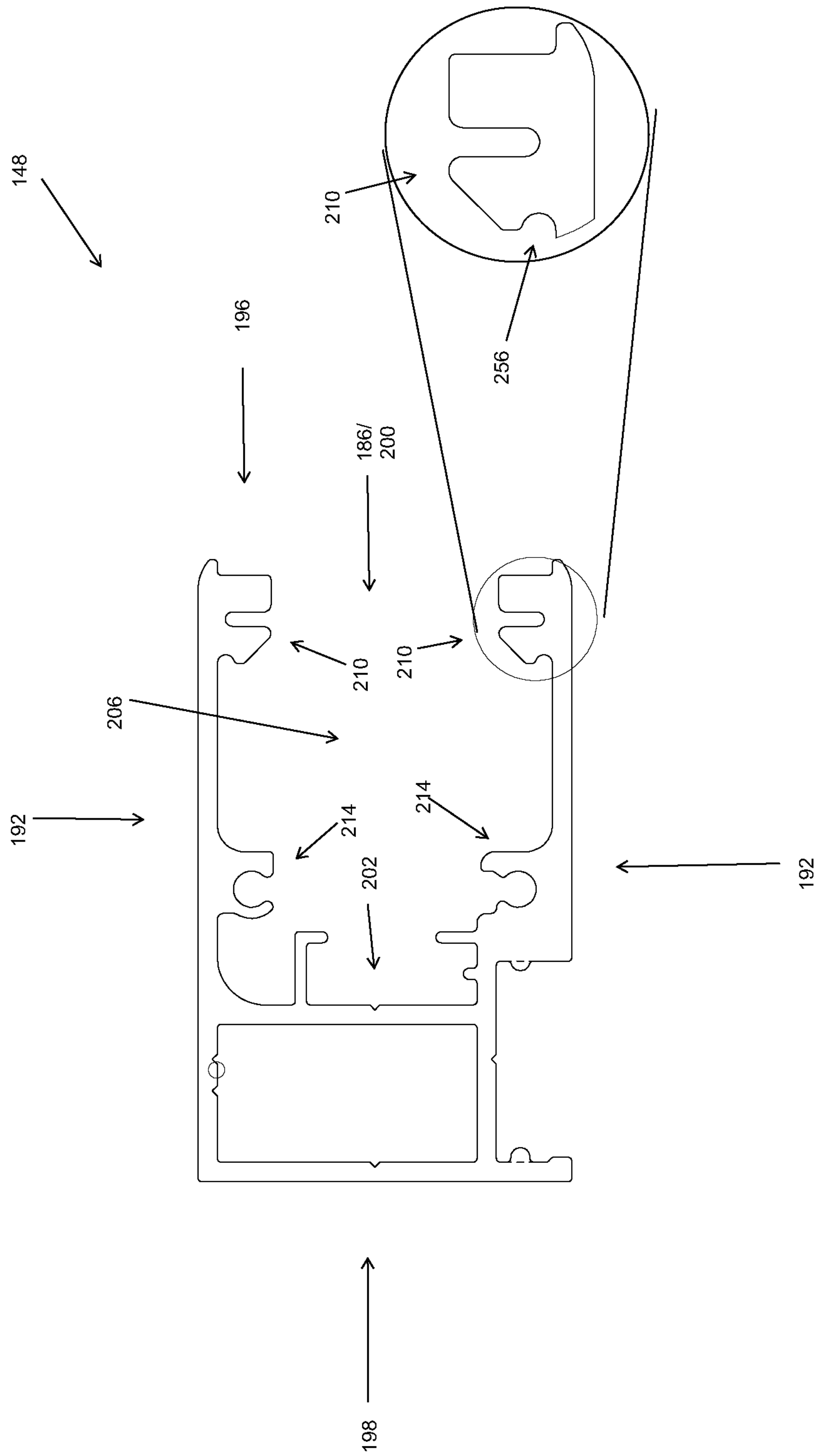
FIG. 22 shows a cross sectional top view of a magnetic track assembly for a retractable screen system, in accordance with one or more embodiments; the view including an enlarged view of an inner partition of the track; the view showing the inner partition having a connection feature configured to facilitate connection with a retainer.
Figure 23:
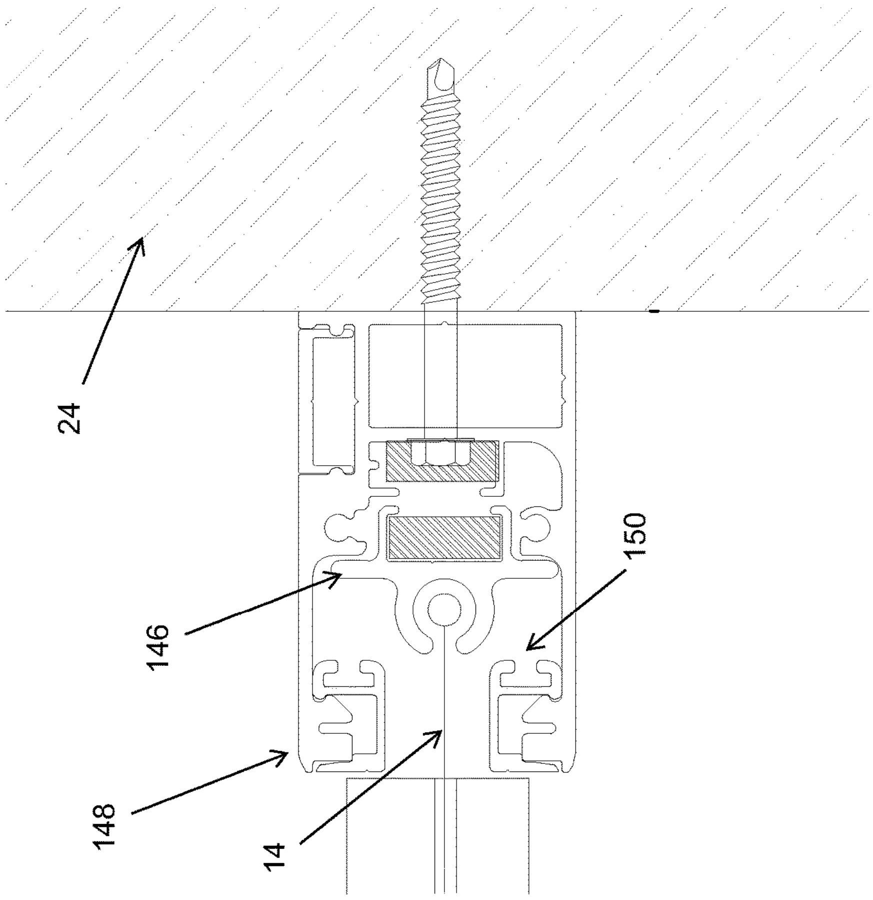
FIG. 23 shows a cross sectional top view of a magnetic track assembly for a retractable screen system, in accordance with one or more embodiments; the view showing the track attached to a structure with an interior mount orientation; the view showing a screen receiver positioned within an elongated channel of the track and a screen connected to the screen receiver; the view showing retainers attached to inner partitions of the track.
Figure 24:
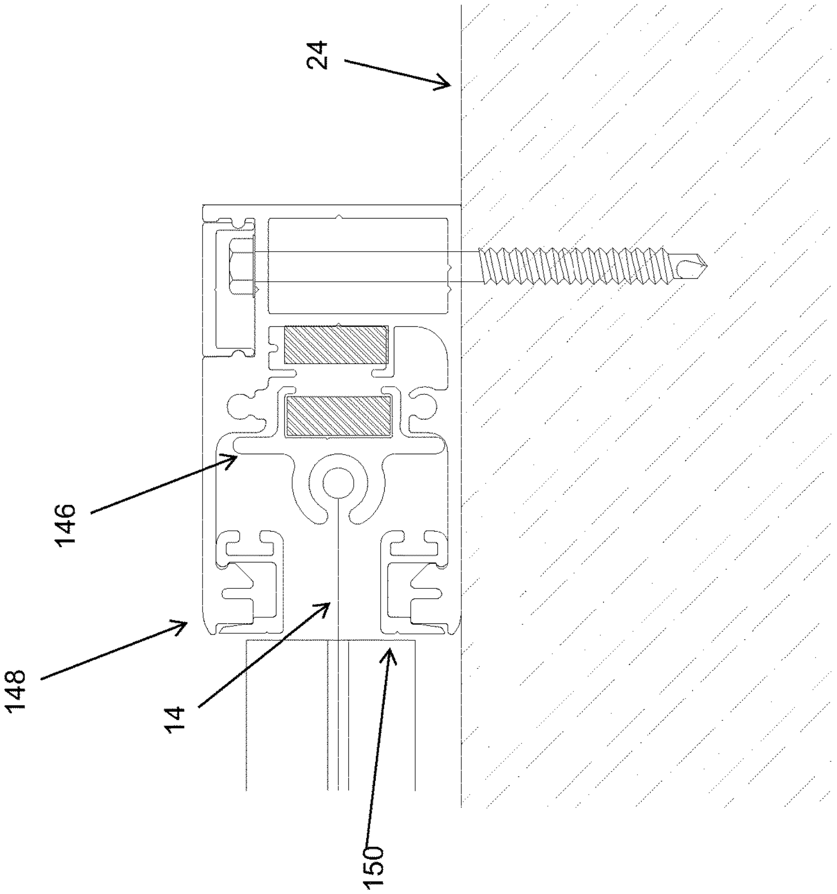
FIG. 24 shows a cross sectional top view of a magnetic track assembly for a retractable screen system, in accordance with one or more embodiments; the view showing a track attached to a structure with an exterior mount orientation; the view showing a screen receiver positioned within an elongated channel of the track and a screen connected to the screen receiver; the view showing retainers attached to inner partitions of the track.

With reference to FIG. 12C, in a fully-extended position, the effective length of roller tube 114 is extended so cord 106 of interlock 100 does not extend beyond the outer end 132 of length adjustment member 120. In this position, the thicker cord 106 of interlock 100 is rolled up around length adjustment member 120 when roller tube 114 is rotated. Since cord 106 of interlock 100 is thicker than seam 108 and screen 14, each rotation of roller tube 114 in this position will roll up more of screen 14 than in other positions. In this manner, the effective rate that the screen 14 is rolled up is further increased. This represents the maximum rate or maximum gear ratio.

While three effective length positions are illustrated, the embodiments are not so limited. Rather, it is contemplated that in one or more embodiments, length adjustment members 120 (e.g., length adjustment member 120 and connection member 136) may be adjustable to a greater or lesser number of positions. It is further contemplated that, in one or more embodiments, length adjustment members 120 may be adjustable to an infinite number of positions.

Rounded Outward Ends 132 of Length Adjustment Members 120:

When screen 14 extends beyond roller tube assembly 16 (e.g., end of roller tube 114 or end of length adjustment member 120), more space is available to accommodate interlock 104 (e.g., cord 106 and seam 108) when screen 14 is rolled up around roller tube 114/length adjustment member 120. However, it has been observed that creases may be formed in screen 14 over time by the end of roller tube assembly 16. It has been surprisingly discovered that providing a curved edge on the ends of roller tube assembly 16 (e.g., outward outer end 132 of length adjustment members 120) helps to prevent the formation of creases in screen 14, even when rolled up for long durations of time.

In one or more arrangements, length adjustment members 120 have a curved section 138 at an outer one of the ends 132; thereby permitting screen 14 to extend beyond the ends of length adjustment member 120 without forming creases in screen 14.

In this example arrangement, curved section 138 of length adjustment members 120 is formed of any suitable size, shape, and design, and is configured to provide a curved exterior surface for support of portions of screen 14 that overhang roller tube assembly 16.

In one arrangement shown, as one example, curved section 138 has a generally cylindrical shaped exterior surface extending from an inner end 142, where diameter of curved section 138 matches that of roller tube 114 to an outer end 140, where curved section 138 has a smaller diameter. In this example, exterior surface 142 has a curved shape that reduces in diameter from inner end 142 to outer end 140. In one or more embodiments, the exterior surface of curved section 138 is shaped to have a smooth curve substantially free of edges, bevels, and/or other transitions that are sharp enough to cause creases to form in a screen 14 overlaid thereon.

In some embodiments, curved section 138 may be formed as a unitary portion of length adjustment member 120.

However, the embodiments are not so limited. Rather, it is contemplated that in one or more arrangements, curved section may be a separate component (e.g., an endcap) configured to attach to an end 132 length adjustment members 120.

Although curved section 138 is primarily described as being formed on outer ends 132 of length adjustment members 120, the embodiments are not so limited. Rather, in some various arrangements, one or both length adjustment member 120 may be omitted and screen 14 may hand over an end 116 of roller tube 114. In such arrangements, an end 116 of roller tube 114 may include a curved section (not shown) to similarly prevent creases from forming in screen 14.

Length Adjustment in Operation:

As an illustrative example, porches of homes often have floors sloped away from houses to ensure rainwater flows away from the house. The installation of retractable screen systems 10 on sloped sides of a porch can be a particular challenge as it may be desirable for a bottom of screen 14 to be parallel to the slope of the floor. As a result, the side of screen 14 closer to the house may need to be shorter than the side that is further from the house when screen 14 is deployed in order to be flush with the floor. However, if screen 14 is evenly wrapped around roller tube assembly 16, a portion of screen 14 will remain deployed when the short side is fully retracted. Consistent with one or more embodiments, an installation technician may adjust the effective length of roller tube assembly 16 via length adjustable members 35 so that the thicker seam 108 and/or cord 106 of interlock 100 on the longer side of screen 14 rolls up around roller tube assembly 16 when rotated. In this manner, the installation technician can adjust the amount that the longer side of screen 14 will retract more per rotation of roller tube assembly 16, relative to the shorter side thereby balancing out the screen 14 to raise and lower evenly and perfectly.

Motor Assembly 18:

In the arrangement shown, as one example, system 10 having track assemblies 20 includes a motor assembly 18. Motor assembly 18 is formed of any suitable size, shape, and design and is configured to facilitate motorized operation of system 10.

Motor assembly 18 may be formed of any form of a motor and may be connected to roller tube assembly 16 in any manner that facilitates rotation of roller tube assembly 16. In the arrangement shown, as one example, motor assembly 18 is an electric motor that is positioned within the hollow interior of roller tube assembly 16 adjacent an end of roller tube assembly 16. Positioning motor assembly 18 within the hollow interior of roller tube assembly 16 provides a sleek arrangement wherein motor assembly 18 is contained within other components of the system 10 thereby minimizing the size and space requirements for the system 10.

In one arrangement, as is shown, motor assembly 18 is a self-contained assembly including a motor, gear assembly, drive wheel and electronic controller assembly, among other components. In this self-contained assembly arrangement, with the installation of a single component, the motor assembly 18 within roller tube assembly 16 the system 10 is motorized, which provides convenience, minimal installation, ease of use and an aesthetic appearance. In one arrangement, motor assembly 18 is controlled by passing control signals to the motor assembly 18 through a wired connection. In another arrangement, motor assembly 18 is controlled by wireless control by passing control signals to the motor assembly 18 through a wireless connection to an antenna connected to motor assembly 18.

In one arrangement, motor assembly 18 is connected to an external power source by a wired connection such as by connection to line power of a house or building thereby providing motor assembly 18 an unlimited power source. Alternatively, motor assembly 18 is connected to a battery power source, a solar module or solar cell, or any combination thereof such as connection to line power with battery back-up and a solar cell for recharging the batteries is hereby contemplated for use.

In the arrangement shown, as one example, once the roller tube assembly 16 is assembled, with motor assembly 18 therein, the roller tube assembly 16 is installed within the hollow interior 84 of housing 12. In doing so, the outward ends of roller tube assembly 16 are connected to the bracket members 46 and the roller tube assembly 16 is able to rotate within the hollow interior 84 of housing 12 thereby raising and/or lowering the screen 14 through opening 66, thereby raising and/or lowering bottom bar assembly 22 along with screen 14.

Track Assemblies 20:

Track assemblies 20 are formed of any suitable size, shape, and design, and are configured to operably connect side edges 94 of screen 14 with sides 28 of opening 26 while permitting screen 14 to be moved upward and downward along track assemblies 20. In the arrangement shown, as one example, track assemblies 20 each include a screen receiver 146, a track I, and retainers 150, among other components.

Screen Receiver 146:

Screen receiver 146 is formed of any suitable size, shape, and design and is configured to be positioned within elongate channel 186 of track 148 and operably connect side edge 94 of screen 14 with track 148. In the arrangement shown, as one example, screen receiver 146 has an elongated generally rectangular planar shaped body 154 having a screen side surface 156 and an opposing side surface 158 extending between opposing side edges 164 from an upper end 160 to a lower end 162. In this example arrangement, screen receiver 146 has a first channel 166 positioned on the screen side surface 156. Channel 166 is formed of any suitable size, shape, and design and is configured to receive and hold a side interlock 100 connected to a side edge 94 of screen 14 while permitting screen 14 to be moved upward and downward in operation. In the arrangement shown, as one example, channel 166 is a c-shaped channel configured to receive and hold side circular interlock 100 via opening 170 of c-shaped channel 166 at upper end 160 of screen receiver 146. However, the embodiments are not so limited. Rather, it is contemplated that in one or more arrangements, channel 126 may be shaped to receive an interlock 100 of any shape (e.g., circular, triangular, square, rectangular shape, T-shape, V-shape, L-shape, U-shape, or any other shape).

In one or more arrangements, screen receiver 146 includes a second channel 172 positioned on opposing side surface 158 of body 154 of screen receiver 146. Channel 172 is formed of any suitable size, shape, and design and is configured to receive and hold a magnetic component 220 to facilitate magnetic coupling of screen receiver 146 with track 148. In the arrangement shown, channel 172 is a c-shaped channel configured to receive and hold a generally rectangular magnetic component 220 that are inserted into channel 172 via openings 176 at upper end 160 or lower end 162. Magnetic component 220 may then be moved to a desired position along channel 172 (e.g., to align with a magnetic component 218 of track 148) and secured in place. In one or more arrangements, magnetic component 220 is secured in place by placing crimps 178 in channel 172 on each side of magnetic component 220. However, the arrangements are not so limited. Rather, it is contemplated that magnetic component 220 may be secured at a desired position in channel 172 using various means and/or methods including but not limited to, for example, crimping, frictional fittings, adhesive bonding, chemical bonding, welding, stitching, sewing, fasteners (e.g., staples, screws, nails, bolts, rivets, etc.), and/or any other connection means or method).

Funnel 180:

In one arrangement, screen receiver 146 includes a funnel 180. Funnel 180 is formed of any suitable size, shape, and design and is configured help facilitate the insertion of interlock 100 into the c-shaped channel 166 of screen receiver 146. In the arrangement shown, as one example, a funnel 180 is shown connected to opening 170 of channel 166 at the upper end of the screen receiver 146 so as to facilitate the insertion of interlock 100. In the arrangement shown, as one example, the upper end of funnel 180 is generally cone shaped and is angled such that it widens as it extends upward.

In the arrangement shown, as one example, funnel 180 includes an arm 182 that extends downward from the lower end of the cone of funnel 180 that fits within a channel 172 of screen receiver 146 that receives the magnets of the screen receiver 146. The engagement between the arm 182 within the channel 172 connects funnel 180 to screen receiver 146. However, any other manner, method or means of connecting funnel 180 to screen receiver 146 is hereby contemplated for use such as fastening, screwing, bolting, welding, crimping, pinning, adhering, friction fitting or the like. In the arrangement shown, as one example the cone at the upper end of funnel 180 includes a slot 184. In the arrangement shown, as one example, when arm 182 of funnel 180 is inserted within the channel 172 of screen receiver 146, the slot 184 of funnel 180 aligns with the open slot in channel 172 thereby providing access for screen material 96 into the slot of screen receiver 146. The installation of funnel 180 eases the insertion of screen material 96 and interlock 100 into screen receiver 146. In addition, by adding funnel 180 as a second separate piece, which is preferably made out of a smooth yet durable plastic, this reduces the cost of the system 10 while improving performance and longevity.

Track 148:

Track 148 is formed of any suitable size, shape, and design and is configured to be attached to structure 24 along a side 28 of opening 26 and provide an elongate channel 186 configured to receive and hold screen receiver 146 when track assembly 20 is assembled.

In the arrangement shown, as one example, track 148 has a generally rectangular elongated shape extending from an upper end 188 to a lower end 190 with opposing side walls 192 extending between a screen facing side 196 and a screen opposing side 198. In the arrangement shown, elongate channel 186 is a generally c-shaped channel formed by the side walls 192 and an end wall 202 extending between the opposing side wall 192 with a channel opening 200 in screen facing side 196.

In one or more arrangements, elongate channel 186 is configured to receive and hold screen receiver 146 within a compartment 206 between side walls 192 that is formed by a set of inner partitions 210 and a set of outer partitions 214. Inner partitions 210 are positioned on opposing side walls 192 closer towards screen facing side 196 and extend inward a distance towards the interior of the elongate channel 186. Outer partitions 214 are positioned on opposing side walls 192 further from screen facing side 196 and extend inward a distance towards the interior of the elongate channel 186. The compartment 206 is adapted to securely receive the screen receiver 146 while allowing for lateral movement of screen receiver 146 toward and away from screen 14 between inner partitions 210 and outer partitions 214.

Hurricane Bracket 370:

In one arrangement, system 10 is used in association with a hurricane bracket 370. Hurricane bracket 370 is formed of any suitable size, shape and design and is configured to strengthen system 10 so that it can withstand hurricane strength winds. In many applications of system 10, hurricanes and other wind events are present. To combat damage from hurricanes, as well as to meet hurricane building codes, in one arrangement, a hurricane bracket 370 is used which strengthens magnetic track assembly 20, or more specifically elongate channel 186, so that it will not deform and allow screen receiver 146 to escape the hollow compartment 146 of elongate channel 186 even under the strongest of winds.

Figure 25:
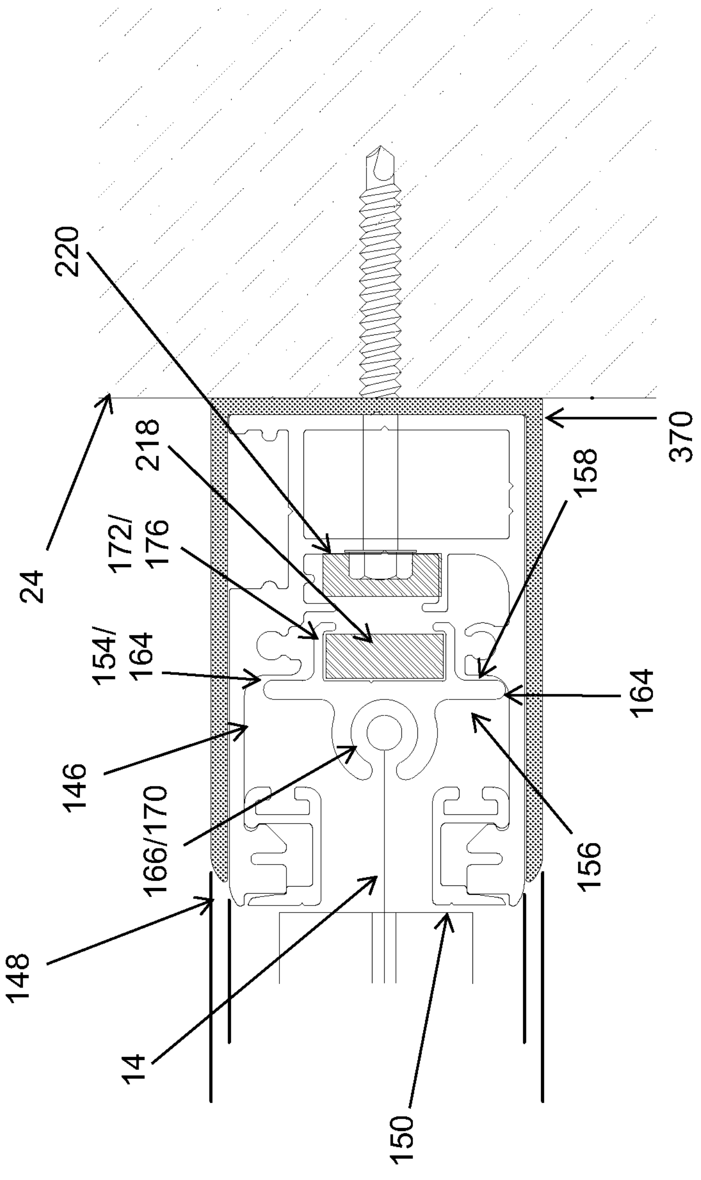
FIG. 25 shows a cross sectional top view of a magnetic track assembly for a retractable screen system, in accordance with one or more embodiments; the view showing a track attached to a structure with an interior mount orientation; the view showing a screen receiver positioned within an elongated channel of the track and a screen connected to the screen receiver; the view showing retainers attached to inner partitions of the track; the view showing a reinforcing bracket installed on the track.

With reference to FIG. 25, as one example, a hurricane bracket 370 is presented having an end wall, a forward wall, and a rearward wall that form a hollow interior that is sized and shaped to receive a magnetic track assembly 20 therein with close and tight, and in some cases frictional engagement and/or locking engagement, and is configured to provide strength and rigidity to the magnetic track assembly 20 so as to strengthen it to be hurricane proof. In the arrangement shown, as one example, the forward wall and the rearward wall are spaced apart just far enough to receive the width of magnetic track assembly 20 therein. In the arrangement shown, as one example, hurricane bracket 370 extends length that is just long enough to extend to and/or past the length of the forward and rearward sides of magnetic track assembly 20 therein. In this way, when hurricane bracket 370 is used, magnetic track assemblies 20 are wholly or fully received within the hollow interior of hurricane bracket 370.

Figure 26:
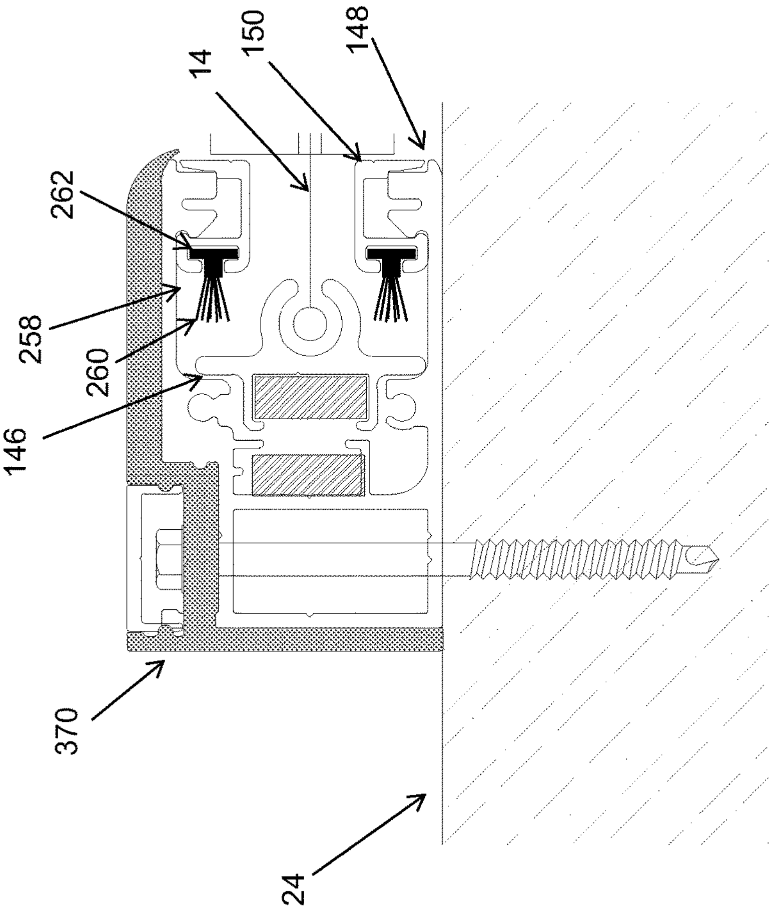
FIG. 26 shows a cross sectional top view of a magnetic track assembly for a retractable screen system, in accordance with one or more embodiments; the view showing a track attached to a structure with an exterior mount orientation; the view showing a screen receiver positioned within an elongated channel of the track and a screen connected to the screen receiver; the view showing retainers attached to inner partitions of the track; the view showing sound damping brushes attached to the retainers; the view showing a reinforcing bracket installed on the track.
Figure 27:
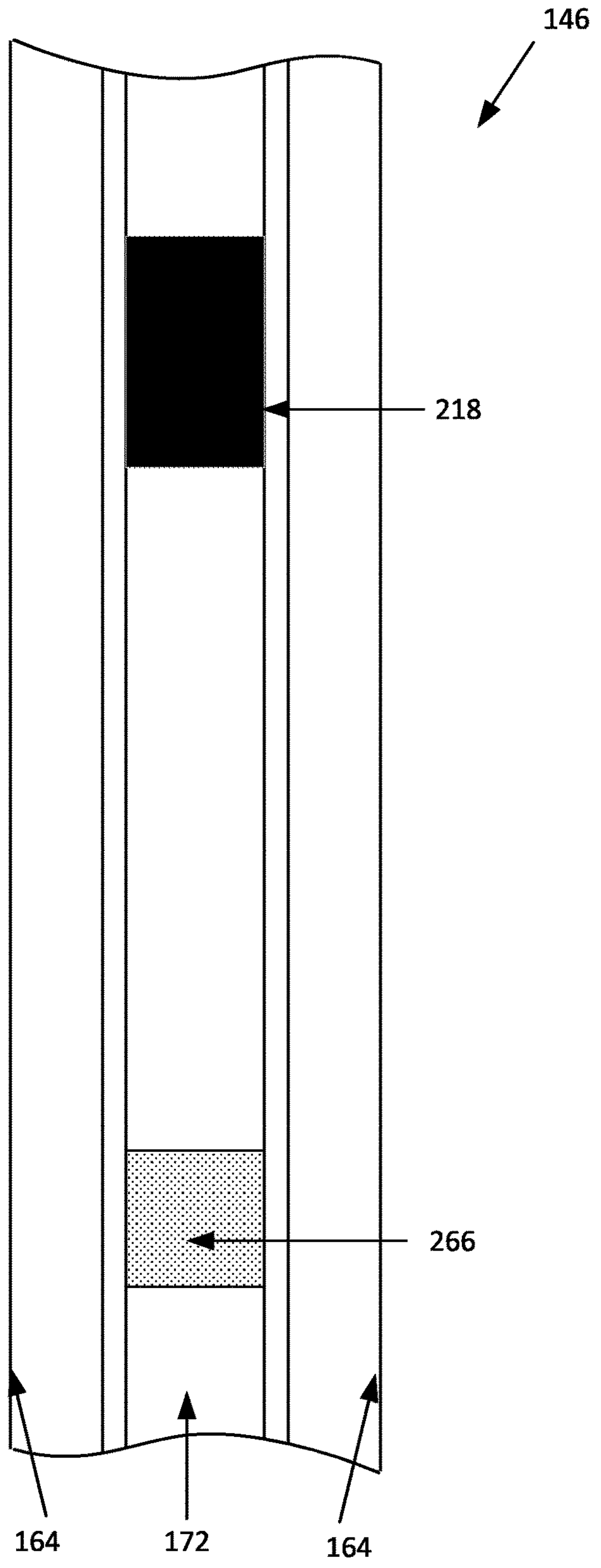
FIG. 27 shows a channel facing side view of a screen receiver for a track for a retractable screen system, in accordance with one or more embodiments; the view showing a magnet and a sound dampener formed of a compressible material positioned within a channel of the screen receiver.
Figure 28:
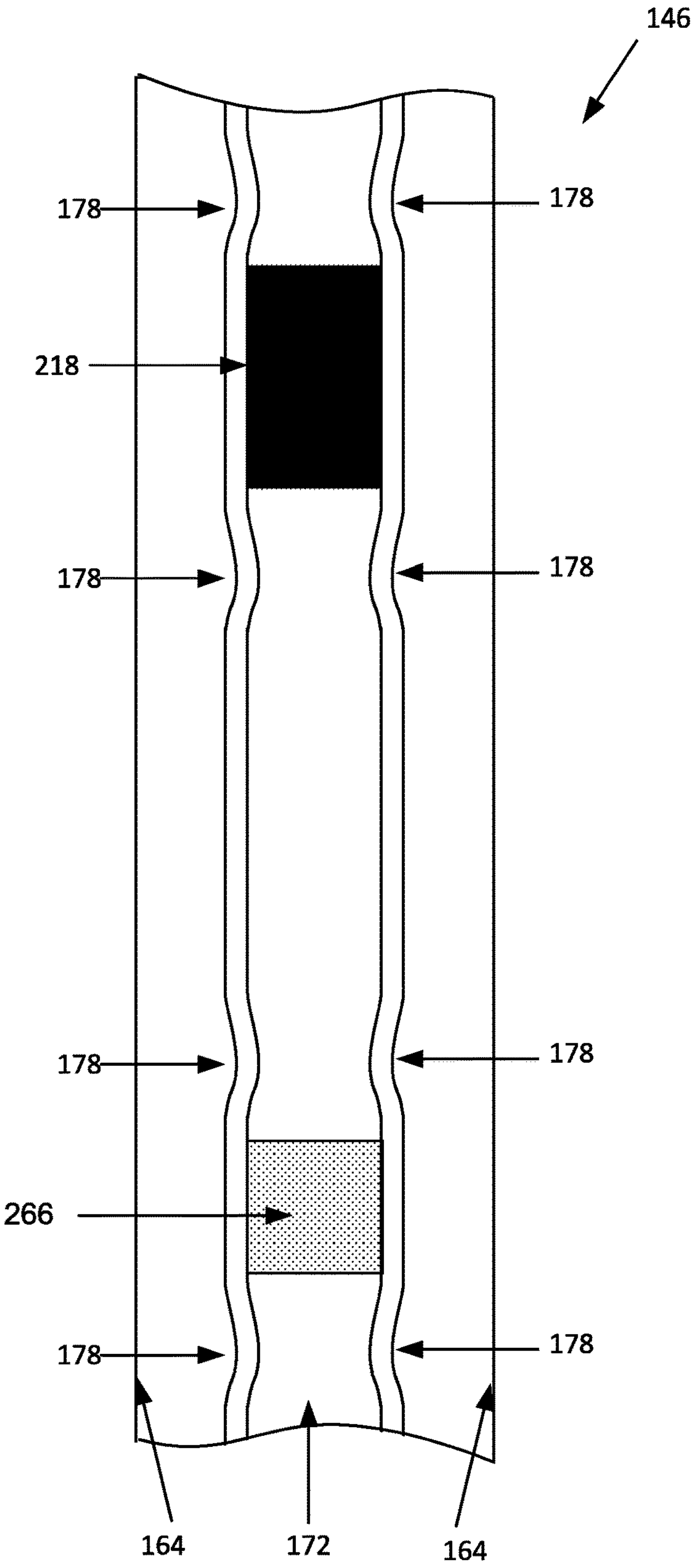
FIG. 28 shows a channel facing side view of the screen receiver shown in FIG. 27, in accordance with one or more embodiments; the view showing side walls of the channel of the screen receiver crimped to hold the magnet and sound dampener in place within the channel.
Figure 29:
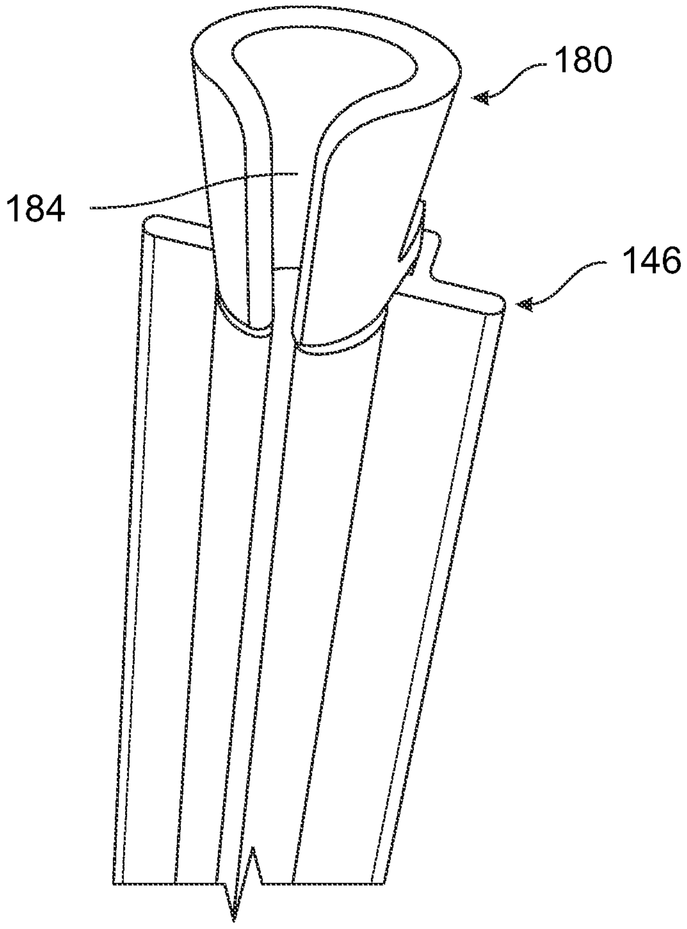
FIG. 29 shows an upper screen facing side perspective view of an upper portion of a screen receiver for a track for a retractable screen system, in accordance with one or more embodiments; the view showing a funnel attached to an upper end of the screen receiver to facilitate insertion of an interlock of the screen into an opening of a channel of the screen receiver.
Figure 30:
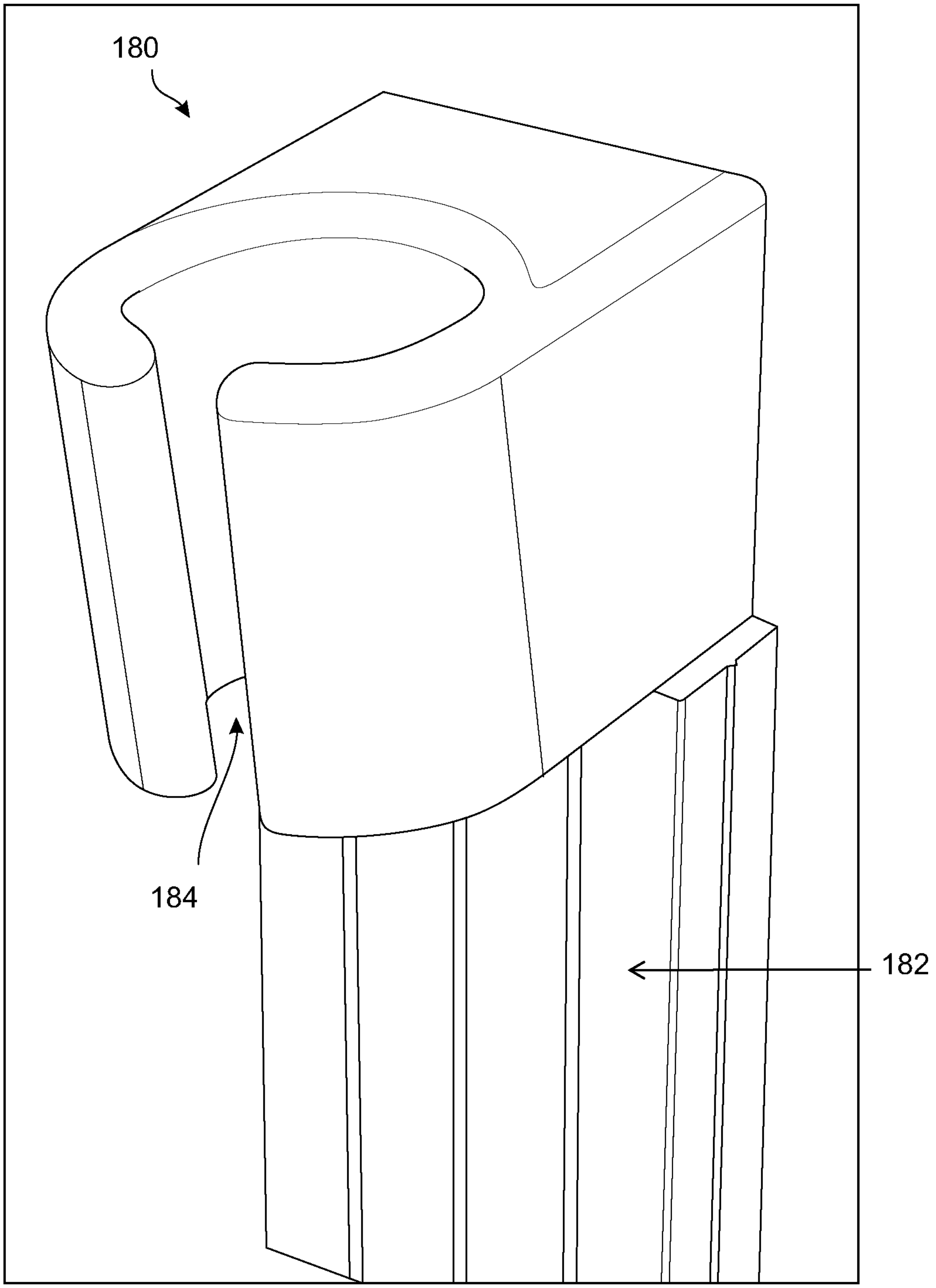
FIG. 30 shows an upper screen facing side perspective view of funnel configured to attach to an upper end of a screen receiver facilitate insertion of an interlock of the screen into an opening of a channel of the screen receiver.
Figure 31:
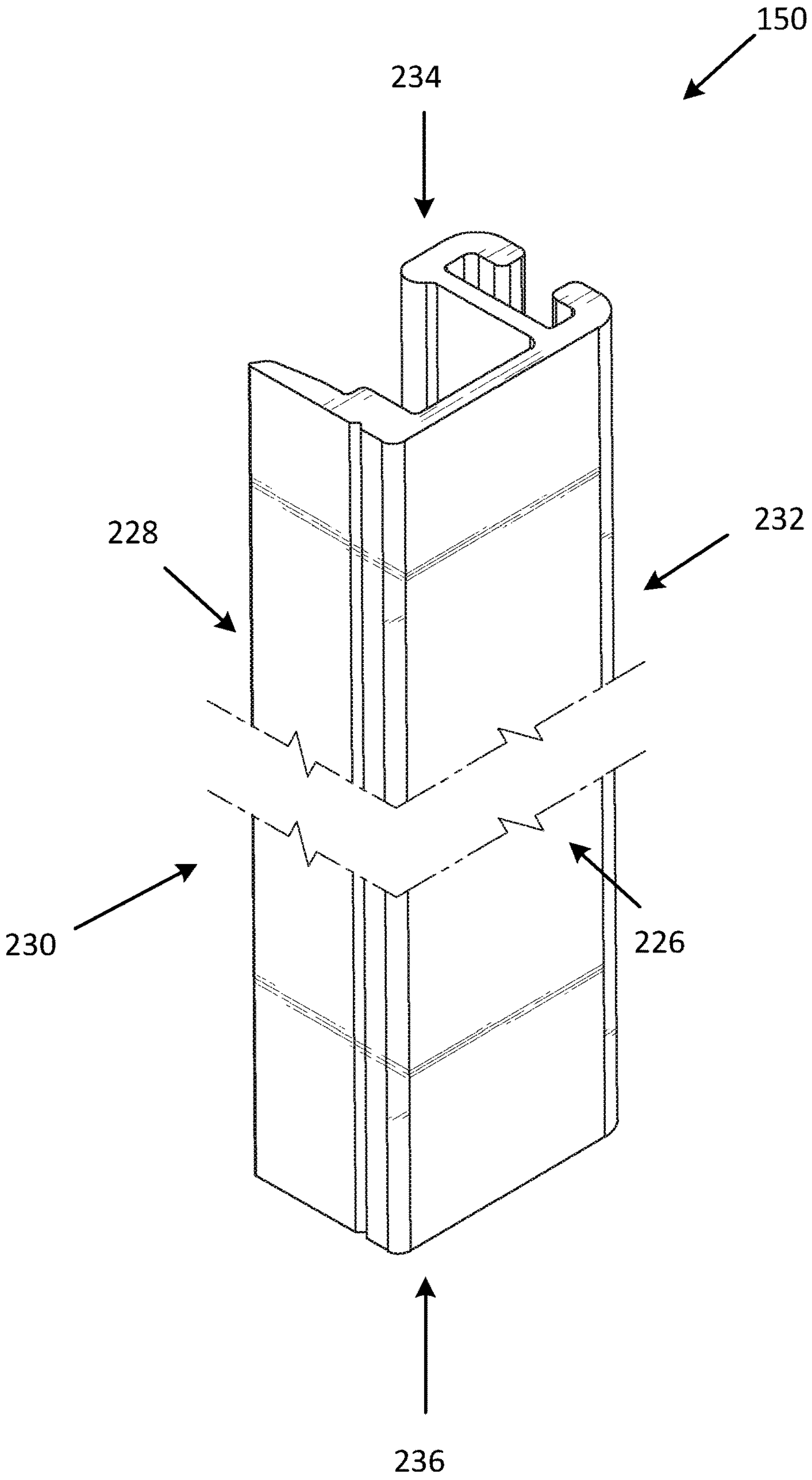
FIG. 31 shows an upper screen facing inward facing side perspective view of a retainer for use with a magnetic track assembly for a retractable screen system, in accordance with one or more embodiments.
Figure 32:
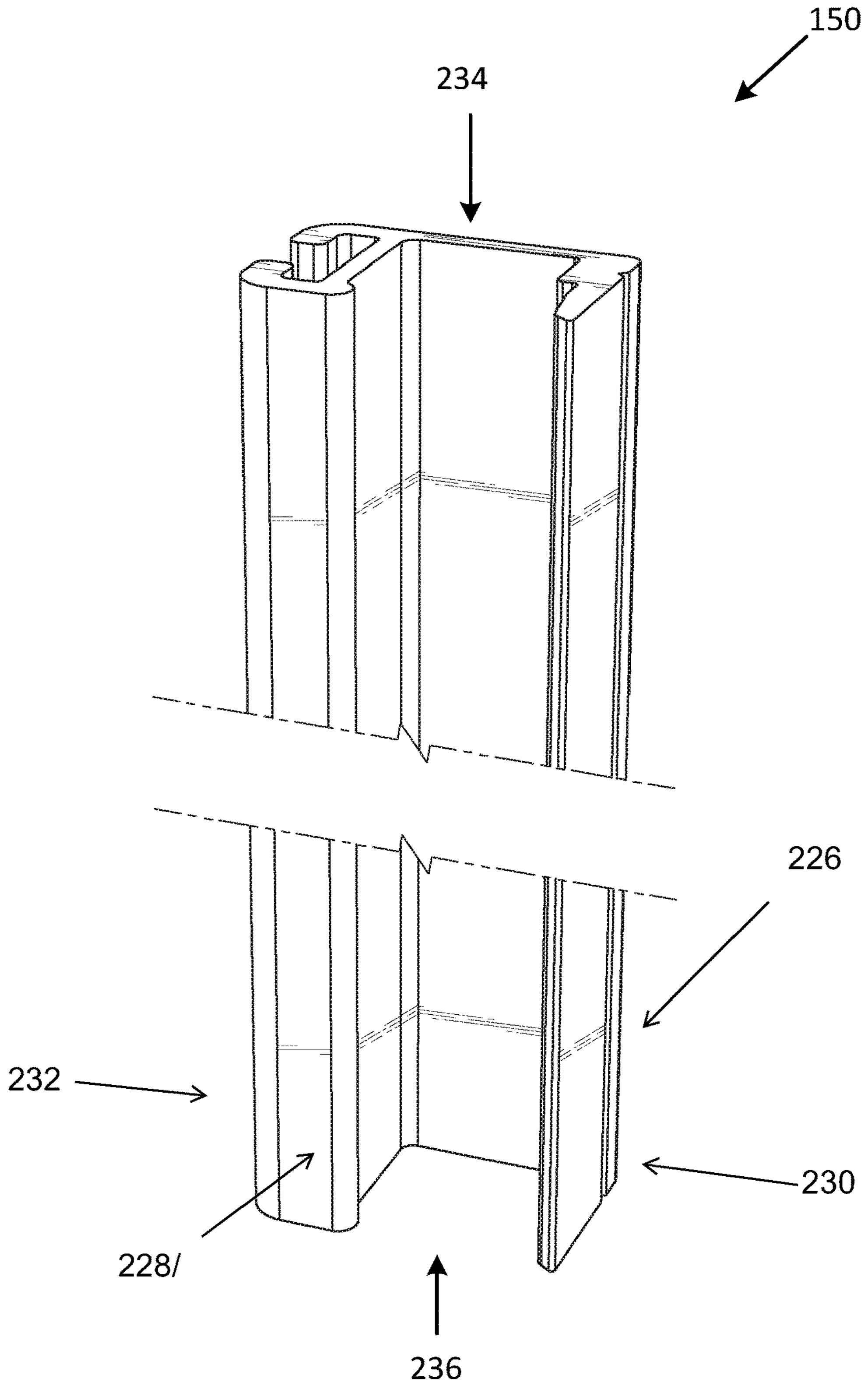
FIG. 32 shows an upper screen facing outward facing side perspective view of a retainer for use with a magnetic track assembly for a retractable screen system, in accordance with one or more embodiments.
Figure 33:
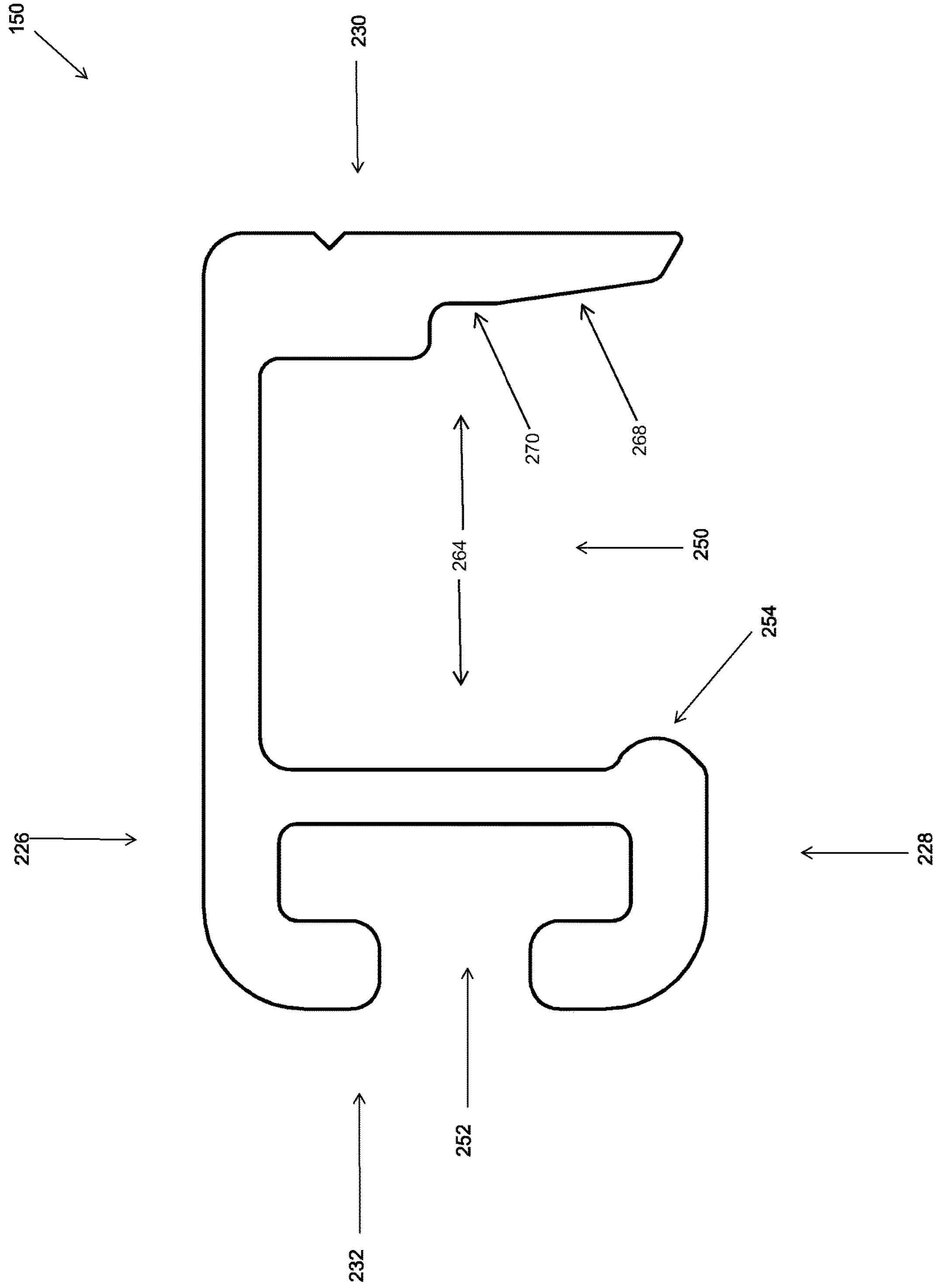
FIG. 33 shows a cross sectional top view of a retainer for use with a magnetic track assembly for a retractable screen system, in accordance with one or more embodiments.
Figure 34:
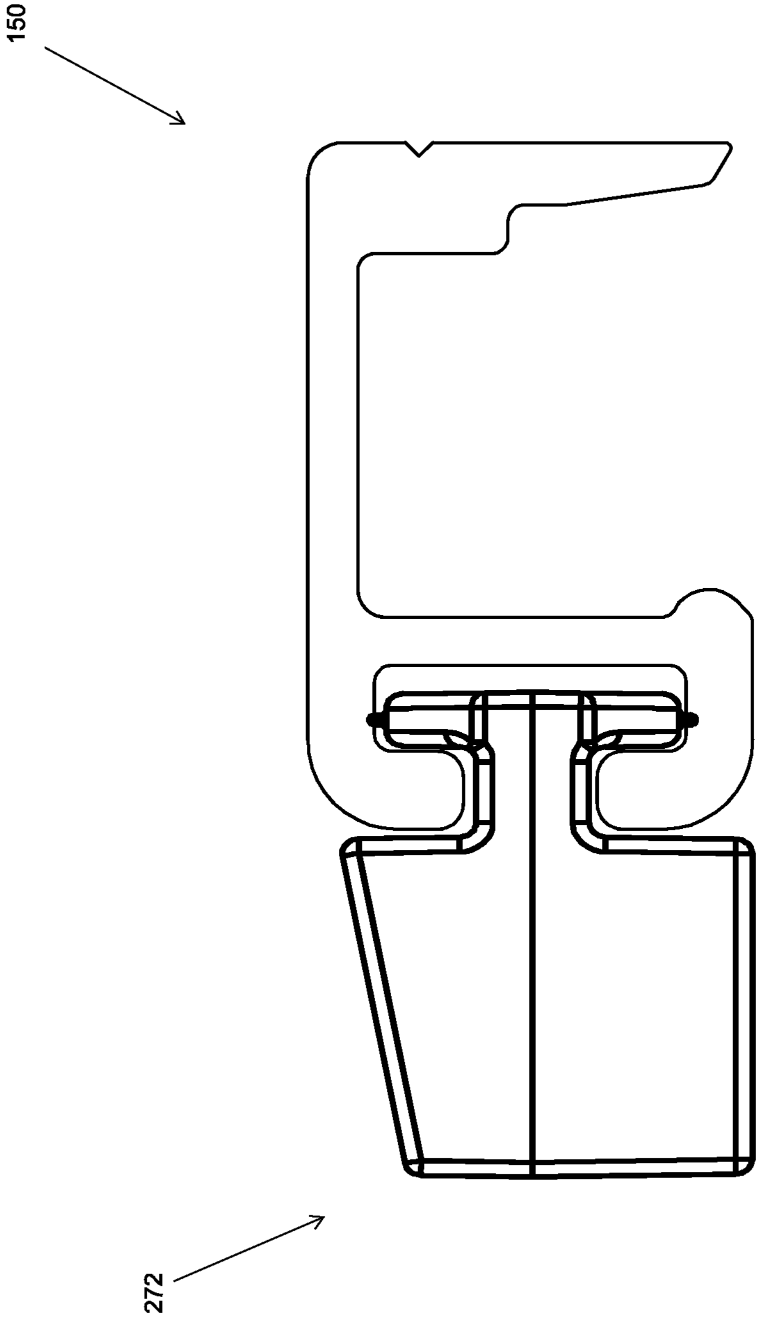
FIG. 34 shows a cross sectional top view of a retainer for use with a magnetic track assembly for a retractable screen system, in accordance with one or more embodiments; the view showing a retainer extension attached to the retainer.
Figure 35:
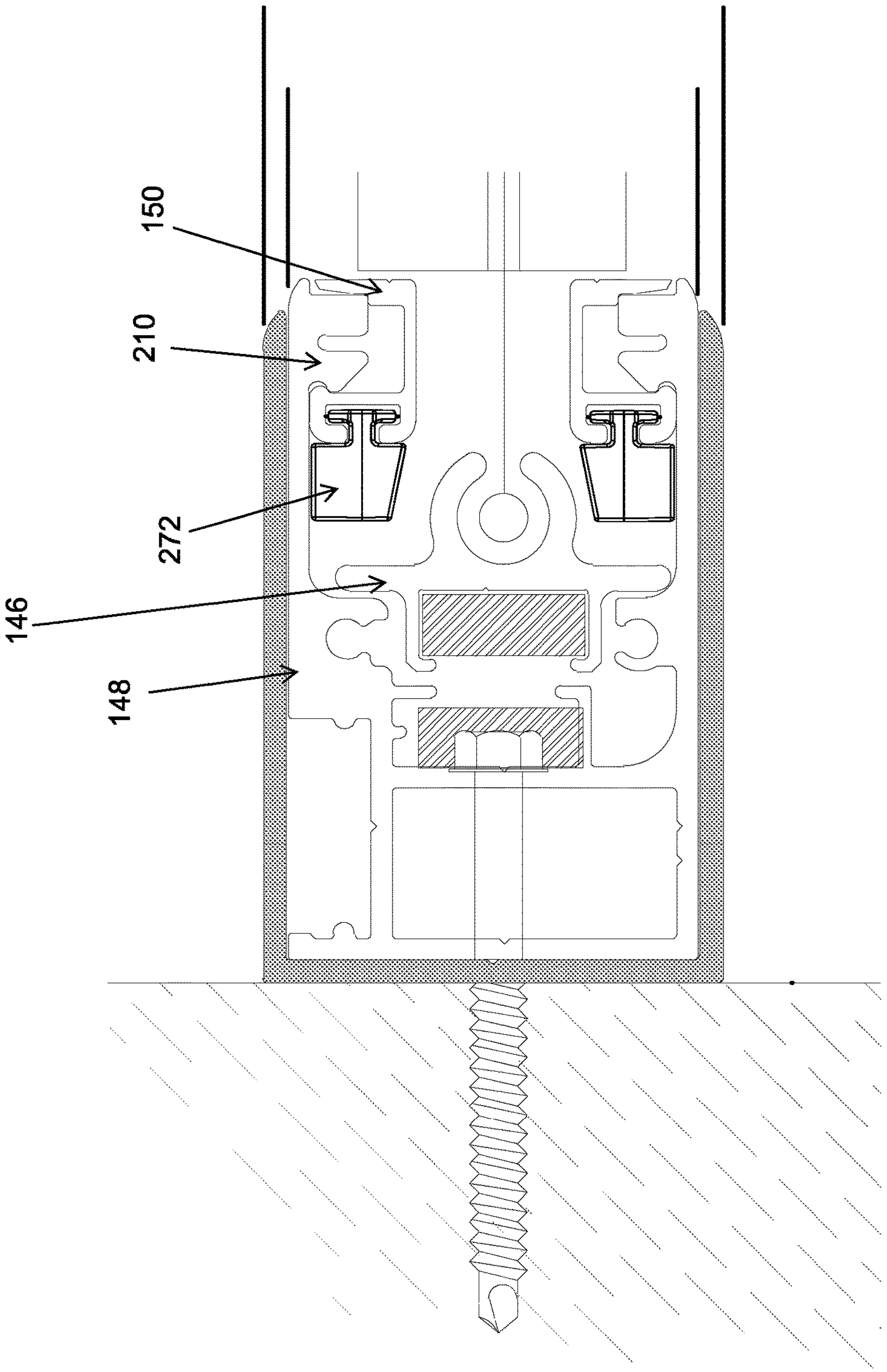
FIG. 35 shows a cross sectional top view of a magnetic track assembly for a retractable screen system, in accordance with one or more embodiments; the view showing a track attached to a structure with an interior mount orientation; the view showing a screen receiver positioned within an elongated channel of the track and a screen connected to the screen receiver; the view showing retainers attached to inner partitions of the track; the view showing retainer extensions attached to the retainers; the view showing a reinforcing bracket installed on the track.
Figure 36:
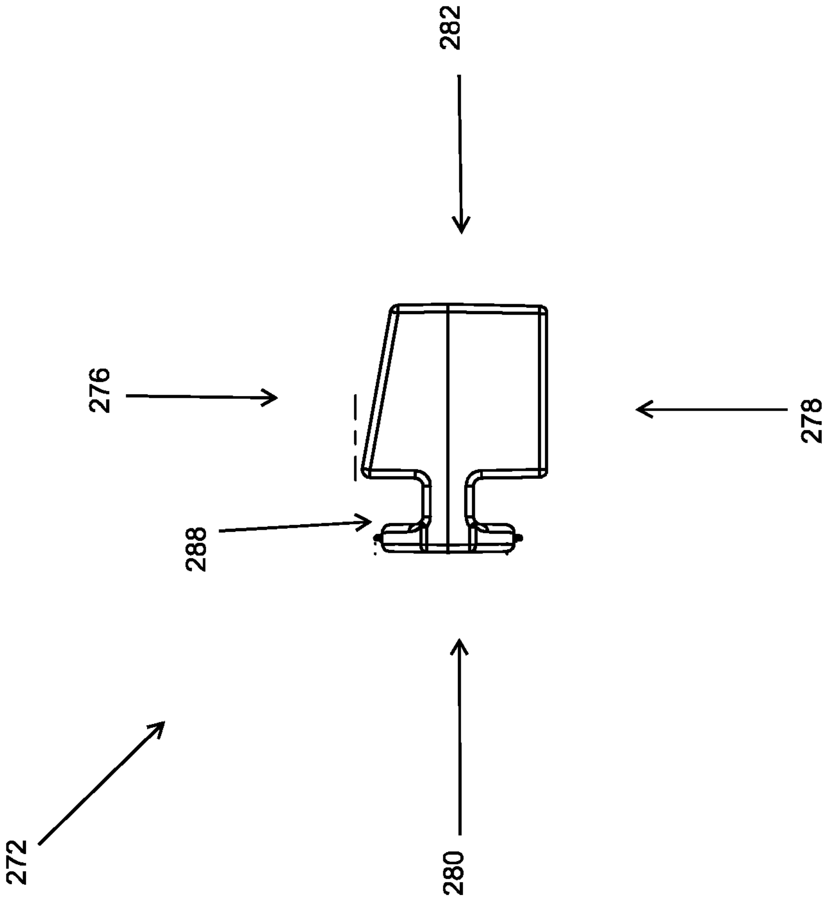
FIG. 36 shows a cross sectional top view of a retainer extension for use with a magnetic track assembly for a retractable screen system, in accordance with one or more embodiments.
Figure 37:
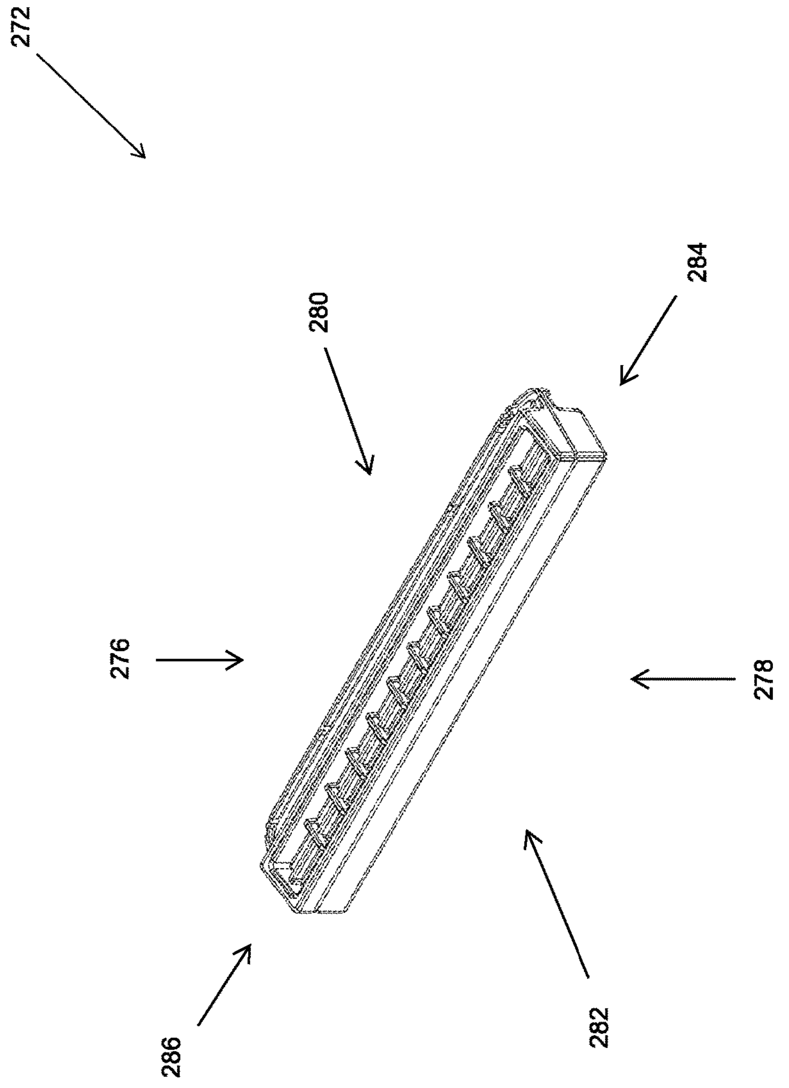
FIG. 37 shows an upper screen opposing outward side perspective view of a retainer extension for use with a magnetic track assembly for a retractable screen system, in accordance with one or more embodiments.
Figure 38:
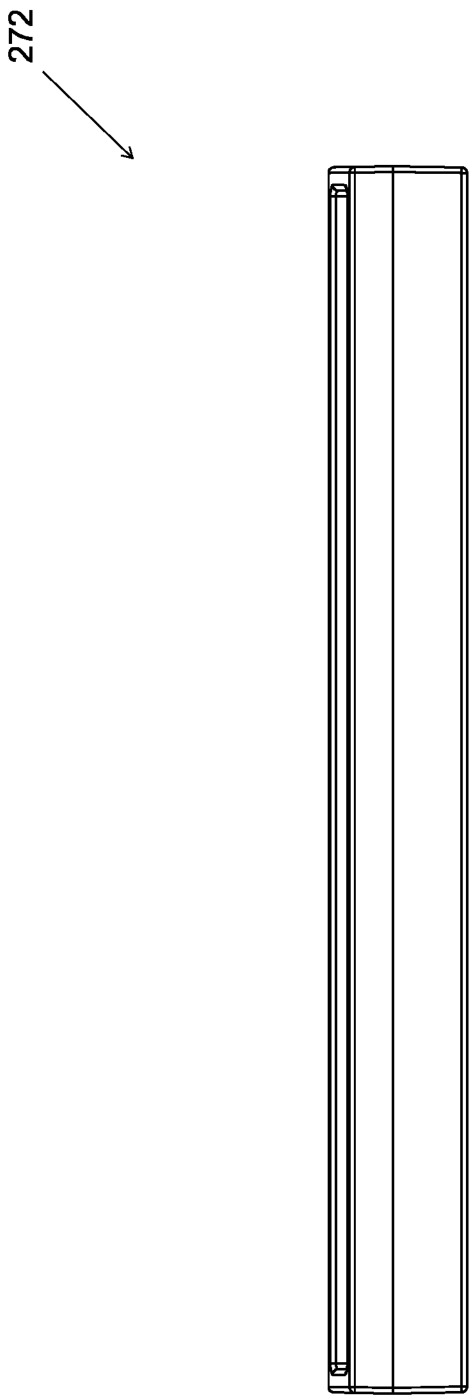
FIG. 38 shows an inward side view of a retainer extension for use with a magnetic track assembly for a retractable screen system, in accordance with one or more embodiments.
Figure 39:
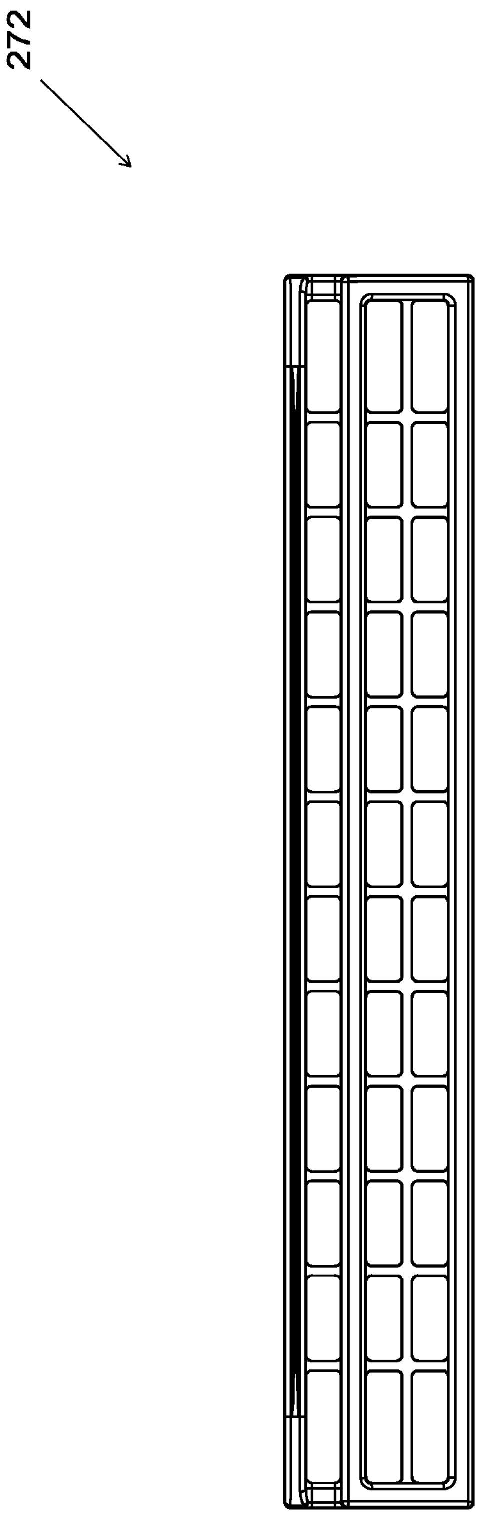
FIG. 39 shows an outward side view of a retainer extension for use with a magnetic track assembly for a retractable screen system, in accordance with one or more embodiments.
Figure 40:
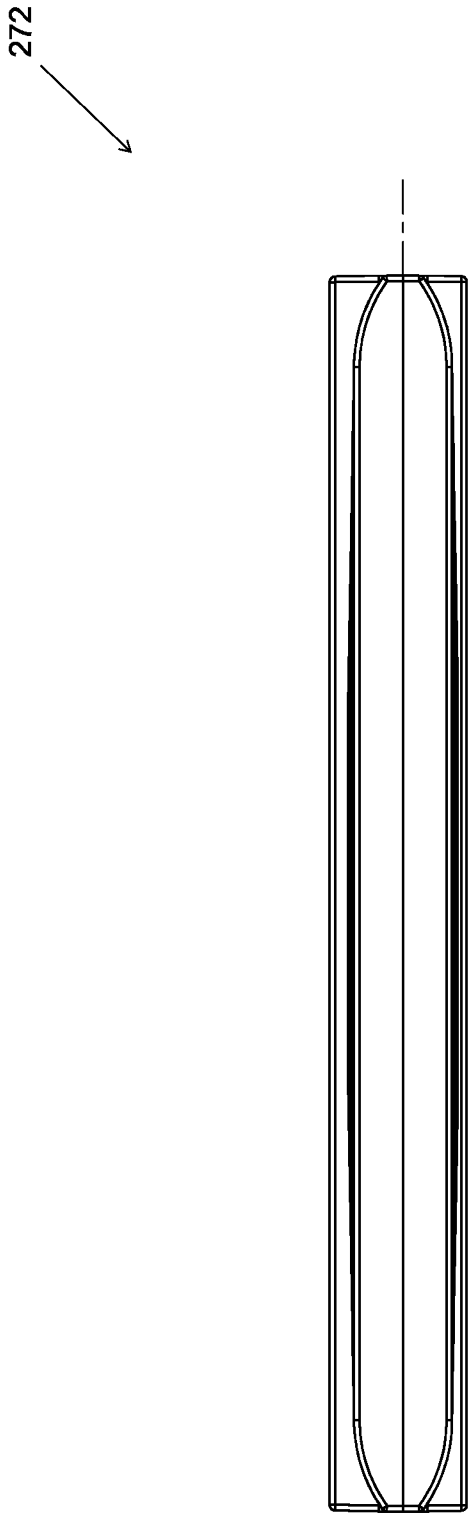
FIG. 40 shows a screen opposing side view of a retainer extension for use with a magnetic track assembly for a retractable screen system, in accordance with one or more embodiments.
Figure 41:
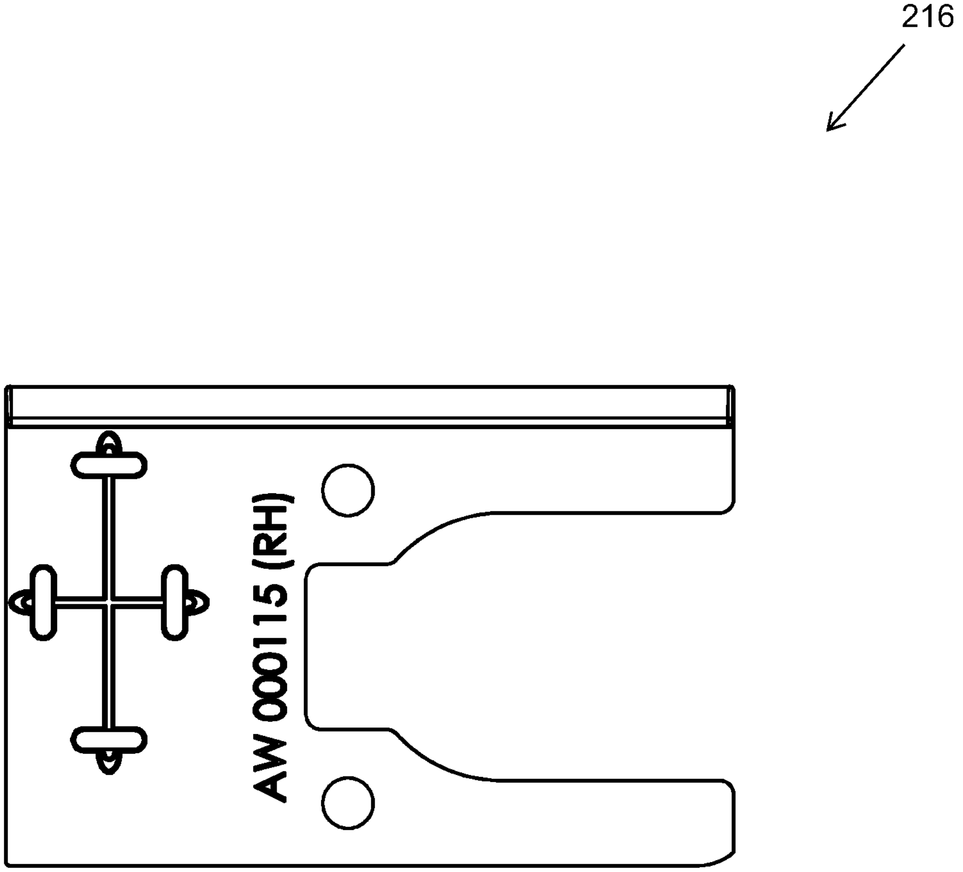
FIG. 41 shows a bottom view of an example end cap for track of a magnetic track assembly for a retractable screen system, in accordance with one or more embodiments.
Figure 42:
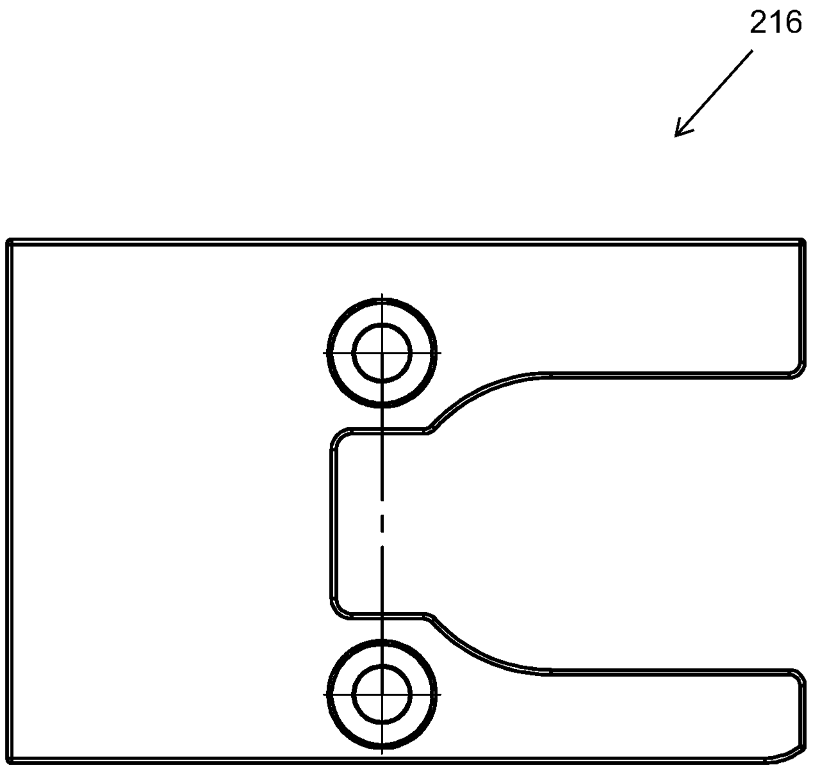
FIG. 42 shows a top view of an example end cap for track of a magnetic track assembly for a retractable screen system, in accordance with one or more embodiments.
Figure 43:
FIG. 43 shows a side view of an example end cap for track of a magnetic track assembly for a retractable screen system, in accordance with one or more embodiments.
Figure 44A:
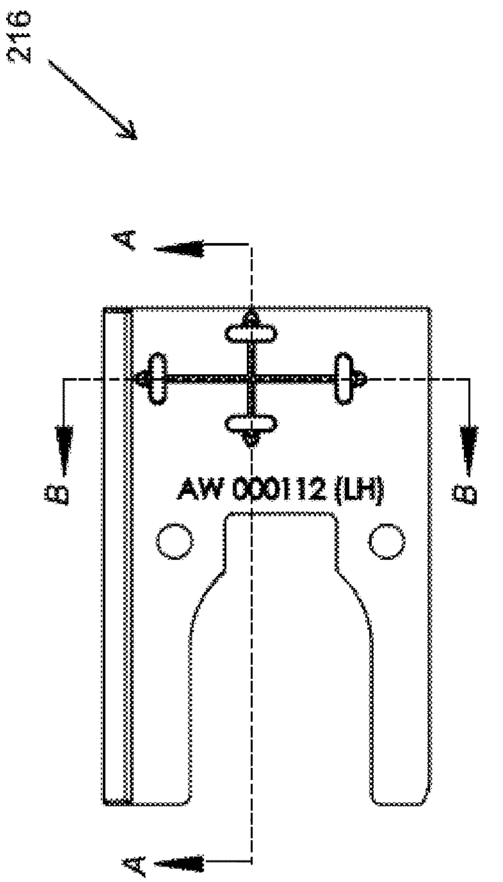
FIG. 44A shows a bottom view of an example end cap for track of a magnetic track assembly for a retractable screen system, in accordance with one or more embodiments.
Figure 44C:
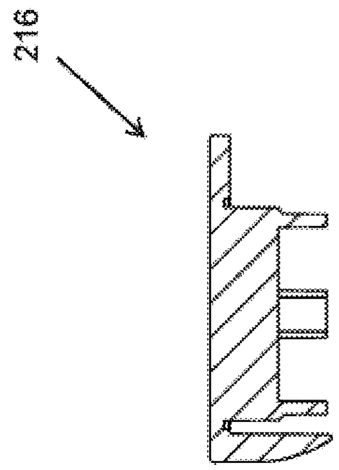
FIG. 44C shows a cross sectional view of cross section B of the example end cap shown in FIG. 43A, in accordance with one or more embodiments.
Figure 44B:
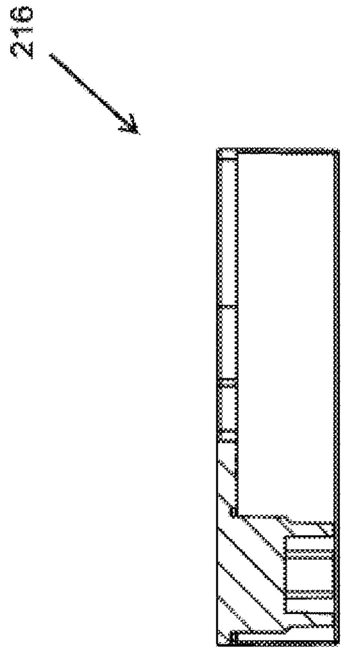
FIG. 44B shows a cross sectional view of cross section A of the example end cap shown in FIG. 43A, in accordance with one or more embodiments.
Figure 45:
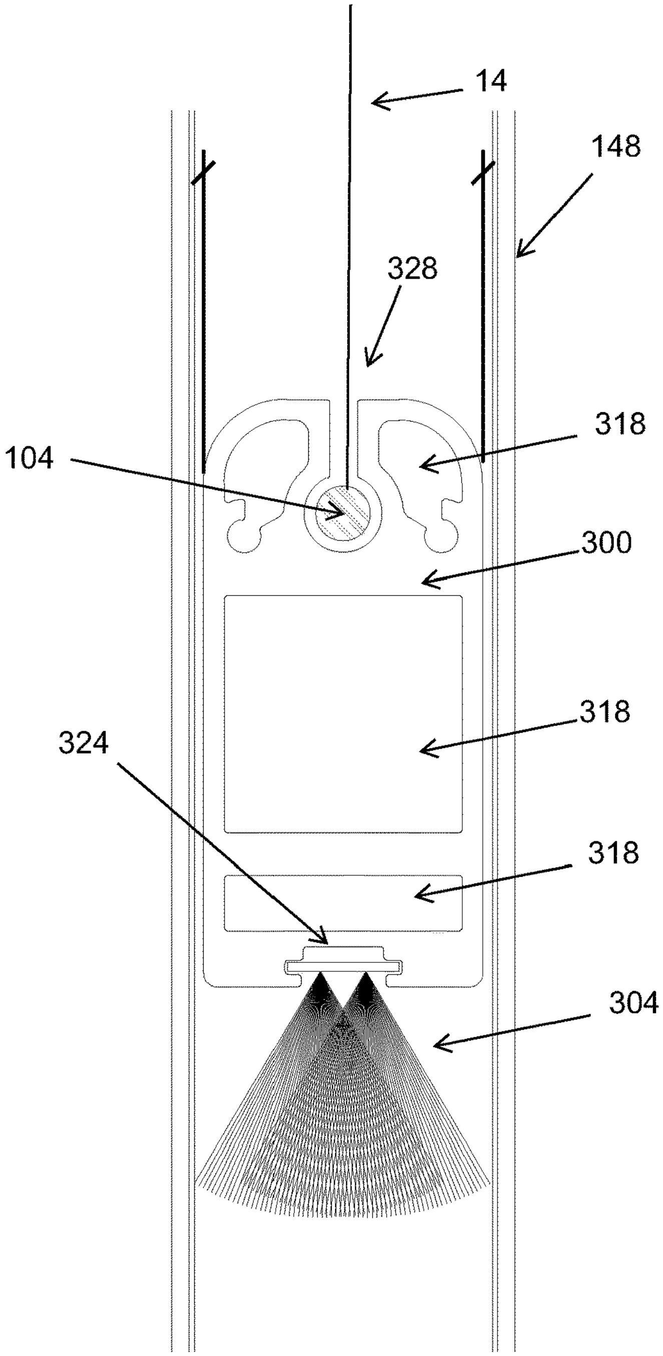
FIG. 45 shows a cross sectional track facing view of a bottom bar assembly and screen of a retractable screen system, in accordance with one or more embodiments.
Figure 46:
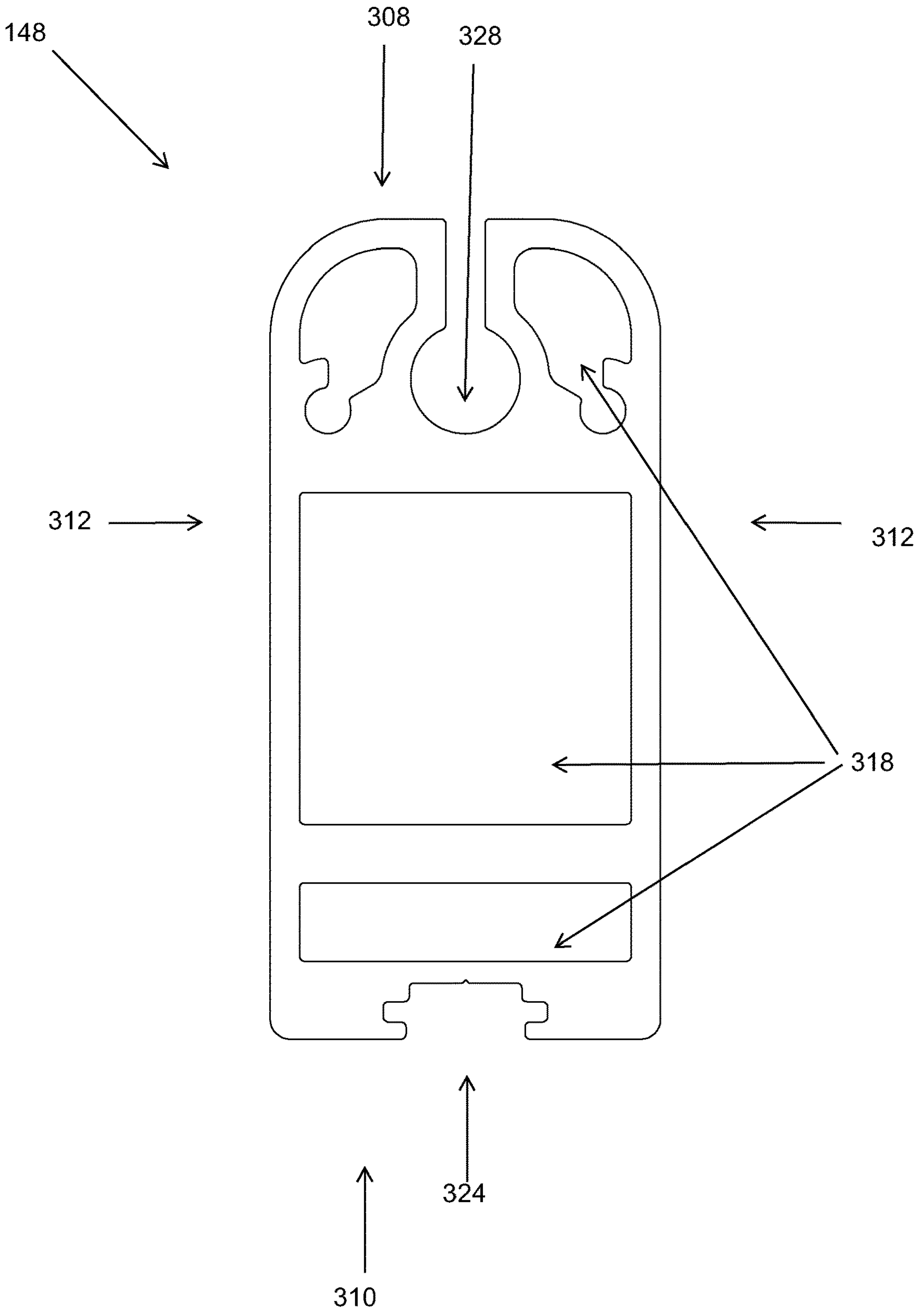
FIG. 46 shows a cross sectional view of a bottom bar of a retractable screen system, in accordance with one or more embodiments.
Figure 47:
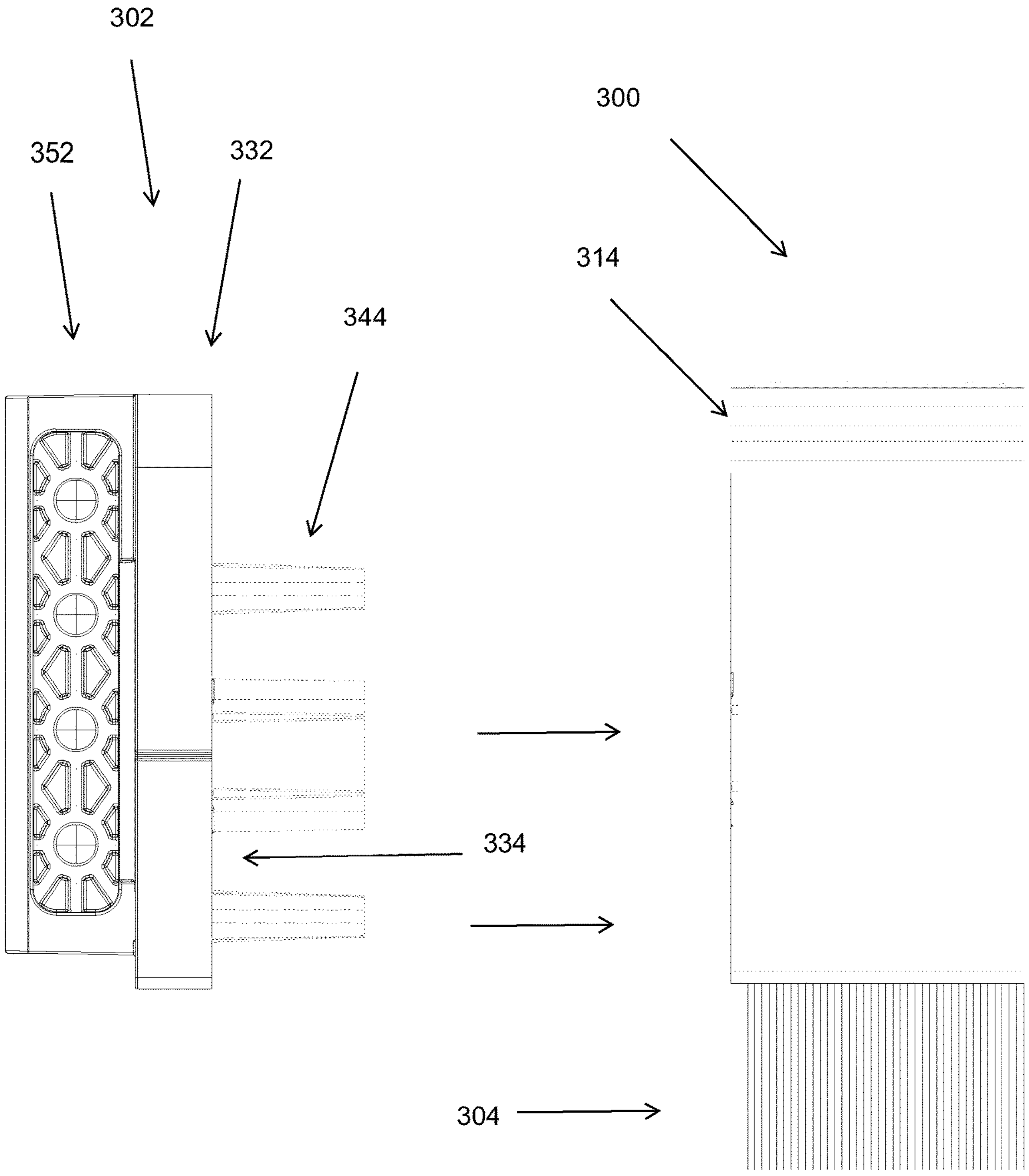
FIG. 47 shows a front view of a bottom bar assembly of a retractable screen system, in accordance with one or more embodiments; the view showing an end bracket detached from a bottom bar of the bottom bar assembly.
Figure 48:
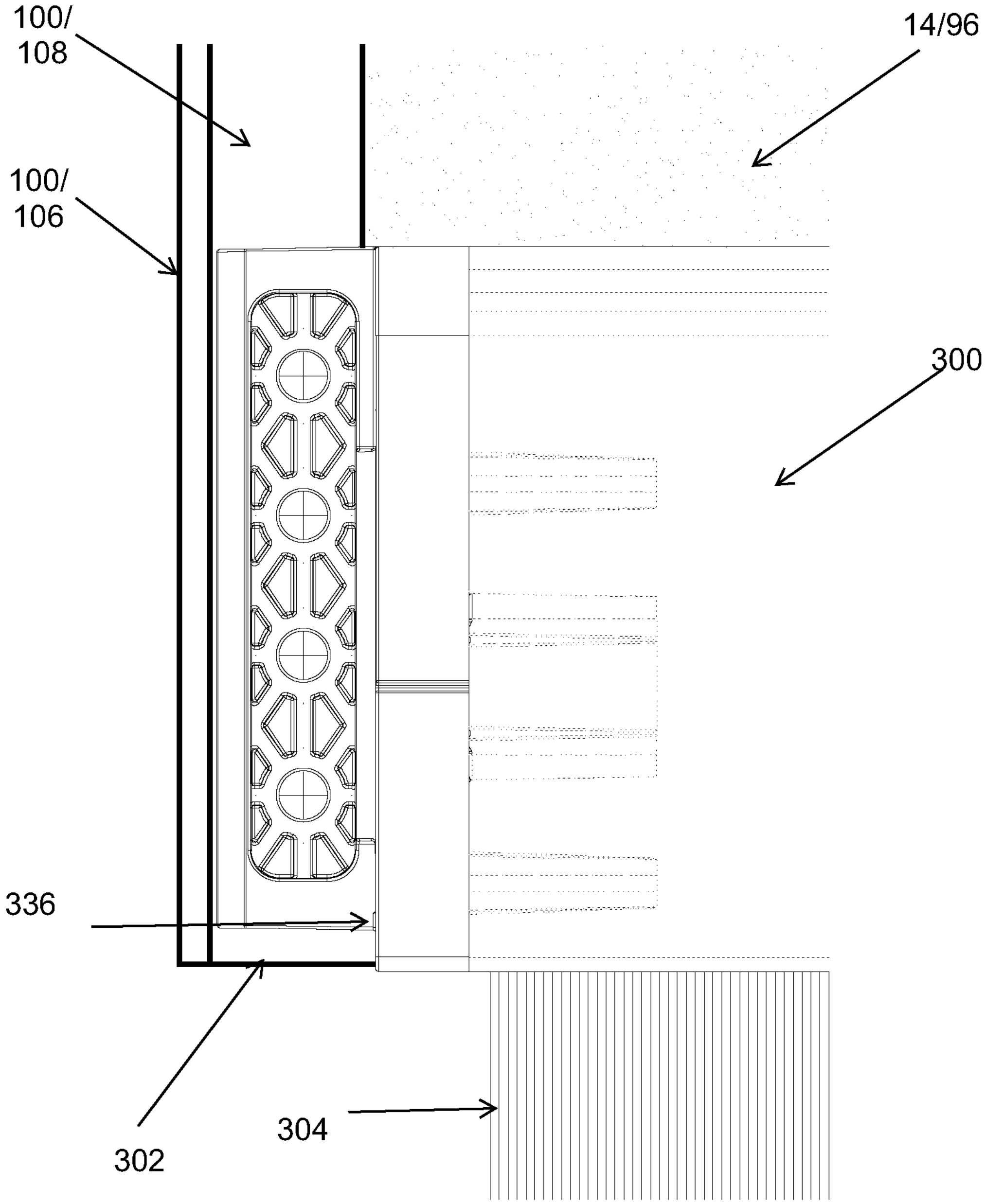
FIG. 48 shows a front view of a bottom bar assembly of a retractable screen system, in accordance with one or more embodiments; the view showing an end bracket inserted into an end of a bottom bar of the bottom bar assembly.
Figure 49:
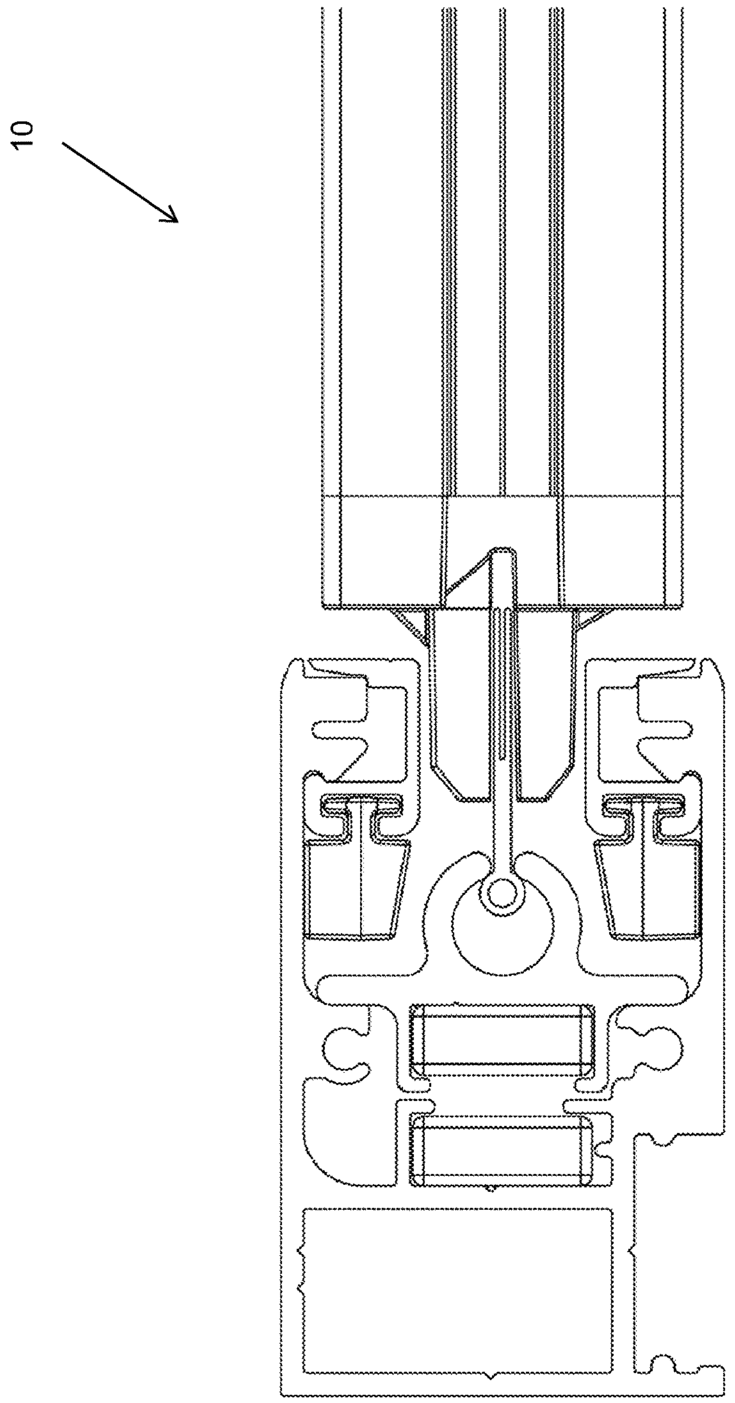
FIG. 49 shows a top cross sectional view of a bottom bar assembly and magnetic track assembly of a retractable screen system, in accordance with one or more embodiments.
Figure 50:
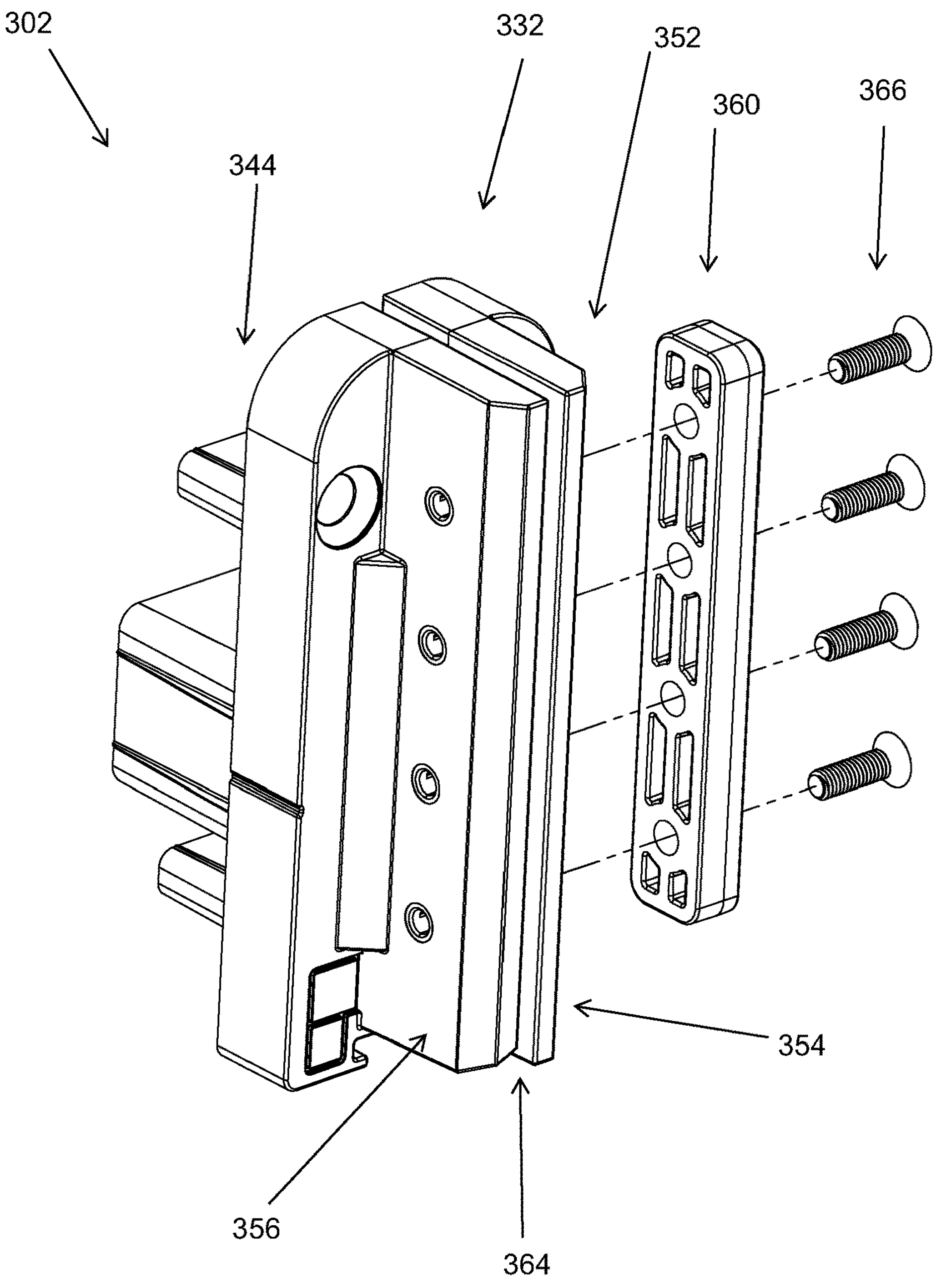
FIG. 50 shows an upper rear screen facing view of an end bracket of a bottom bar assembly of a retractable screen system, in accordance with one or more embodiments.
Figure 51:
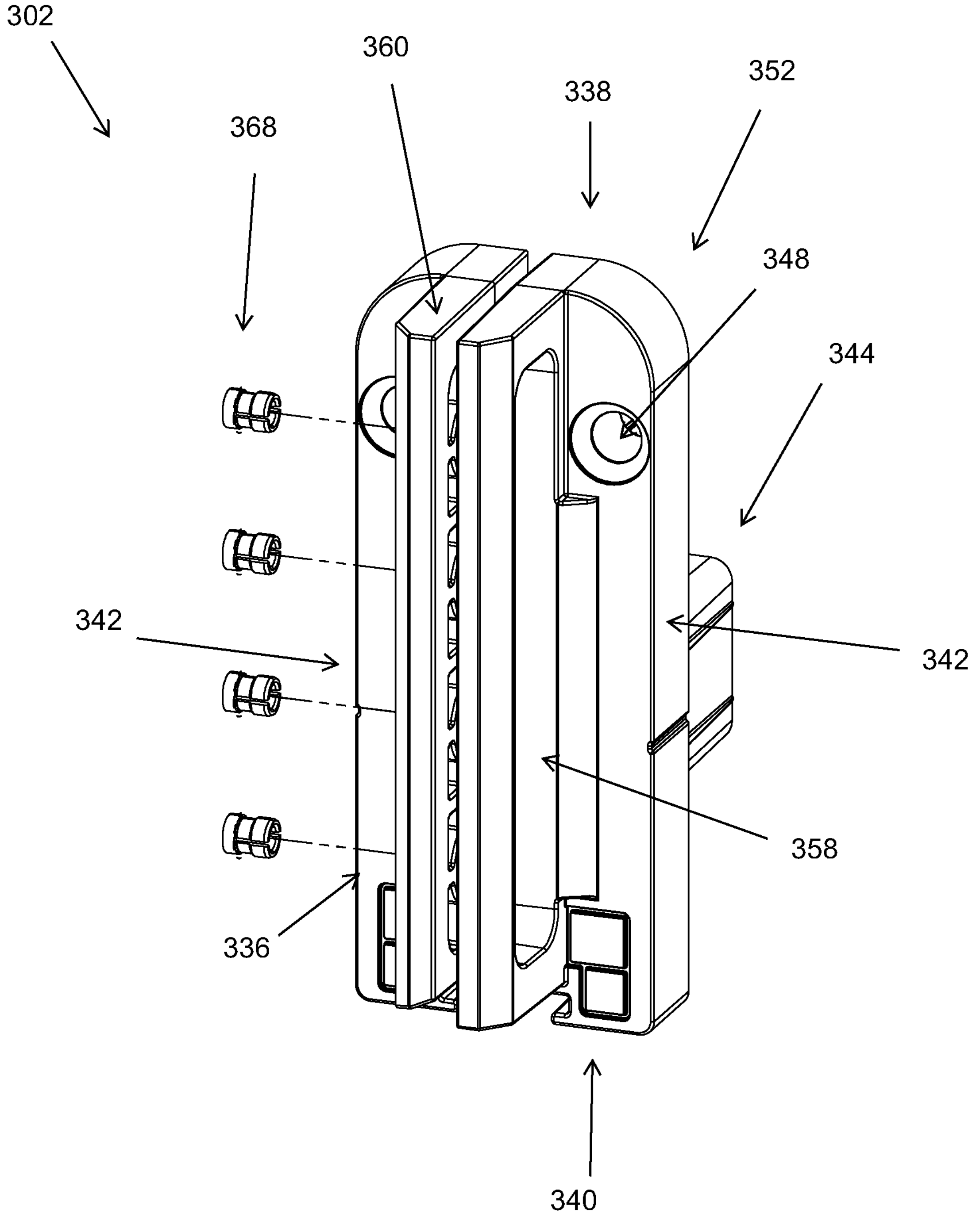
FIG. 51 shows an upper front screen facing view of an end bracket of a bottom bar assembly of a retractable screen system, in accordance with one or more embodiments.
Figure 52:
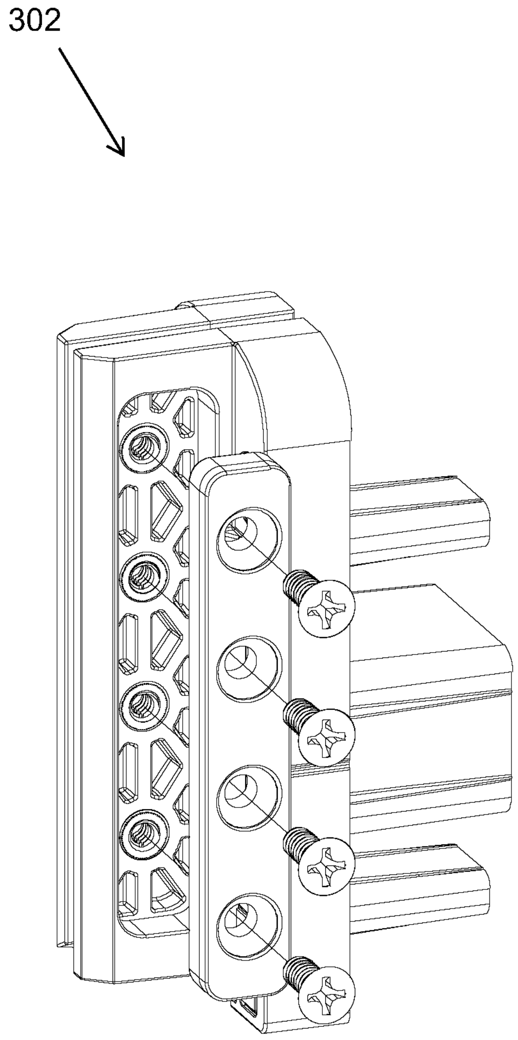
FIG. 52 shows an upper front screen facing view of an end bracket of a bottom bar assembly of a retractable screen system, in accordance with one or more embodiments.
Figure 53:
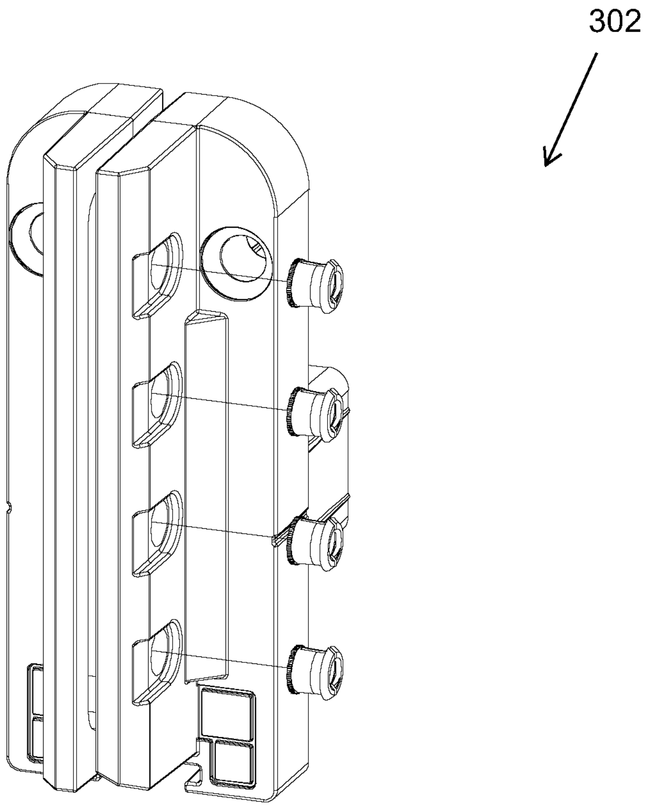
FIG. 53 shows an upper front screen facing view of an end bracket of a bottom bar assembly of a retractable screen system, in accordance with one or more embodiments.
Figure 54:
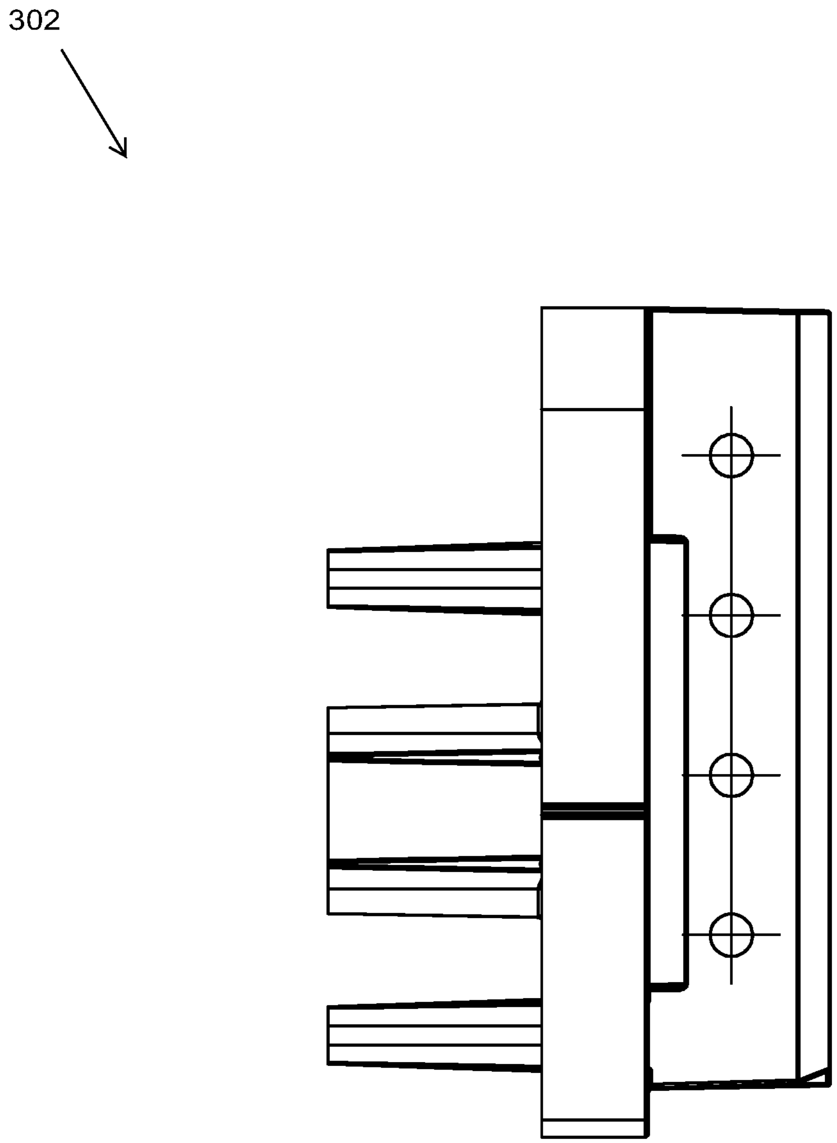
FIG. 54 shows a rear view of an end bracket of a bottom bar assembly of a retractable screen system, in accordance with one or more embodiments.
Figure 55A:
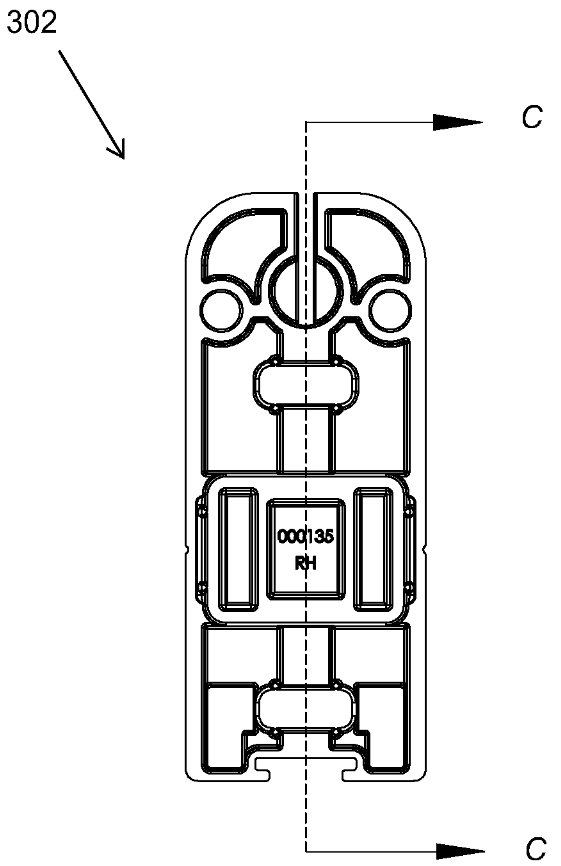
FIG. 55A shows a screen opposing view of an end bracket of a bottom bar assembly of a retractable screen system, in accordance with one or more embodiments.
Figure 55B:
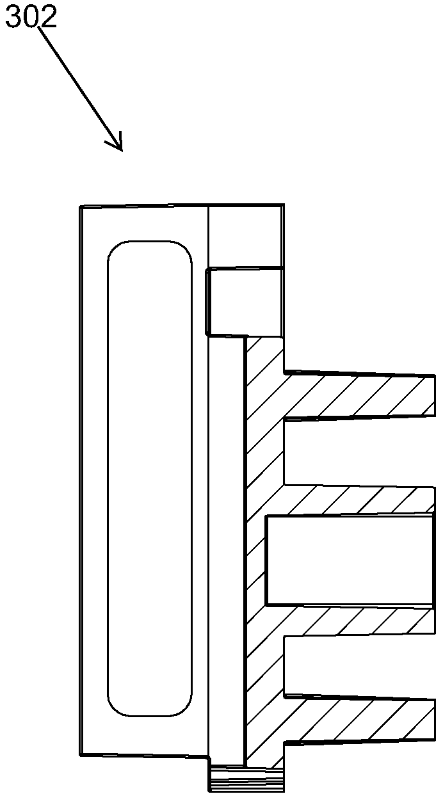
FIG. 55B shows a cross sectional view of cross section c of the end bracket of a bottom bar assembly of a retractable screen system shown in FIG. 55A, in accordance with one or more embodiments.
Figure 56D:
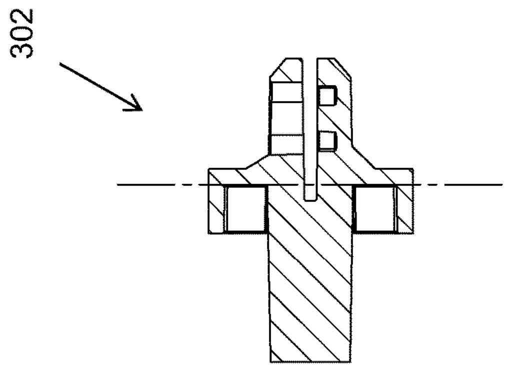
FIG. 56D shows a cross sectional view of cross section D of the end bracket of a bottom bar assembly of a retractable screen system shown in FIG. 56A, in accordance with one or more embodiments.
Figure 56B:
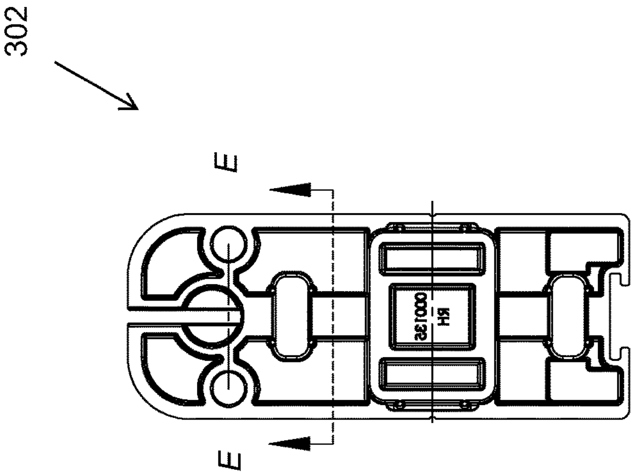
FIG. 56B shows a screen opposing view of an end bracket of a bottom bar assembly of a retractable screen system, in accordance with one or more embodiments.
Figure 56C:
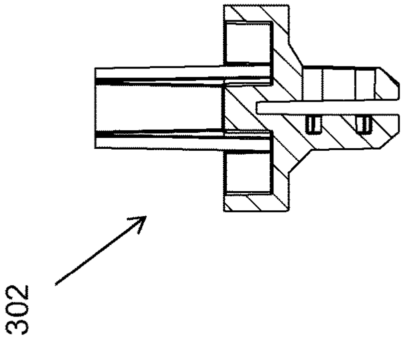
FIG. 56C shows a cross sectional view of cross section E of the end bracket of a bottom bar assembly of a retractable screen system shown in FIG. 56B, in accordance with one or more embodiments.
Figure 56A:
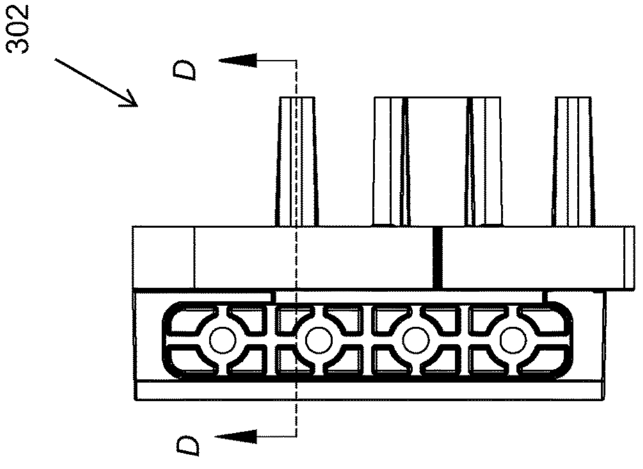
FIG. 56A shows a front view of an end bracket of a bottom bar assembly of a retractable screen system, in accordance with one or more embodiments.
Figure 57A:
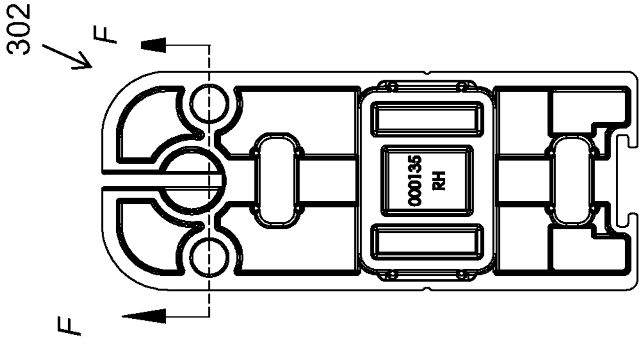
FIG. 57A shows a screen opposing view of an end bracket of a bottom bar assembly of a retractable screen system, in accordance with one or more embodiments.
Figure 57B:
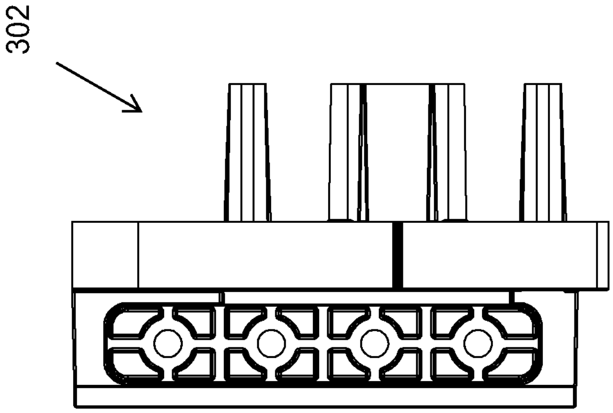
FIG. 57B shows a front view of an end bracket of a bottom bar assembly of a retractable screen system, in accordance with one or more embodiments.
Figure 57C:
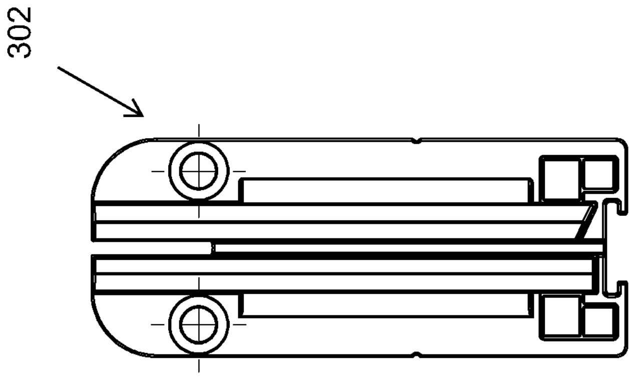
FIG. 57C shows a screen facing view of an end bracket of a bottom bar assembly of a retractable screen system, in accordance with one or more embodiments.
Figure 57D:
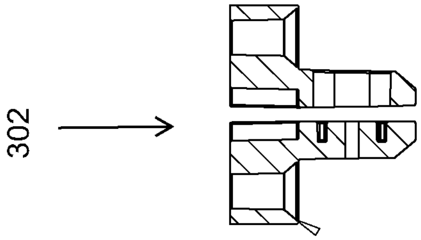
FIG. 57D shows a cross sectional view of cross section F of the end bracket of a bottom bar assembly of a retractable screen system shown in FIG. 57A, in accordance with one or more embodiments.
Figure 57E:
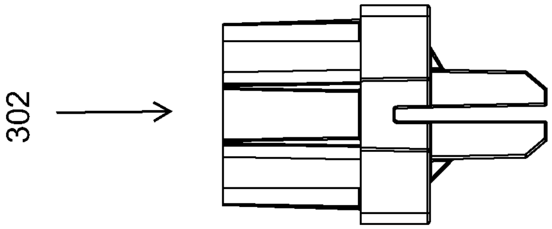
FIG. 57E shows a top view of an end bracket of a bottom bar assembly of a retractable screen system, in accordance with one or more embodiments.
Figure 58D:
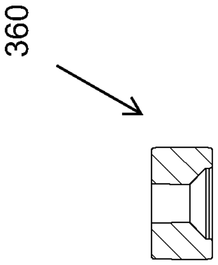
FIG. 58D shows a cross sectional view of cross section G of the place of the end bracket of a bottom bar assembly of a retractable screen system shown in FIG. 58A, in accordance with one or more embodiments.
Figure 58E:
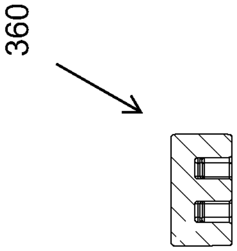
FIG. 58E shows a cross sectional view of cross section H of the place of the end bracket of a bottom bar assembly of a retractable screen system shown in FIG. 58A, in accordance with one or more embodiments.
Figure 58C:
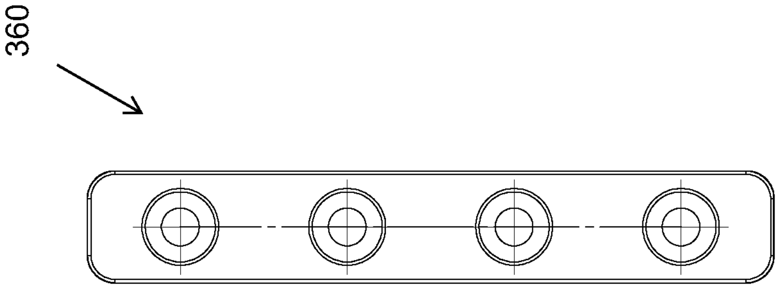
FIG. 58C shows a front view of a plate of an end bracket of a bottom bar assembly of a retractable screen system, in accordance with one or more embodiments.
Figure 58B:
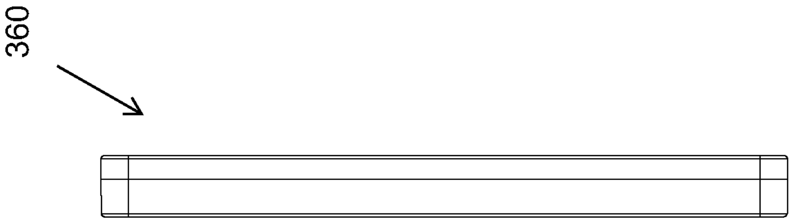
FIG. 58B shows a screen facing side view of a plate of an end bracket of a bottom bar assembly of a retractable screen system, in accordance with one or more embodiments.
Figure 58A:
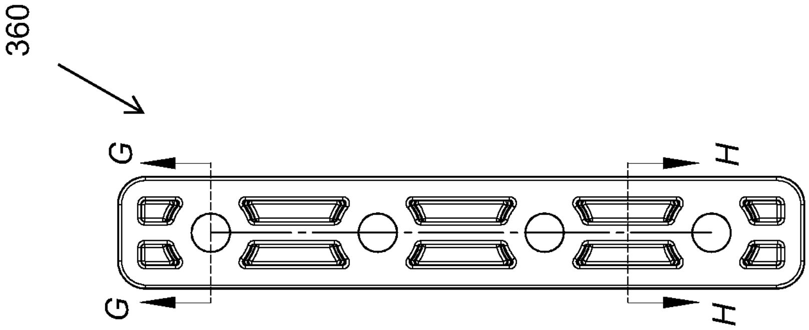
FIG. 58A shows a rear view of a plate of an end bracket of a bottom bar assembly of a retractable screen system, in accordance with one or more embodiments.
Figure 59B:
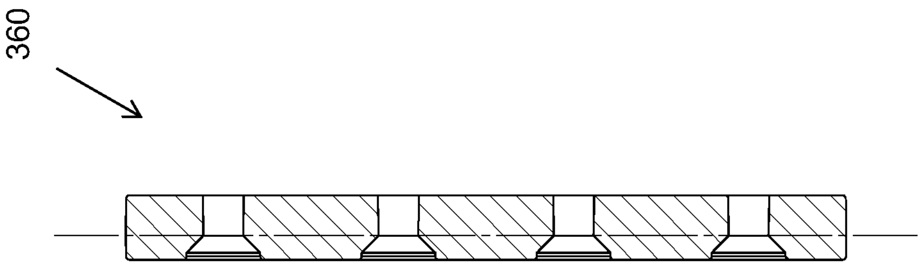
FIG. 59B shows a cross sectional view of cross section I of the place of the end bracket of a bottom bar assembly of a retractable screen system shown in FIG. 59A, in accordance with one or more embodiments.
Figure 59A:
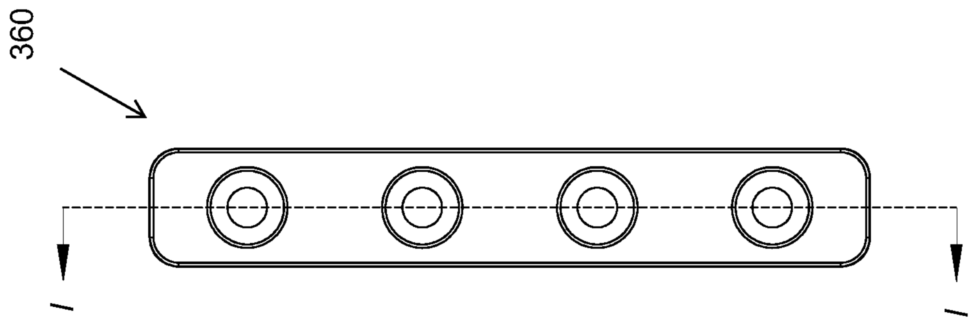
FIG. 59A shows a front view of a plate of an end bracket of a bottom bar assembly of a retractable screen system, in accordance with one or more embodiments.
Figure 60:
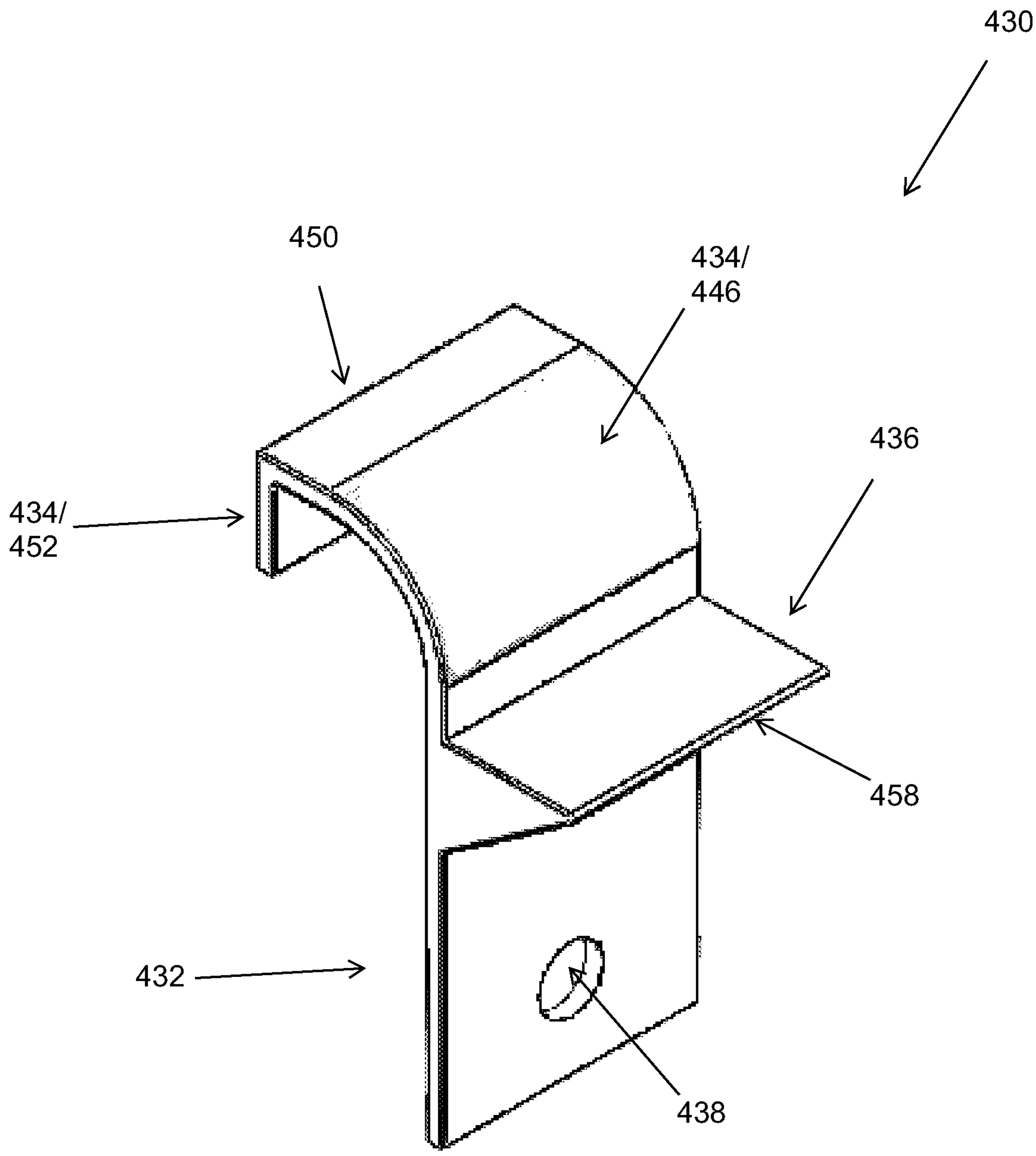
FIG. 60 shows an upper front screen facing side perspective view of an example stop member for a bottom bar assembly of a retractable screen system, in accordance with one or more embodiments.
Figure 61:
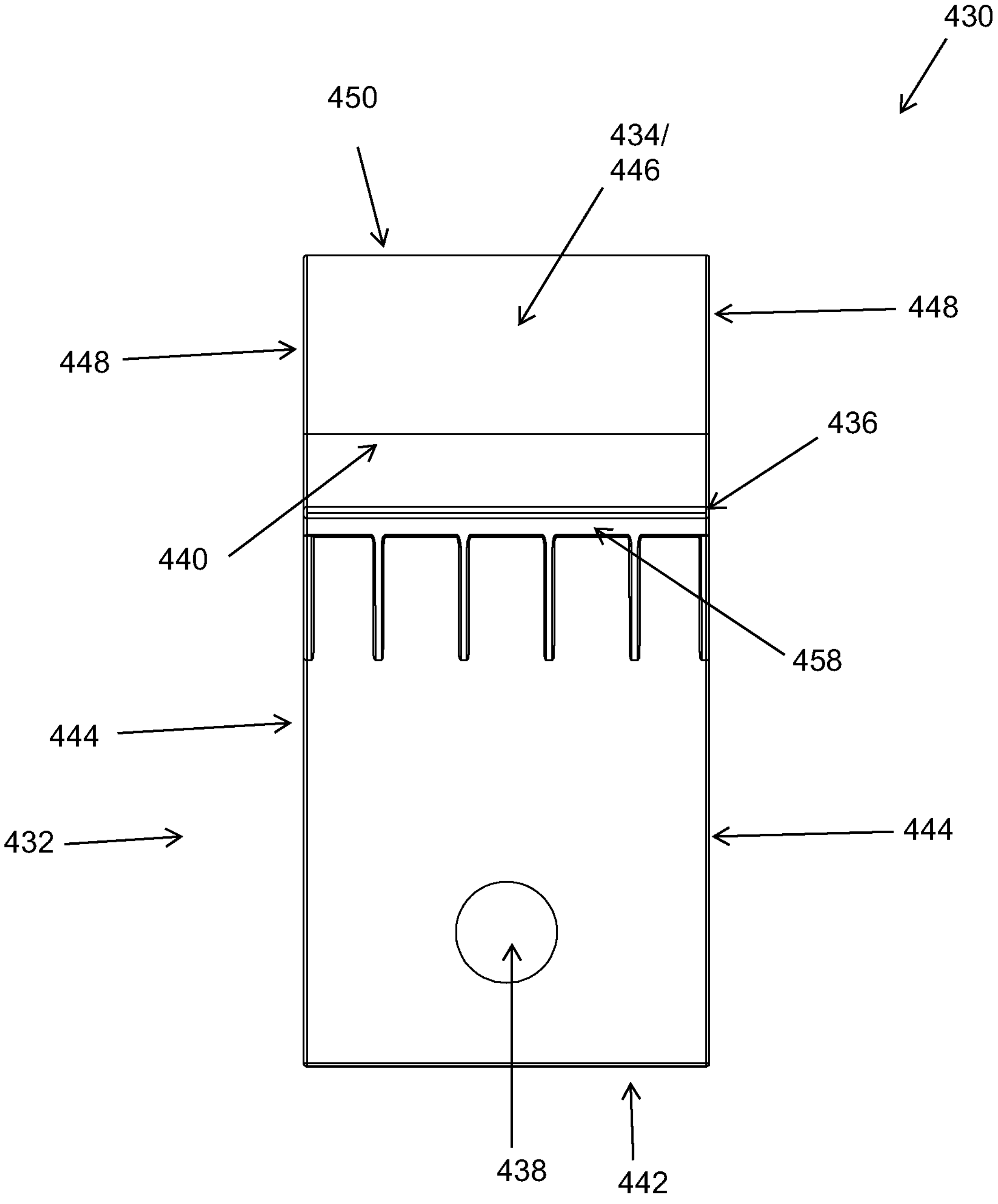
FIG. 61 shows a front view of an example stop member for a bottom bar assembly of a retractable screen system, in accordance with one or more embodiments.
Figure 62:
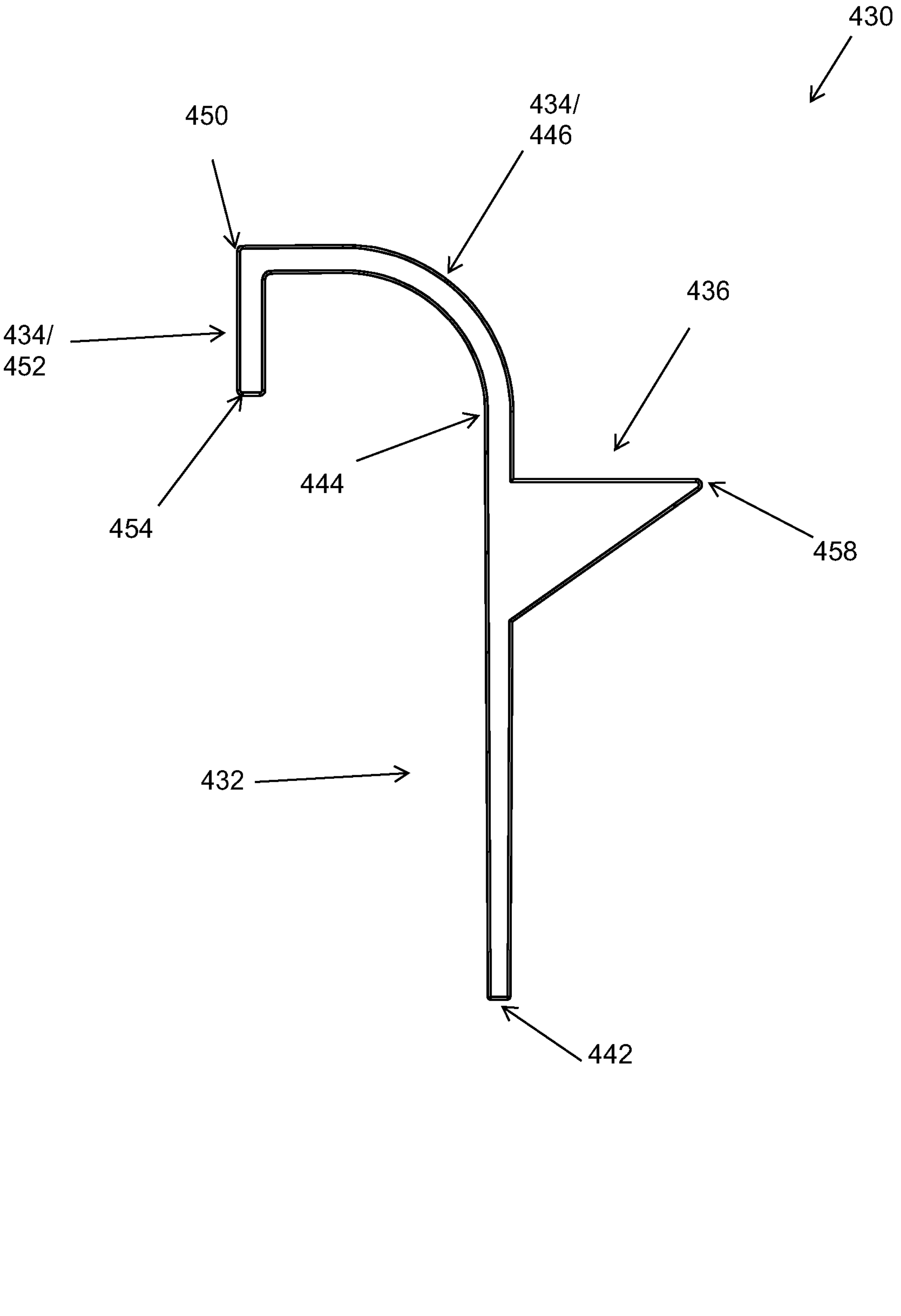
FIG. 62 shows a right side view of an example stop member for a bottom bar assembly of a retractable screen system, in accordance with one or more embodiments.
Figure 63:
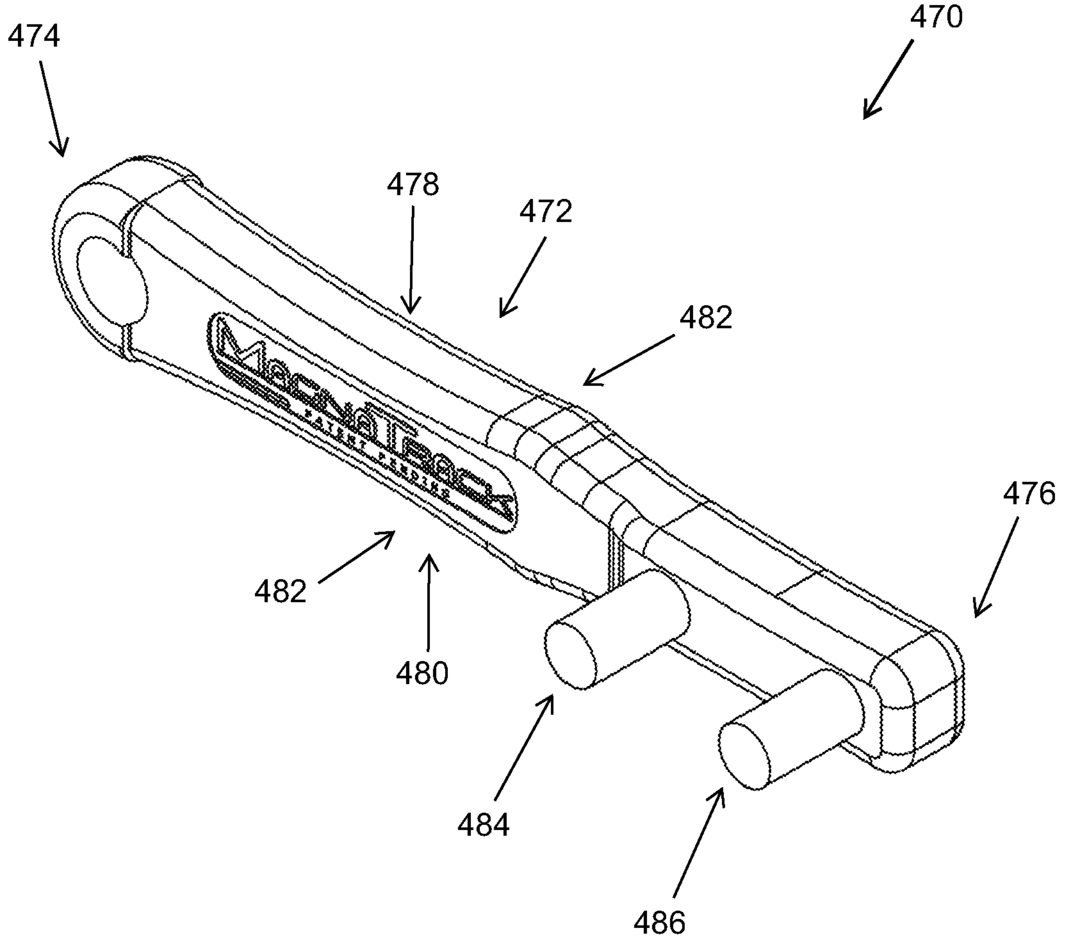
FIG. 63 shows a front side inward end perspective view of a tool for installation of retainers on a track of a retractable screen system, in accordance with one or more embodiments.
Figure 64:
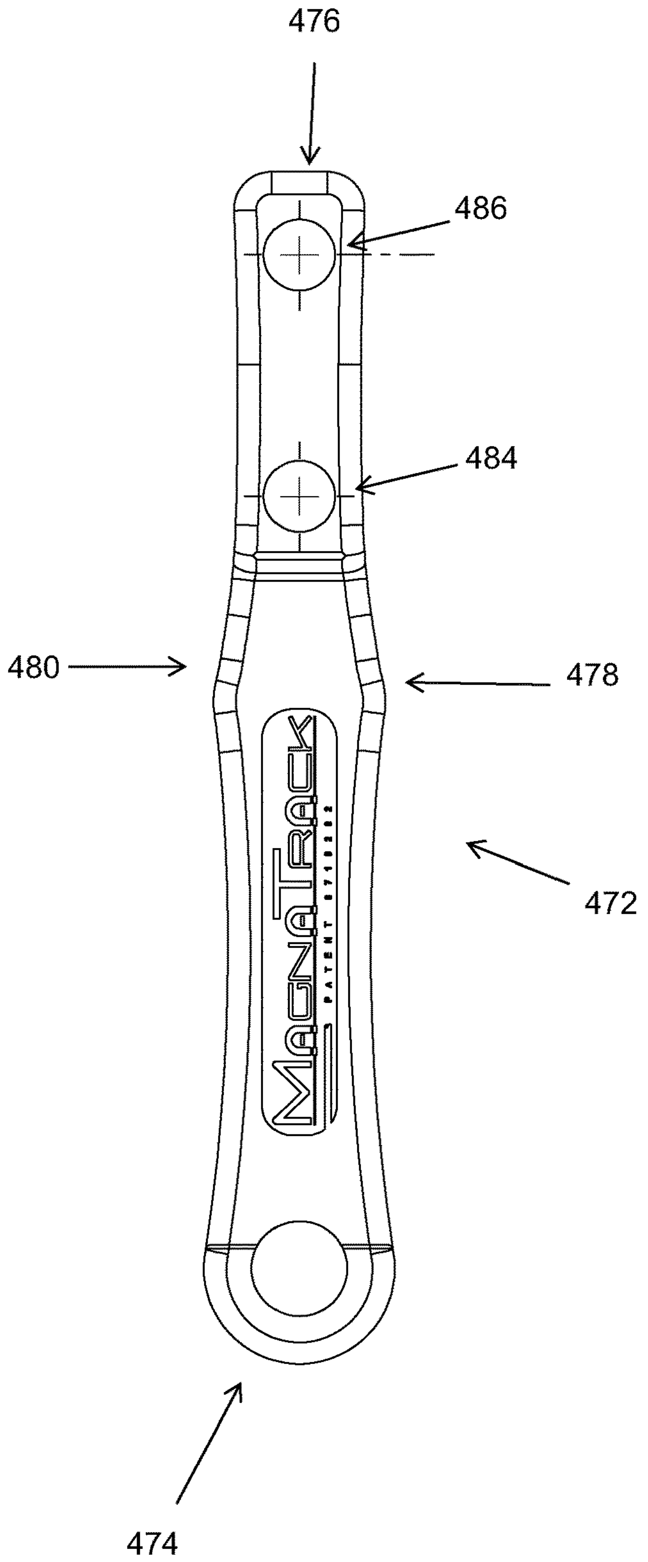
FIG. 64 shows a right side view of a tool for installation of retainers on a track of a retractable screen system, in accordance with one or more embodiments.
Figure 65:
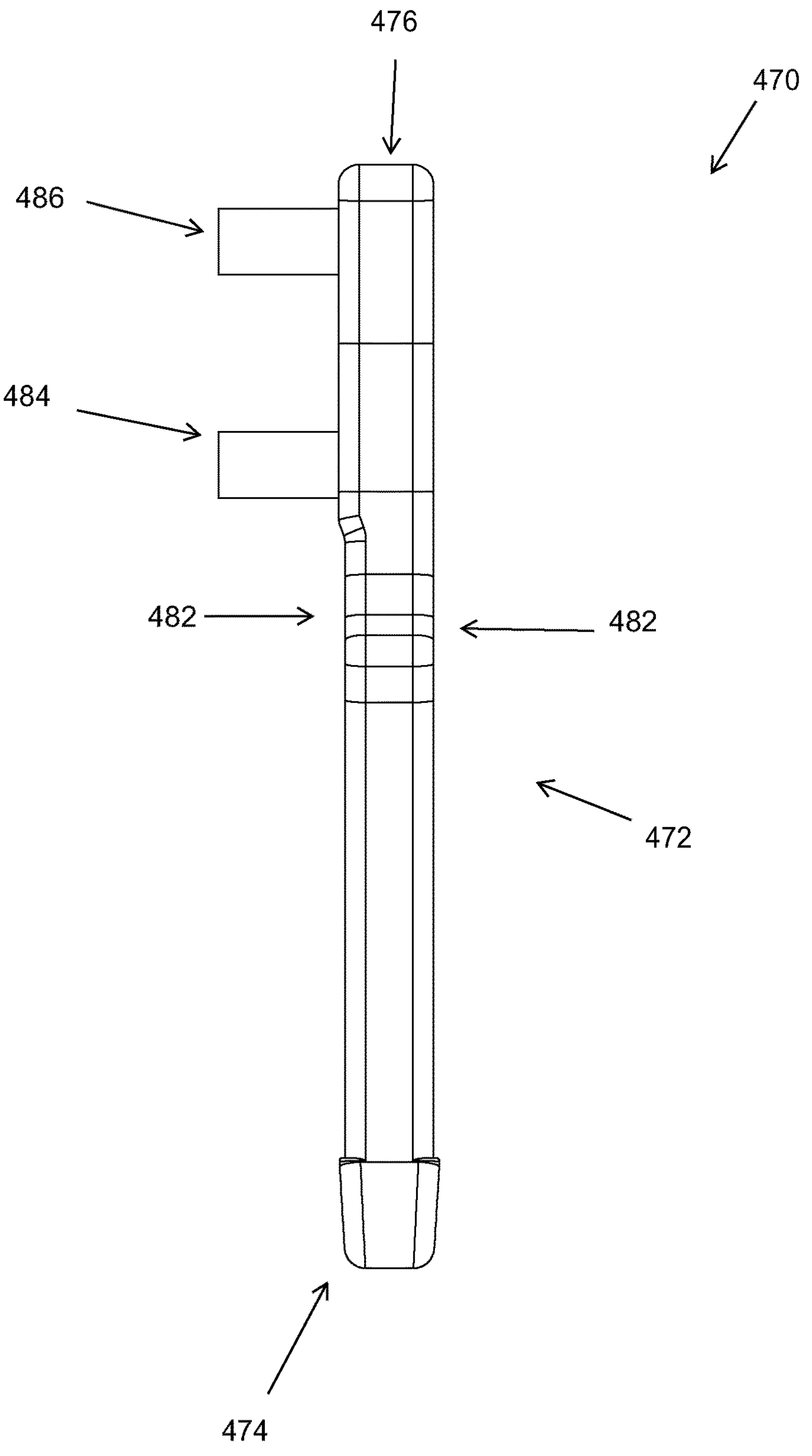
FIG. 65 shows a front view of a tool for installation of retainers on a track of a retractable screen system, in accordance with one or more embodiments.
Figure 66:
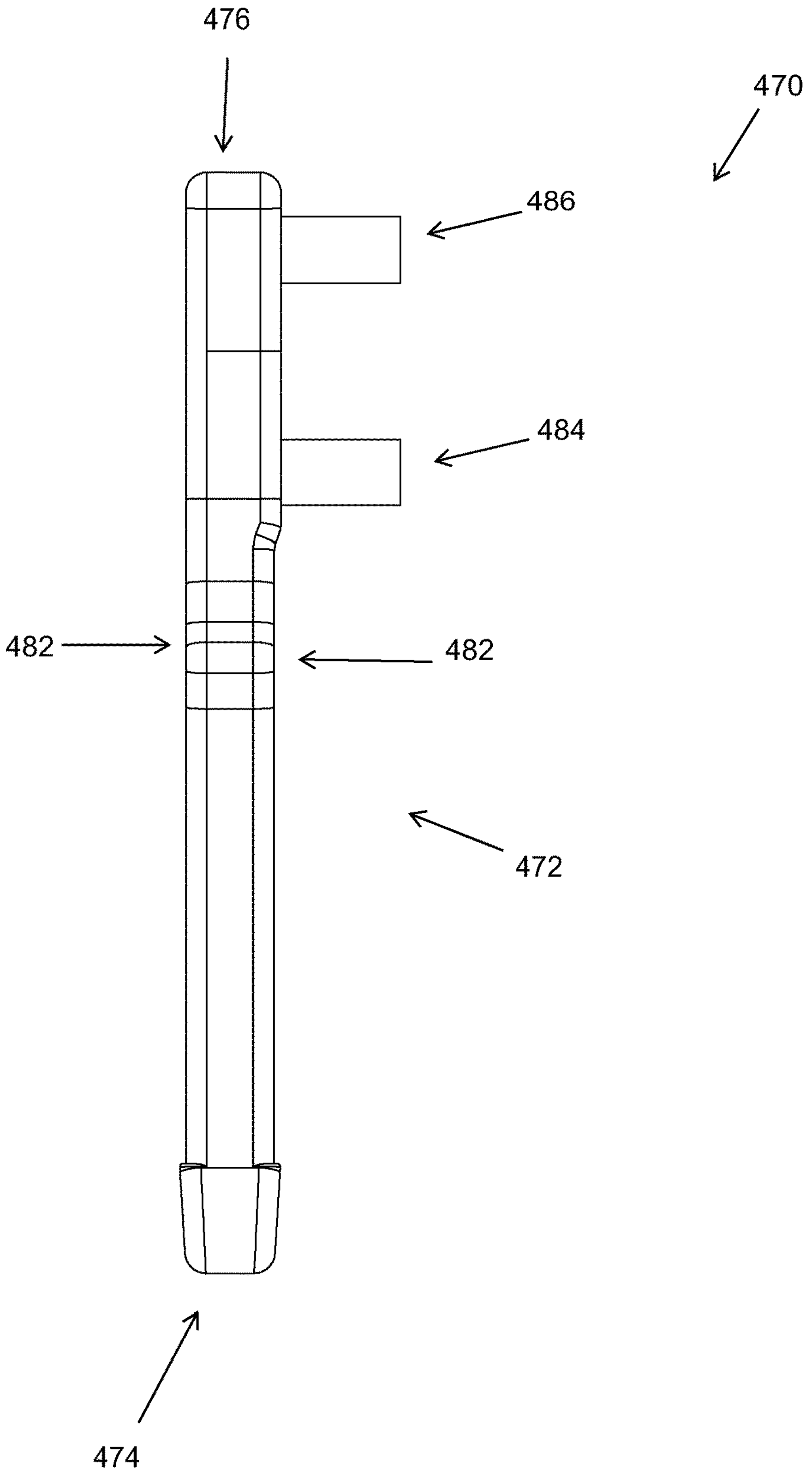
FIG. 66 shows a rear view of a tool for installation of retainers on a track of a retractable screen system, in accordance with one or more embodiments.
Figure 67:
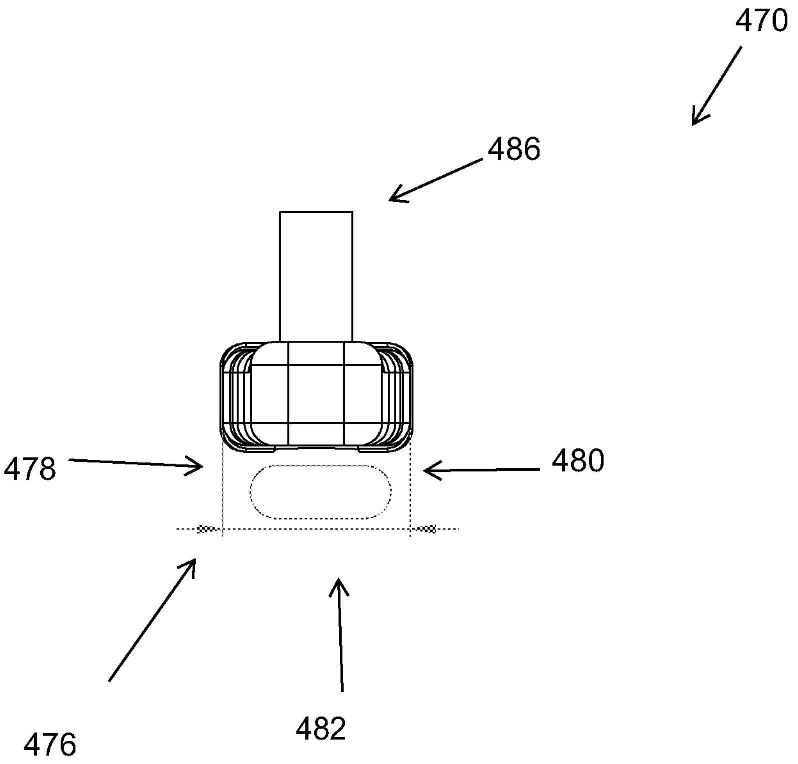
FIG. 67 shows an outward end view of a tool for installation of retainers on a track of a retractable screen system, in accordance with one or more embodiments.
Figure 68:
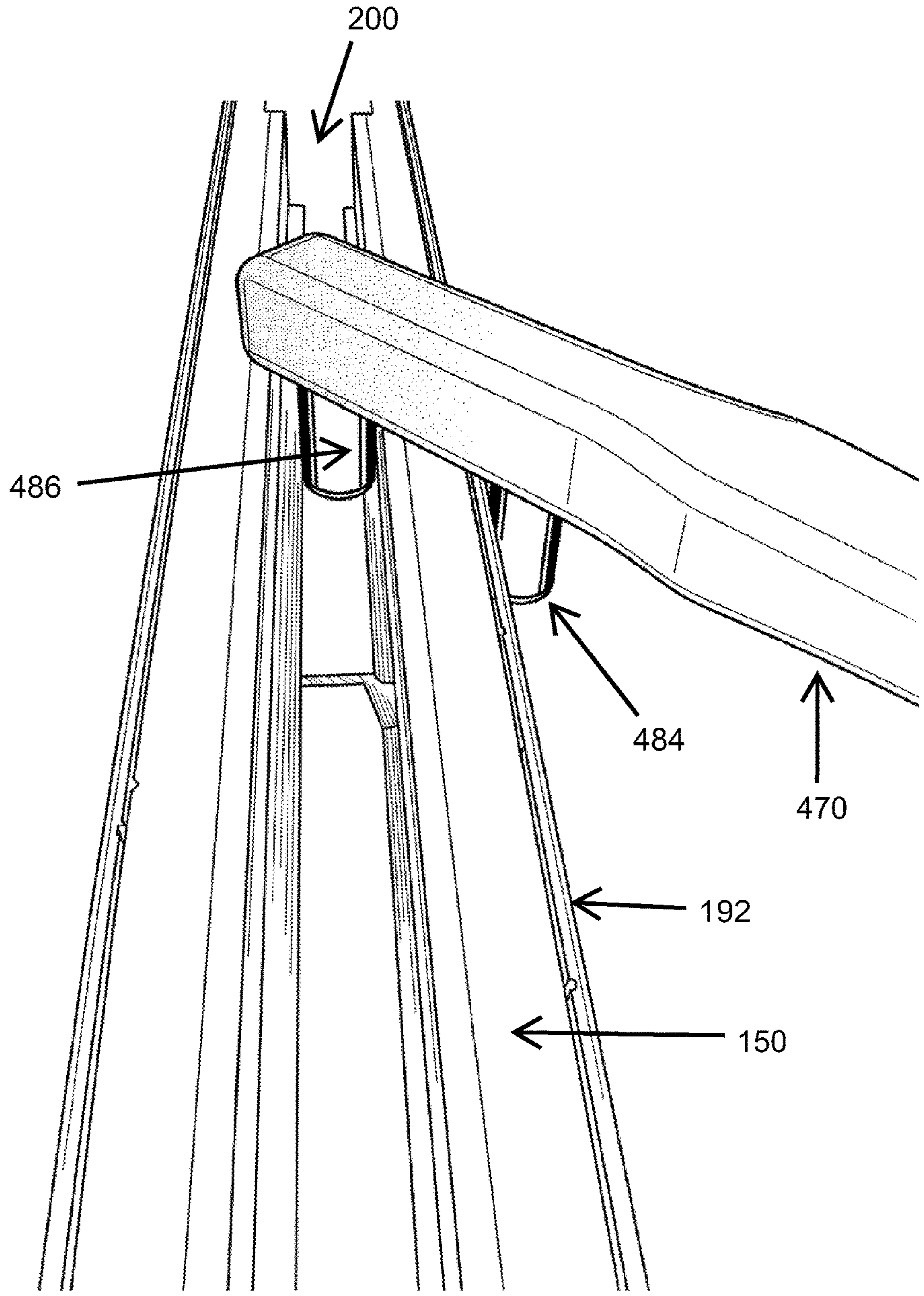
FIG. 68 shows a perspective view of a screen facing side of a magnetic track of a retractable screen system, in accordance with one or more embodiments; the showing an example tool being used to install a retainer on the track.
Figure 69:
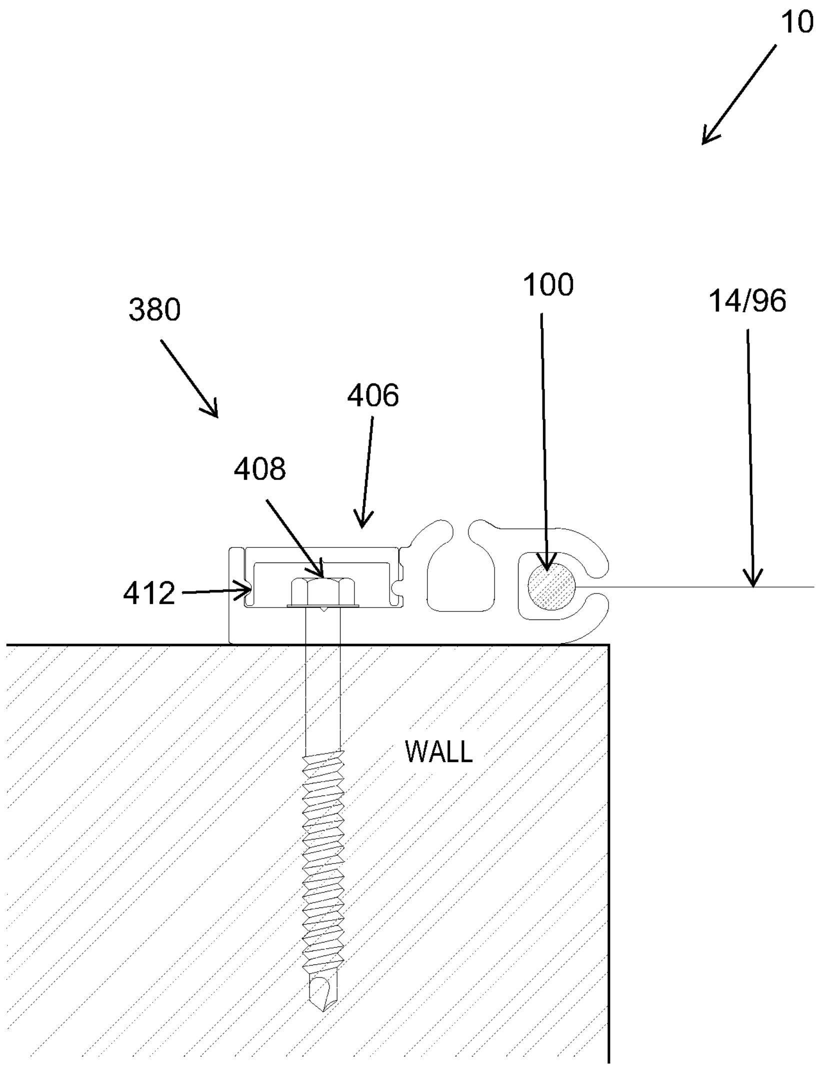
FIG. 69 shows a cross sectional top view of a fixed track assembly for a retractable screen system, in accordance with one or more embodiments; the view showing the track attached to a structure with an exterior mount orientation; the view showing an interlock of a screen positioned within a first receiver of the track.
Figure 70:
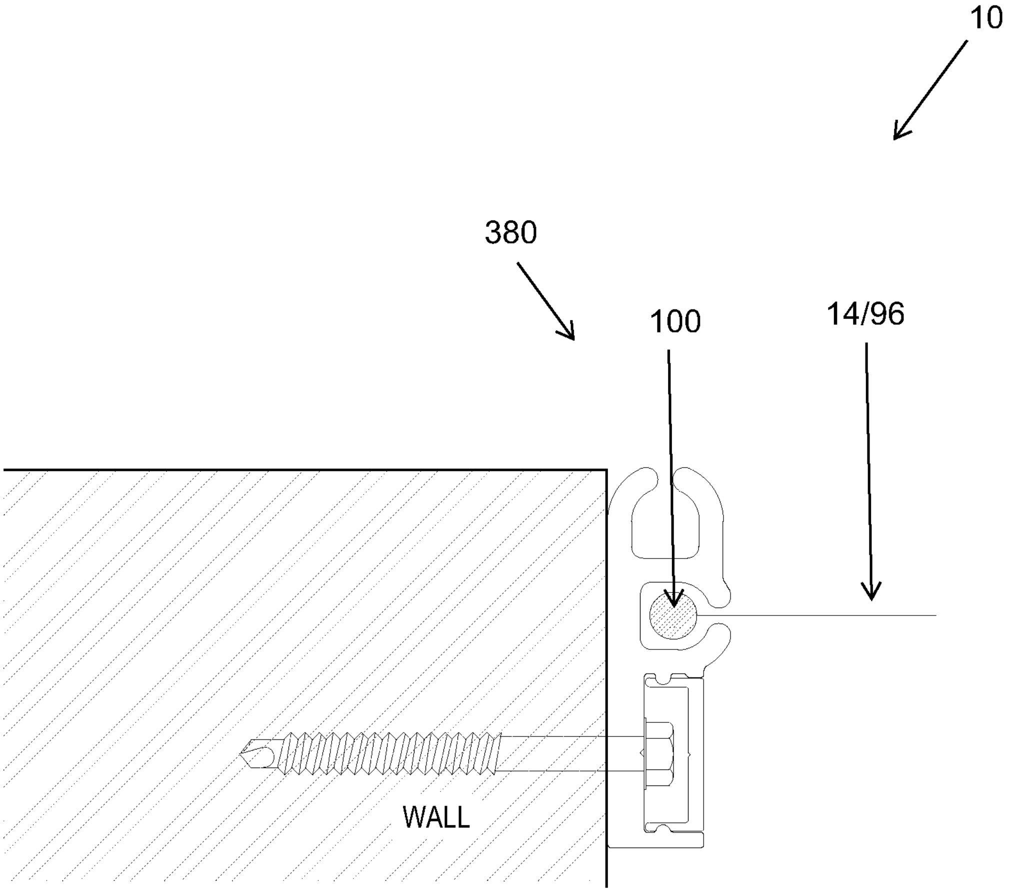
FIG. 70 shows a cross sectional top view of a fixed track assembly for a retractable screen system, in accordance with one or more embodiments; the view showing the track attached to a structure with an interior mount orientation; the view showing an interlock of a screen positioned within a first receiver of the track.
Figure 71:
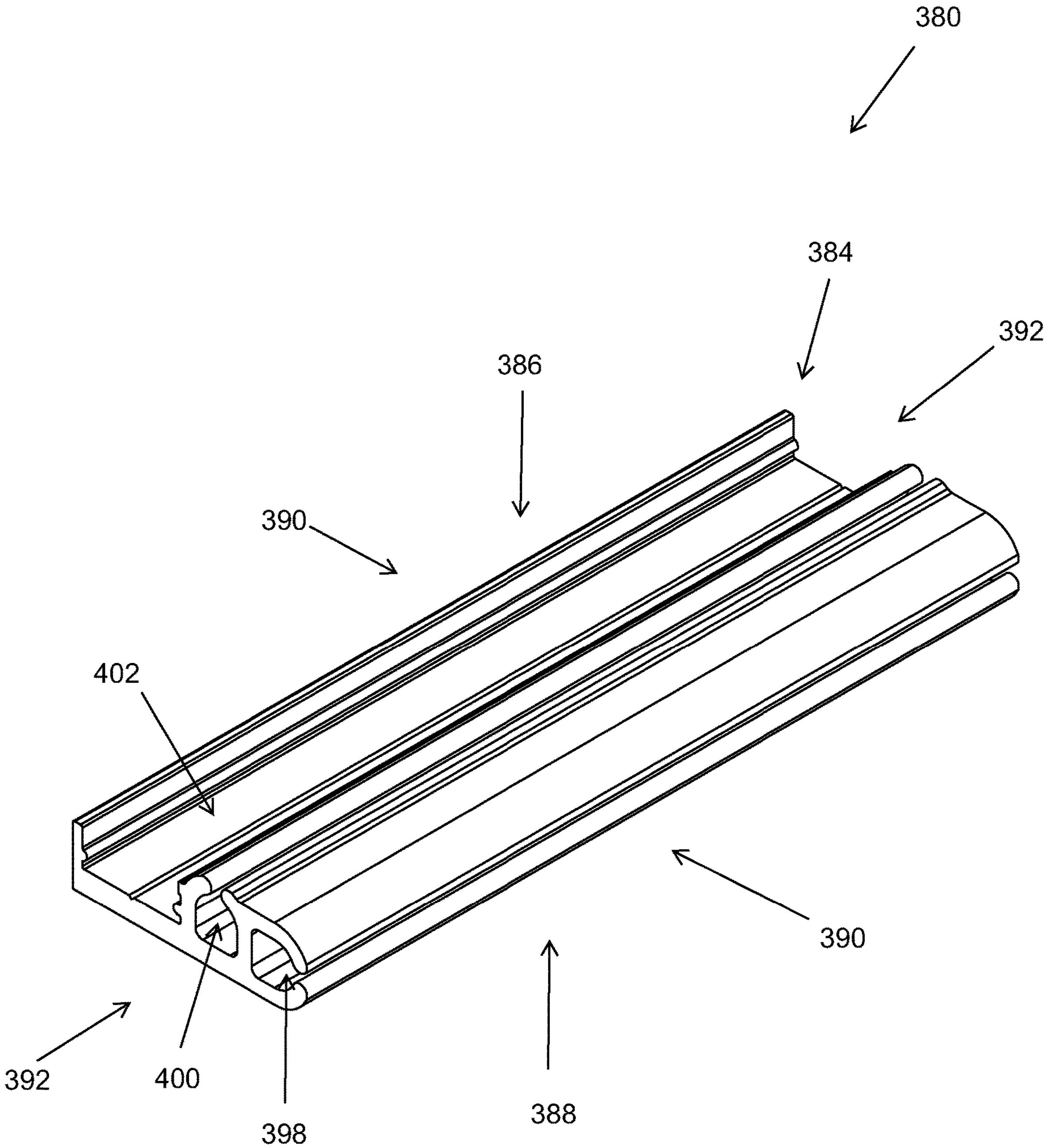
FIG. 71 shows a lower side perspective view of a fixed track assembly for a retractable screen system, in accordance with one or more embodiments.
Figure 72:
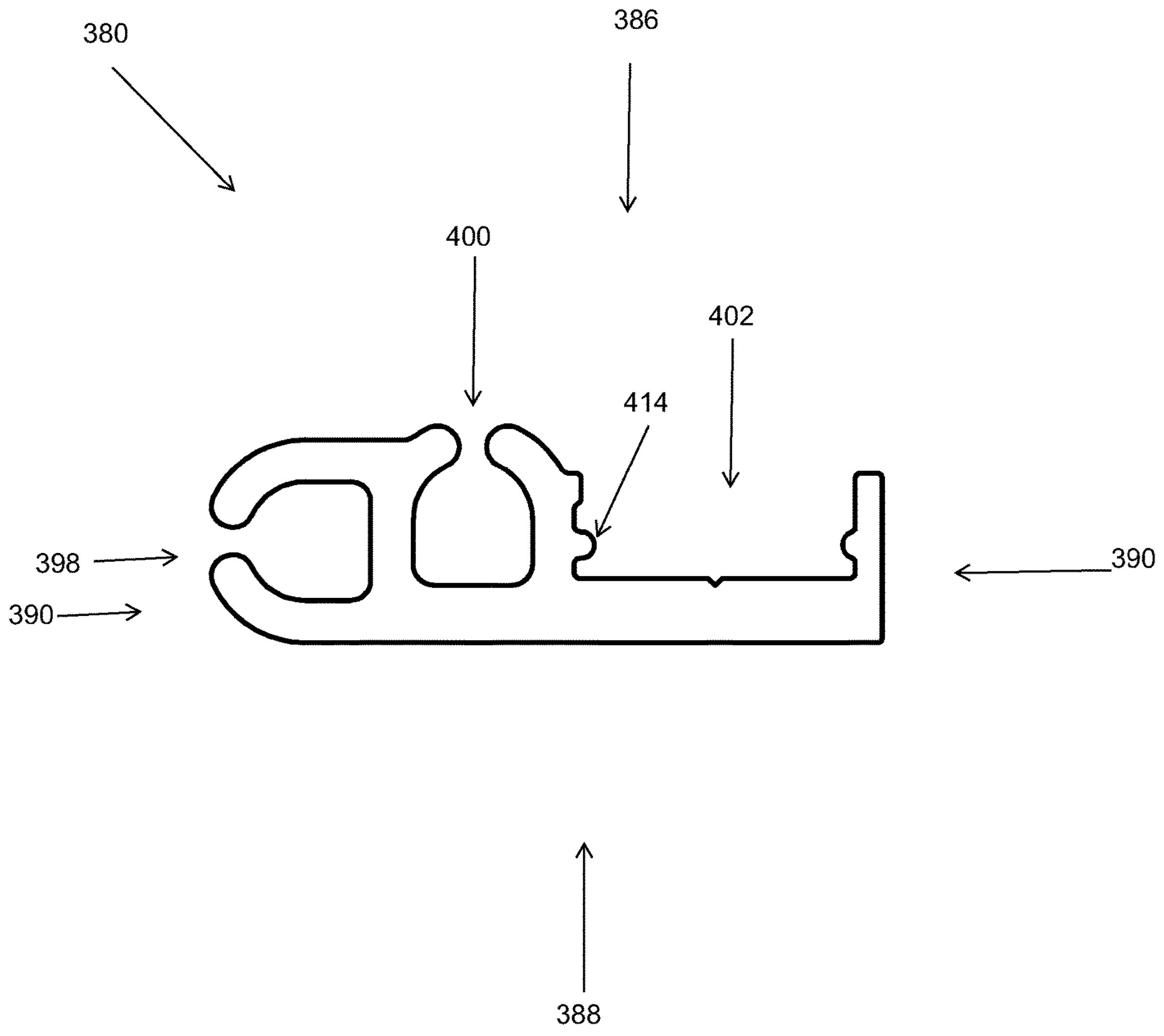
FIG. 72 shows a bottom view of a fixed track assembly for a retractable screen system, in accordance with one or more embodiments.
Figure 73:
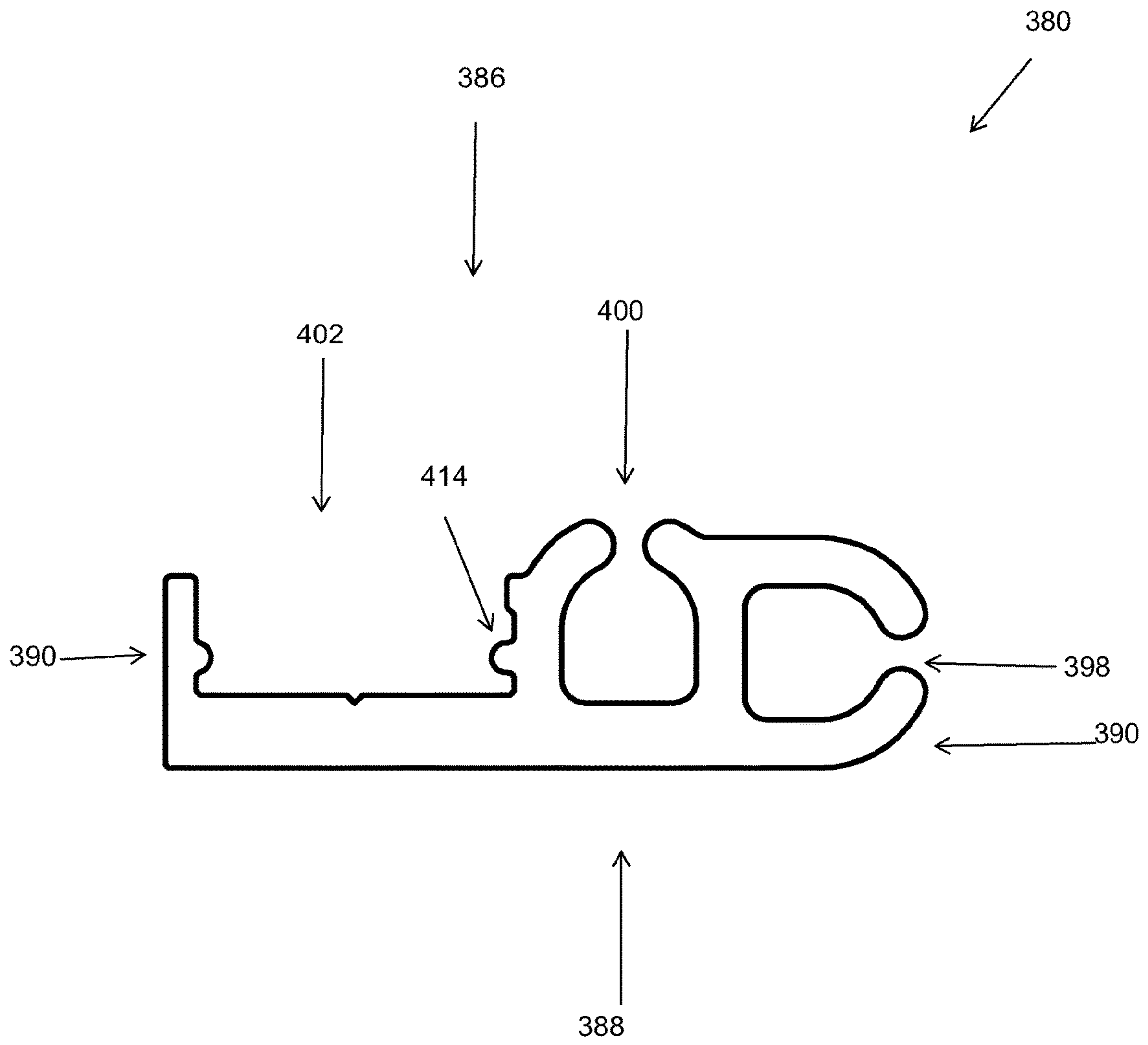
FIG. 73 shows a top view of a fixed track assembly for a retractable screen system, in accordance with one or more embodiments.
Figure 74:
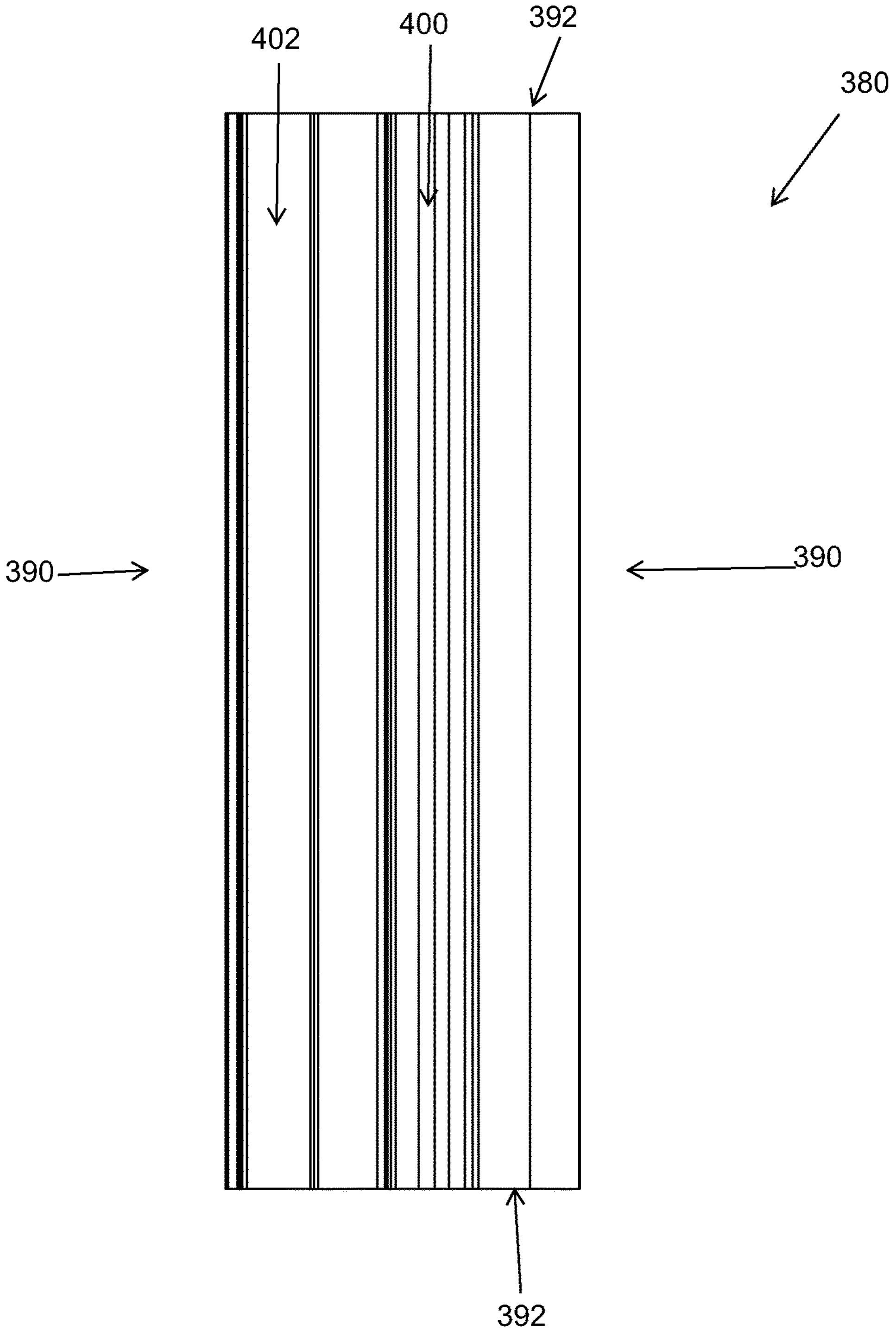
FIG. 74 shows a front view of a fixed track assembly for a retractable screen system, in accordance with one or more embodiments.
Figure 75:
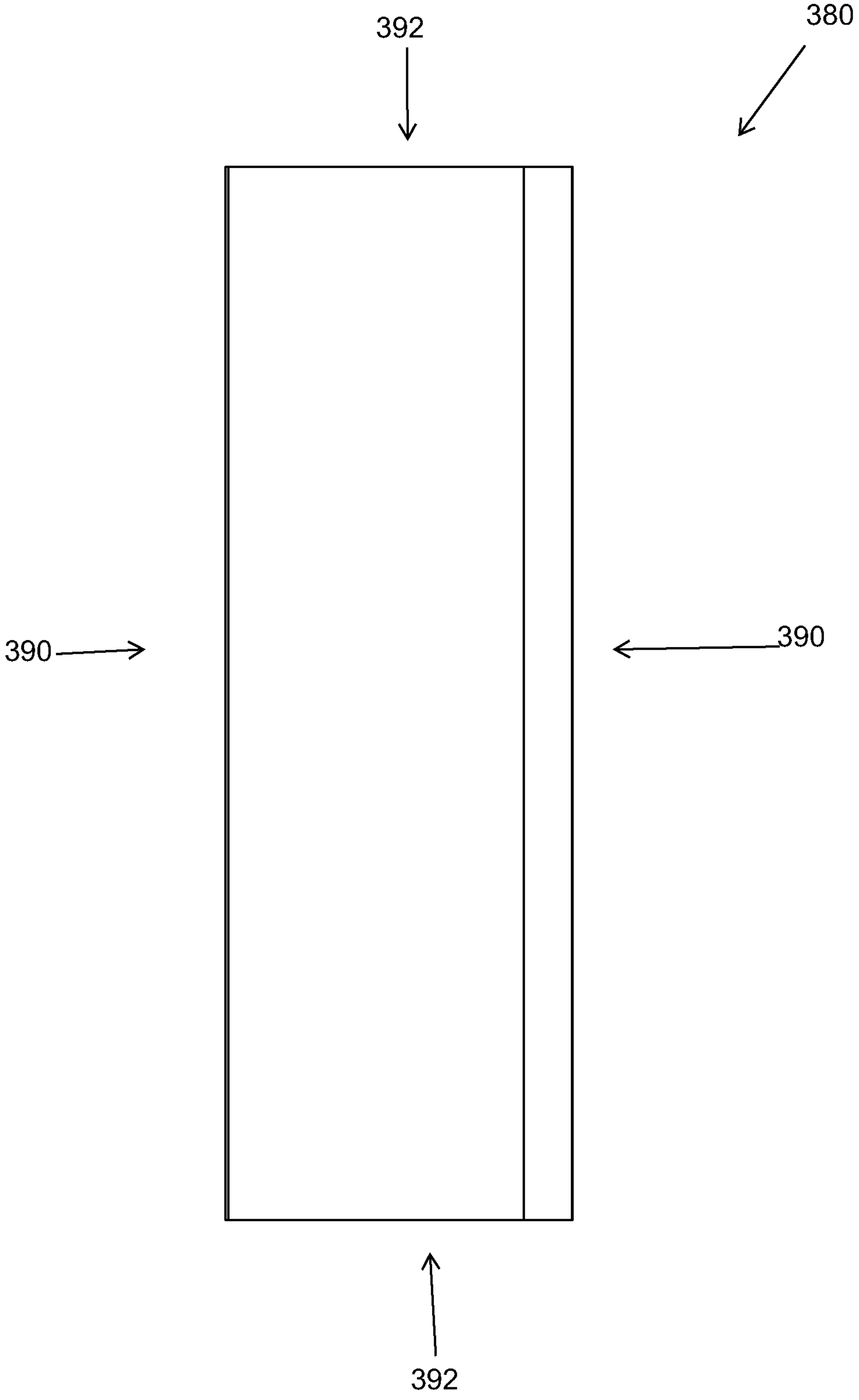
FIG. 75 shows a back view of a fixed track assembly for a retractable screen system, in accordance with one or more embodiments.
Figure 76:
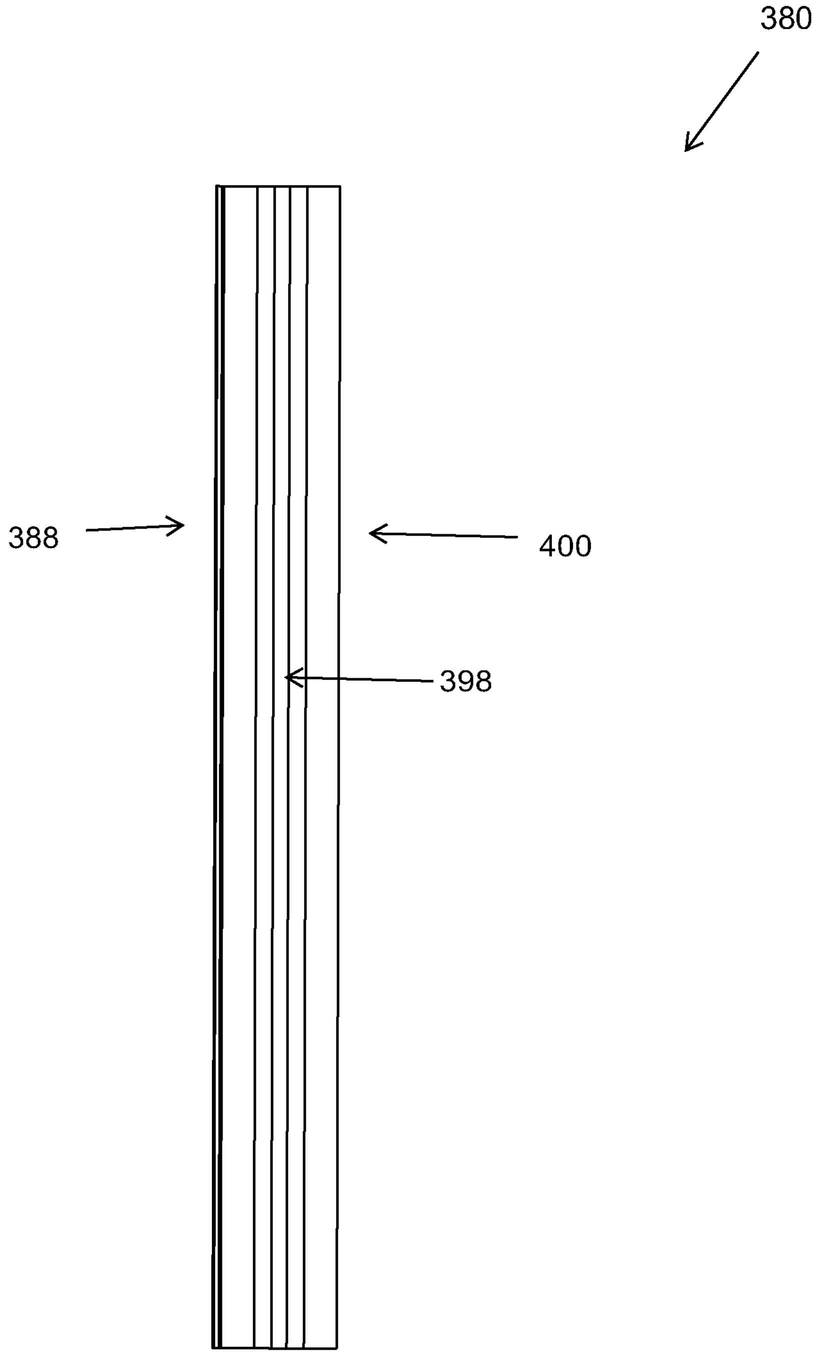
FIG. 76 shows a screen facing side view of a fixed track assembly for a retractable screen system, in accordance with one or more embodiments.
Figure 77:
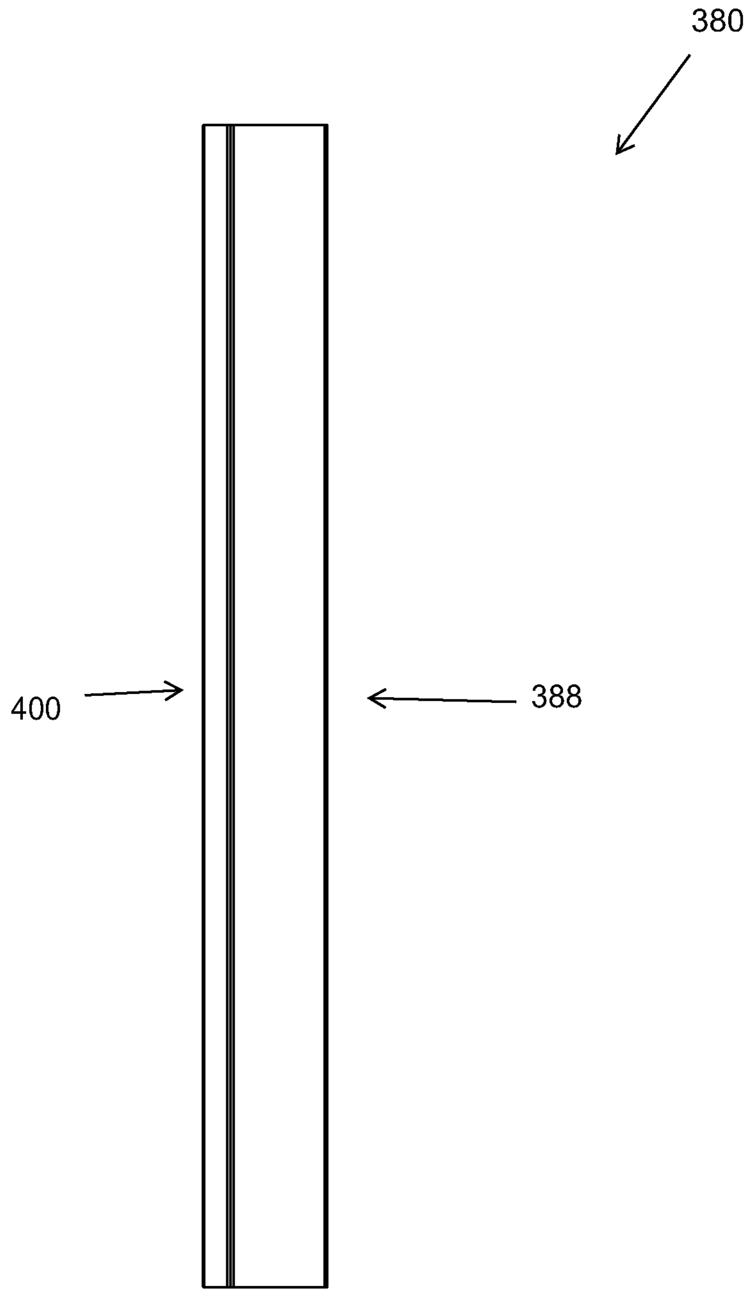
FIG. 77 shows a screen opposing side view of a fixed track assembly for a retractable screen system, in accordance with one or more embodiments.
Figure 78:
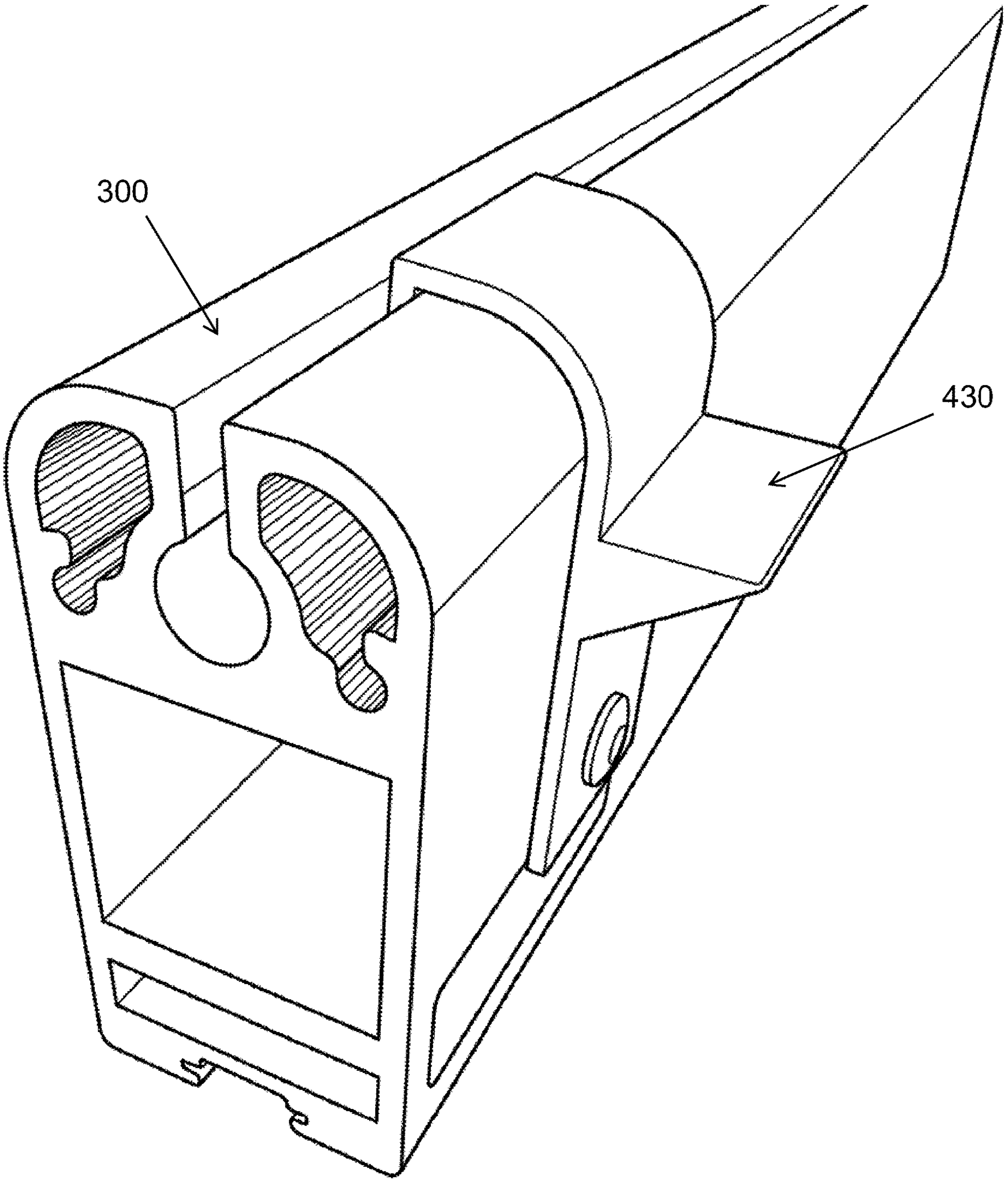
FIG. 78 shows an upper front side perspective view of a bottom bar assembly and stop member for a retractable screen system, in accordance with one or more embodiments.
Figure 79:
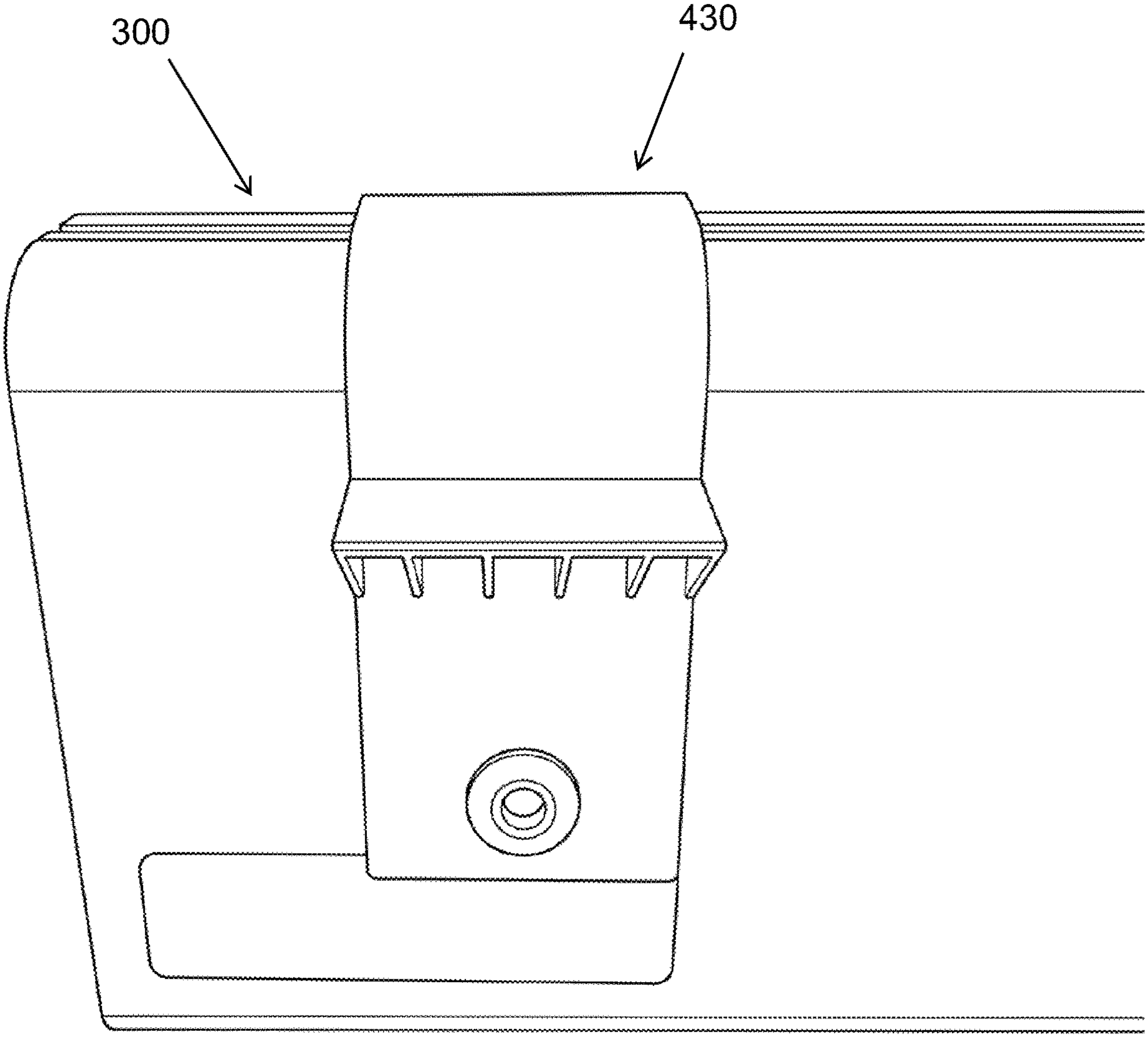
FIG. 79 shows a front view of a bottom bar assembly and stop member for a retractable screen system, in accordance with one or more embodiments.

FIG. 26 shows another example hurricane bracket 370 configured for use with interior mount installations. In this example arrangement, hurricane bracket 370 is presented having an end wall and a forward wall that form an L shaped bracket configured to fit over magnetic track assembly 20 in an interior mount installation. In the arrangement shown, hurricane bracket 370 has a channel that aligns with a channel of the magnetic track assembly 20 to facilitate attachment of the magnetic track assembly 20 and hurricane bracket 370 to a structure by a fastener (e.g., a screw, bolt, of other fastener) driven through the hurricane bracket 370 and magnetic track assembly 20 and into the structure.

For additional information on structure and operation of some example hurricane brackets, reference may be made to U.S. Patent Publication 2021/0262284, titled "RETRACTABLE SCREEN SYSTEMS" and published Aug. 26, 2021, which is hereby fully incorporate by reference herein.

Self-Tensioning of Screen:

In one or more arrangements, track assemblies 20 utilize a novel magnet arrangement in the track assemblies that allow screen receiver 146 to move laterally inward, and thereby allowing an attached screen 14 to expand while under high wind pressure and thereby avoid ripping or other damage, and after the high wind pressure subsides, magnetic attraction pulls the screen receiver 146 outward thereby tensioning the attached screen 14 to provide an aesthetically pleasing, tight screen. Thus, the novel magnet arrangement of the disclosed track assemblies 20 provide a "self-tensioning" system that operates effectively while accounting for fluctuations in weather conditions that ensures increased screen 14 and track assembly 20 lifespan while currently reducing frequent maintenance (and/or replacement) associated with currently marketed screens, track/track assemblies, or a combination thereof.

In one or more embodiments, track assembly 20 includes a set of magnetic components 218 and 220 (e.g., a pair of magnets having opposite polarity or a magnet paired with a ferrous material or magnetic member) to magnetically couple screen receiver 146 with track 148. For example, in one or more arrangements, a first magnetic component 218 is operably connected to end wall 202 of track 148 and a second magnetic component 220 is operably connected to screen receiver 146. Due to the magnetic coupling, the screen receiver 146 is pulled away from screen into elongate channel 186 to a retracted position, where magnetic components 218 and 220 are in close proximity to one another. In the retracted position, screen receiver tensions screen 14 to provide for an aesthetically pleasing, tight screen 14 in absence of strong forces applied to screen 14. When screen 14 is subjected to high wind pressure or other strong force, magnetic components 218 and 220 may be separated from one another allowing for screen receiver 146 to move inward to an extended position were applied to screen 14 is relaxed. In one or more arrangements, screen receiver 146 is prevented from being pulled out of elongate channel 186 of track 148 by screen 14 by inner partitions 210 and/or retainers 150. After the high wind pressure subsides, the magnetic attraction pulls the separated pair of magnetic components 218 and 220 into close proximity relative to one another while concurrently tensioning screen 14 to provide for an aesthetically pleasing, tight screen 14.

In one or more arrangements, outer partitions 214 similarly extend inward a distance sufficient to engage screen receiver 146 to limit the distance that screen receiver 146 can move outward away from screen and into elongate channel 186 of track 148. In one or more arrangements, outer partitions 214 are positioned to permit screen receiver 146 move outward to a retracted position, where magnetic components 218 and 220 are in close proximity but prevent magnetic components 218 and 220 from coming into forceful contact with one another.

Conversely, in one or more arrangements, inner partitions 210 extend inward a distance sufficient to engage screen receiver 146 to limit the distance that screen receiver 146 can move inward toward screen 14 when screen receiver 146 is pulled inward (e.g., due to strong wind). In this example arrangement, channel opening 200 between inner partitions 210 is wide enough to permit screen receiver 146 to be rotated within compartment 206 and removed from elongate channel 186 of track 148 through channel opening 200 at an angle. In this example arrangement, retainers 150 may be attached to track 148 to prevent screen receiver 146 from being removed from elongate channel 186 of track 148 through channel opening 200 even when rotated at an angle.

However, the embodiments are not so limited. Rather, it is contemplated that in some arrangements, channel opening 200 between inner partitions is wide enough to permit screen receiver 146 to be removed from elongate channel 186 of track 148 through channel opening 200 without rotating screen receiver 146. In such arrangements, retainers 150 are attached to track 148 to prevent screen receiver 146 from being removed from elongate channel 186 of track 148 through channel opening 200.

Retainers 150:

Retainers 150 are formed of any suitable size, shape, and design and are configured to operably connect with side walls 192 of track 148 and prevent screen receiver 146 from being removed from compartment 206 of elongate channel 186 of track 148 though channel opening 200.

In the arrangement shown, as one example, retainers 150 have a generally rectangular elongated shape having an inward side 226, an outward side 228, screen facing side 230, and a track facing side 232 extending between an upper end 234 and lower end 236. In this example arrangement, retainers 150 have a first channel 250 formed in and extending along outward side 228 between upper end 234 and lower end 236. In one or more arrangements, channel 250 is a c-shaped channel configured to receive the inner partition 210 of one of side walls 192 of track 148 with close and tight tolerances.

In one or more arrangements, channel 250 of retainers 150 have opposing sidewalls 264 configured to engage and connect with partition 210. In one or more arrangements, retainers 150 have one or more connection features 254 configured to engage one more connection features 256 of partition 210. In the arrangement shown, as one example, retainers 150 have a protrusion type connection feature 254 on one of the sidewalls 264 that is configured to engage a recess type connection feature 256 of partitions 210 when retainers 150 are placed over partitions 210. In this example arrangement, the sidewall 264 opposite connection feature 254 has a sloped surface 268 and a flat surface 270. The sloped surface 268 provides a wider opening between sidewalls 264 to facilitate easier installation of retainers 150 over partition 210. When retainer 150 are installed on partition 210, with connection feature 254 engaging connection feature 256 of partitions 210. the flat surface 270 is in contact with partition 210 and holds retainer 150 in place. However, the arrangements are not so limited. Rather, it is contemplated that retainers 150 may connect with partitions 210 using various means and/or methods including but not limited to, for example, frictional fittings, adhesive bonding, chemical bonding, welding, stitching, sewing, fasteners (e.g., staples, screws, nails, bolts, rivets, etc.), and/or any other connection means or method).

In the arrangement shown, when retainers 150 are attached to partitions 210 of side walls 192, the distance between inward sides 226 of retainer 150 in channel opening 200 is too narrow to permit screen receiver 146 to be removed though channel opening 200. In this manner, retainers 150 prevent screen receiver 146 from being removed from elongate channel 186 of track 148.

In the arrangement shown, retainers 150 are shorter than track 148 and extend along a segment of track 148 when installed (e.g., 8-10 inches). However, the arrangements are not so limited. Rather, it is contemplated that in various arrangements, retainers 150 may extend along longer or shorter segments of track 148 and/or may extend along the entire length of track 148.

In one or more arrangements, retainers 150 have a second channel 252 formed in and extending along track facing side 232 between upper end 234 and lower end 236 to facilitate attachment of one or more additional components. In the arrangement shown, as one example, channel 252 is a T-shaped channel. However, the arrangements are not so limited. Rather, it is contemplated that channel may be any shape to facilitate connection with components.

Compressible Members 258:

In one or more arrangements, track assemblies 20 include one or more compressible members 258 configured to attached to the second channel 252 of retainers 150. Compressible members 258 are formed of any suitable size, shape, and design and are configured to operably connect with second channel 252 of retainers 150 and engage screen side surface 156 of screen receiver 146 to prevent screen receiver 146 from coming into direct forceful contact with retainers 150 when magnetic components 218 and 220 separate and screen receiver 146 is moved inward toward screen 14. In the arrangement shown, compressible members 258 are a length of woolpile 260 having a T-shaped connector 262 configured to be held within channel 252.

However, the arrangements are not so limited. Rather, it is contemplated that some various different arrangements may utilize various materials for compressible members 258 including, but are not limited to various rubbers, plastics, foams, woolpile, brushes, felt or other synthetic or organic textiles, composite materials, nylons, vinyl, ultra-high molecular weight composites or any other suitable material for reducing sound cause by impacts.

Similarly, in one or more arrangements, track assembly 20 may additionally or alternatively include one or more pads of compressible material 266 (not shown) positions at various locations on track 148 and/or on screen receiver 146 to prevent direct metal-on-metal contact as screen receiver 146 moves within compartment 206 of track 148.

Retainer Extensions 272:

In one or more arrangements, track assemblies 20 include one or more retainer extensions 272 configured to attached to the second channel 252 of retainers 150. Retainer extensions 272 are formed of any suitable size, shape, and design and are configured to operably connect with second channel 252 of retainers 150 and restrict a distance that screen receivers 146 may be moved inward toward screen. In the arrangement shown, as one example, retainer extension 272 is configured to keep screen receiver 146 in the retracted position in the section of track 148, where retainer extension 272 is attached to. Retainer extensions 272 may be useful, for example, to maintain higher tension on certain portions of screen 14. For example, it may be desirable in some installations to maintain higher tension on a lower end of screen 14 to prevent bottom bar assembly 22 from bowing too severely in high wind events.

In the arrangement shown, as one example, retainer extensions 272 have a generally rectangular elongated shape having an inward side 276, an outward side 278, screen facing side 280, and a track facing side 282 extending between an upper end 284 and lower end 286. In this example arrangement, retainer extensions 272 have a T-shaped connector 288 extending along track facing side 282. Connector 288 is configured to be held within channel 252 and connect retainer extension 272 with retainer 150. However, the arrangements are not so limited. Rather, it is contemplated that in some arrangements, retainer extensions 272 may be configured to connect with retainers 150 using any shaped connector 288 and channel 252 (e.g., circular, triangular, square, rectangular shape, T-shape, V-shape, L-shape, U-shape, or any other shape).

In one or more arrangements, track assemblies 20 may include end caps 216. End caps 216 may be formed of any suitable size, shape, and design, and are configured to connect with and cover upper ends 188 of track 148 and provide an aesthetically pleasing appearance. In the arrangement shown, end caps 216 are attached to upper ends 188 of track 148 using fasteners that extend through holds in end caps 216. However, the arrangements are not so limited. Rather, it is contemplated that in various arrangements, end caps 216 may be attached to upper ends 188 of track 148 using various means and/or methods including but not limited to, for example, frictional fittings, adhesive bonding, chemical bonding, welding, stitching, sewing, fasteners, and/or any other connection means or method.

Retainer Installation Tool:

FIGS. 63-68 show an example tool 470 that may be used to facilitate installation of retainers on side walls 92 of track 148. In this example, tool 470 includes a lever 472 having an elongated generally rectangular shape with a front 478, a back 480 and opposing sides 482 extending from a handle end 474 to and outward end 476. In this example arrangement, tool 470 includes a pair of arms 484 and 486 extending outward a distance from one of the sides 482 near the outward end 476. In this example, an outer arm 486 is positioned proximate to outward end 476 and an inner arm 484 is positioned a distance closer to handle end 474. The separation between inner arm 484 and outward arm 486 permits tool 470 to be positioned with a retainer 150 and partition 210 of a side wall 192, where retainer 150 is to be connected, positioned in between inner arm 484 and outward arm 486. That is, outward arm 486 extends into channel opening 200 of track 148 inward of retainer 150 and outward arm extends a distance along an exterior side of side wall 192. In this position, a user may push or pull handle end 474 of lever 472 to cause inner arm 484 to push retainer 150 onto partition 210 until connections feature 254 of retainer engage connection feature 256 of partition 210 and flat surface 270 of side wall 264 of channel 250 engages retainer 150, thereby operably connecting retainer 150 with side wall 192.

Bottom Bar Assembly 22:

In the arrangement shown, as one example, system 10 includes a bottom bar assembly 22. Bottom bar assembly 22 is formed of any suitable size, shape, and design and is configured to connect to the bottom edge 92 of screen 14 while providing sufficient weight to the lower end of screen 14 to facilitate smooth opening and closing while also keeping the lower end of screen 14 flat and straight. In the arrangement shown, as one example, bottom bar assembly 22 includes a bottom bar 300, end brackets 302, a sealing member 304, among other components.

Bottom bar 300 is formed of any suitable size, shape, and design and is configured to connect with, extend across, and provide rigidity to bottom edge 92 of screen 14. In the arrangement shown, as one example, bottom bar 300 has an elongated generally rectangular shape having a top end 308, a bottom end 310, and opposing sides 312 extending between opposing ends 314.

In one or more arrangements, bottom bar 300 includes one or more hollow interior areas extending 318 between opposing ends 314. The hollow interior areas 318 are configured to receive a weight bar 320 (not shown) (or rod or other shaped material) therein that adds weight to the bottom bar assembly 22.

In the arrangement shown, the bottom end of bottom bar 300 includes a channel 324 that is configured to receive and hold a sealing member 304 therein that is configured to seal the lower end of bottom bar 300 to the ground when the bottom bar 300 is in a fully lowered or closed position. Sealing member 304 may be formed of any device that facilitates a seal such as a piece of woolpile, a strip of foam, a rubber strip, or any form of a sealing member or other compressible member that helps to facilitate a seal when the bottom bar 300 is in a fully lowered position.

In the arrangement shown, as one example, bottom bar 300 has a receiver 328 positioned in top end 308. Receiver 328 is formed of any suitable size, shape, and design and is configured to facilitate connection of the lower end of screen 14 to bottom bar assembly 22. More specifically, in one arrangement, receiver 328 is formed of the exact same or a similar shape as c-shaped channel 166 of screen receiver 146, and/or the receiver 124 as is described herein with respect to screen receiver 146 and/or roller tube assembly 16, respectively. In this arrangement, the lower end of screen 14 includes an interlock 104 that is similar to, if not exactly the same as, the interlocks 100 connected to the side's edges 94 of screen 14 and interlock 102 connected to top edge 90 of screen 14. In the arrangement shown, interlock 104 is a cylindrical shaped interlock and receiver 328 is a c-shaped channel. However, the arrangements are not so limited. Rather, it is contemplated that in one or more arrangements, interlock 104 may be formed of any form and/or shape of an interlock including, but not limited to a keder interlock, zipper interlock, a rope, a beaded chain, or any similar interlock known in the art associated with the disclosed retractable screens. Moreover, receiver 328 additionally or alternatively connect with screen 14 using various known method and/or means including but not limited to, for example, clamps, snaps, pins, fasteners, adhesive bonding, chemical bonding, welding, stitching, and/or any other connection means or method for connecting.

In the arrangement shown, as one example, only a single receiver 328 shown in the bottom bar assembly 22. However, any number of receivers 328 are hereby contemplated for use in the bottom bar assembly 22 such as one, two, three, four, five, six or more. Alternatively, it is hereby contemplated that no receivers 328 are used and instead screen 14 is connected to bottom bar assembly 22 by any other manner, method or means.

In the arrangement shown, a pair of end brackets 302 are connected to the ends 314 of bottom bar 300. End brackets 302 are formed of any suitable, size, shape, and design and are configured to connect with ends 314 of bottom bar 300, connect with interlocks 100 of screen 14, and operably connect bottom bar with tracks 148. In the arrangement shown, as one example, each end bracket 302 has a generally rectangular shaped main body 332 having a bar facing side 334 and track facing side 336 extending between a top 338, a bottom 340, opposing sides 342.

In this example arrangement, end bracket 302 has connection arrangement 344 positioned on bar facing side 334. Connection arrangement 344 is formed of any suitable, size, shape, and design and is configured to connect end bracket 302 with one of the ends 314 of bottom bar 300. In the arrangement shown, as one example, connection arrangement 344 includes one or more protrusions configured to be inserted into one or more hollowing interior areas 318 of bottom bar 300. In this example arrangement, fasteners 346 (not shown) extend through holes 348 and into bottom bar to secure end bracket 302 in place.

However, the embodiments are not so limited. Rather, it is contemplated that in various arrangements, connection arrangement 344 may secure end bracket 302 to bottom bar 300 using various means and/or methods including but not limited to, for example, frictional fittings, adhesive bonding, chemical bonding, welding, stitching, sewing, fasteners (e.g., staples, screws, nails, bolts, rivets, etc.), and/or any other connection means or method.

In the arrangement shown, end bracket 302 has clamp arrangement 352 positioned on track facing side 336. Clamp arrangement 352 is formed of any suitable, size, shape, and design and is configured to receive and clamp onto interlock 100 of screen 14. In the arrangement shown, clamp arrangement 352 is configured to receive and clamp onto a lower portion of interlock 100 of screen 14 that extend downward past the bottom edge 92.

In the arrangement shown, as one example, clamp arrangement 352 includes a first flange 354 and a second flange 356 extending outward in parallel from track facing side 336 of main body 332 of end bracket 302. In this example arrangement, first flange 354 has an opening 358 extending through the first flange 354. In this example arrangement, a plate 360 is positioned in opening 358 and is configured to facilitate clamping of seam material 108 of the lower portion of interlock 100 in a gap 364 positioned between first flange 354 and second flange 356.

In this example arrangement, seam material 108 is clamped between plate 360 and second flange 356 by one or more fasteners 366. In this example arrangement, bolt-type fasteners 366 extend through holes in plate 360 through seam material 108 and connect with threaded members 368 of second flange 356. As fasteners are tightened, plate 360 is moved toward second flange 356 and seam material 108 of interconnect is clamped therebetween. In this example arrangement, because plate is separate from first flange 354, clamping does place stress on first flange 354 and second flange 356 (e.g., as if first flange 354 and second flange 356 were clamped together). In this manner longevity and durability of end brackets 302 are improved.

However, the arrangements are not so limited. Rather, it is contemplated that some various arrangements may utilize additional or alternative means to facilitate clamping. As one example, in some arrangements, seam material 108 is clamped between plate 360 and second flange 356 by one or more self-threading screw-type fasteners 366. In one or more arrangements, such self-threading screw-type fasteners 366 may be configured to screw into second flange 356, In such arrangement, threaded members 368 may be omitted, thereby simplifying manufacture of end bracket 302.

In one or more arrangements, end brackets 302 are configured to extend into channel opening 200 of elongate channel 186 of track 148 to operably connect bottom bar assembly 22 to track 148 and structure 24, and thereby provide additional support for bottom edge 92 of screen in high wind events while permitting screen 14 to be moved up and down. In the arrangement shown, first flange 354 and second flange 356 are configured to extend into channel opening 200 between retainers 150 with close and tight tolerances between retainers 150 and first flange 354 and second flange 356. As screen 14 and bottom bar assembly 22 are raised and lowered these first flange 354 and second flange 356 slide along the interior surface of the channel opening 200 thereby guiding and aligning bottom bar 300 during opening and closing thereby providing smother, more consistent, and quieter operation.

However, embodiments are not so limited. Rather, it is contemplated that end brackets 302 may be implemented with various alternative structures and/or arrangements to facilitate operable connection of bottom bar assembly 22 to track assemblies 20.

Stop Member 430:

In one or more arrangements, bottom bar assembly 22 includes one or more stop members 430. Stop member 430 is formed of any suitable size, shape, or design and is configured to prevent bottom bar assembly 22 from being pulled into housing 12 when the screen 14 is retracted. In the arrangement shown, as one example, stop member 430 is configured to fit over and attach with bottom bar 300. In this example, arrangement, stop member 430 include a main body 432, a hook 434, and a stop feature 436, among other components.

Main Body 432:

Main body 432 is formed of any suitable size, shape, or design and is configured to engage a side 312 of bottom bar 300 and support stop feature 436. In the arrangement shown, as one example, main body 432 has a generally rectangular planar shape extending from an upper edge 440 to a lower edge 442 and between opposing side edges 444. In this example arrangement, main body 432 includes a hole 438 to facilitate connection of main body with bottom bar using a fastener (e.g., a bolt or a screw) inserted through hole 438 and into bottom bar after stop member 430 is positioned on bottom bar.

Hook 434:

Hook 434 is formed of any suitable size, shape, or design and is configured to operably connect stop member 430 with bottom bar 300. In the arrangement shown, hook 434 has a curved portion 446 that extends upward between opposing side edges 448 from upper edge 440 of main body, following the general contour of bottom bar 300, to a top edge 450. In this example arrangement, hook 434 also includes a flange 452 that extends downward from top edge 450 to a free edge 454. In this example arrangement, when stop member 430 is placed over bottom bar 300, flange 452 of hook 434 extends downward into receiver 328 of bottom bar 300. When downward forces are placed on stop member 430 during operation, flange 452 engages an inner surface of receiver 328 of bottom bar 300 to hold stop member 430 securely in place.

Stop Feature 436:

Stop feature 436 is formed of any suitable size, shape, or design and is configured to engage with housing 12 when the screen 14 is retracted. In the arrangement shown, as one example, stop feature 436 has a triangular wedge shape extending outward from main body 432 to an outer edge 458. In this example arrangement, an upper surface of stop feature 436 is configured to engage housing 12 when the screen 14 is retracted and thereby prevent bottom bar 300 from being pulled into housing. In this example arrangement, the wedge shape of stop feature 436 helps to brace stop feature 436 against main body 432 and side 312 of bottom bar 300 in contact with main body 432. However, the arrangements are not so limited. Rather, it is contemplated that in some various arrangements, stop feature 436 may have various additional and/or alternative shapes and/or features.

The arrangements are not so limited to the particular arrangements of stop member 430 shown and/or discussed herein. Rather, it is contemplated that in some various arrangements, stop member 430 may be adapted to have various additional and/or alternative shapes and/or features. Furthermore, in some various arrangements, stop member 430 may be connected to bottom bar 300 using various means and/or methods including but not limited to, for example, frictional fittings, adhesive bonding, chemical bonding, welding, stitching, sewing, fasteners (e.g., staples, screws, nails, bolts, rivets, etc.), and/or any other connection means or method).

Alternative Arrangement(S):

With reference to FIGS. 69-77 a fixed track assembly 380 is prevented for you with retractable screen systems 10, in accordance with one or more arrangements. In one or more arrangements, fixed track assembly 380 is configured to facilitate operable attachment of interlock 100 connected to a side edge 94 of screen 14 with fixed track assembly 380 mounted on structure 24 with the option to mount fixed track assembly 380 on structure 24 in a surface mount orientation or end mount orientation.

Fixed Track Assembly 380:

Fixed track assembly 380 is formed of any suitable size, shape, and design, and is configured to operably connect side edges 94 of screen 14 with sides 28 of opening 26 of structure 24 while permitting screen 14 to be moved upward and downward along fixed track assembly 380.

In the arrangement shown, as one example, fixed track assembly 380 has an elongated generally rectangular shaped body 384 having a front 386, a back 388, and opposing sides 390 extending between opposing ends 392.

In the arrangement shown, fixed track assembly 380 includes a first receiver 398 extending along one of sides 28 to facilitate operable connection with side edge 94 of screen 14 when back 388 of fixed track assembly 380 is mounted against an interior or exterior of structure 24 (e.g., in a surface mount orientation).

In the arrangement shown, fixed track assembly 380 includes a second receiver 400 extending along front 386 to facilitate operable connection with side edge 94 of screen 14 when back 388 of fixed track assembly 380 is mounted against an interior side of opening 26 of structure 24 (e.g., in an end mount orientation).

First receiver 398 and second receiver 400 are formed of any suitable size, shape, and design and are configured to receive and hold interlock 100 connected to side edge 94 screen 14 while permitting screen 14 to move up and down. In the arrangement shown, first receiver 398 and second receiver 400 are c-shaped channels configured to receive and hold a cylindrical interlock 100 similar to c-shaped channel 166 of screen receiver 146. However, the arrangements are not so limited. Rather, it is contemplated that in one or more arrangements, receivers 398 and 400 may be form and/or shaped to receive any type or shape of interlock including, but not limited to a keder interlock, zipper interlock, a rope, a beaded chain, or any similar interlock known in the art associated with the disclosed retractable screens.

In one or more arrangements, fixed track assembly 380 includes a recessed channel 402 and cover 406 to facilitate attachment of fixed track assembly 380 to structure 24 by fasteners 408 and covering of fasteners 408. In this example arrangement, cover 406 is configured to be received and held within recessed channel 402 so as to conceal fasteners 408 used to attach fixed track assembly 380 to structure 24. In this example arrangement cover 406 has connection features 412 configured to engage one more connection features 414 of recessed channel 402. In the arrangement shown, as one example, recessed channel 402 have protrusion type connection feature 414 configured to engage a recess type connection feature 412 of cover 406. However, the arrangements are not so limited. Rather, it is contemplated that cover 406 may connect with recessed channel 402 using various means and/or methods including but not limited to, for example, frictional fittings, adhesive bonding, chemical bonding, welding, stitching, sewing, fasteners (e.g., staples, screws, nails, bolts, rivets, etc.), and/or any other connection means or method).

Not Limited to Individual Arrangements Described Herein:

It will be appreciated by those skilled in the art that other various modifications could be made to the device without parting from the spirit and scope of this disclosure. For instance, although aspects and features may be illustrated in or described with reference to certain figures or arrangements, it will be appreciated that features from one figure or embodiment may be combined with features of another figure or arrangement even though the combination is not explicitly shown or explicitly described as a combination. All such modifications and changes fall within the scope of the claims and are intended to be covered thereby.

The invention claimed is:

1. A screen system having a magnetic track assembly, comprising:

a screen;

the screen extending a height between an upper edge and a lower edge;

the screen extending a length between a first side edge and a second side edge;

a roller tube;

the roller tube extending a length from a first end to a second end;

the screen connected to the roller tube such that when the roller tube rotates in a first direction the screen is raised and when the roller tube rotates in a second direction, opposite the first direction, the screen is lowered;

a first track;

the first track including a first side wall and a second side wall;

the first side wall having a first inward facing surface;

the second side wall having a second inward facing surface;

the first inward facing surface and the second inward facing surface facing toward one another;

a first connection feature positioned on the first inward facing surface of the first side wall;

a second connection feature positioned on the second inward facing surface of the second side wall;

a first screen receiver positioned within the first track between the first side wall and the second side wall, wherein the first screen receiver is configured to operably connect with and hold the first side edge of the screen while permitting the screen to be raised and lowered;

a first retainer configured to be connected to the first side wall of the first track by placing the first retainer in contact with the first connection feature and applying force to the first retainer in a direction away from the second side wall and toward the first side wall;

a second retainer configured to be connected to the second side wall of the first track by placing the second retainer in contact with the second connection feature and applying force to the second retainer in a direction away from the first side wall and toward the second side wall;

wherein the first retainer and the second retainer prevent the first screen receiver from coming out of the first track;

a first magnetic component operably connected to the first track;

a second magnetic component operably connected to the first screen receiver; and wherein a magnetic bond formed between the first magnetic component and the second magnetic component pulls the first screen receiver into the first track, thereby applying tension to the screen.

2. The system of claim 1, wherein when the first retainer and the second retainer are connected to the first track, the first screen receiver is movable within a channel of the first track between a retracted position and an extended position, wherein the first retainer and the second retainer prevent the first screen receiver from coming out of the channel.

3. The system of claim 1, wherein the first track has a channel having an open side facing toward the screen;

wherein when the first retainer and the second retainer are disconnected to the first track, the first screen receiver is removable from the first track through the open side of the channel of the first track.

4. The system of claim 1, wherein the first track has a channel having an open side facing toward the screen;

wherein the first side wall of the track has the first connection feature positioned proximate to the open side of the channel and configured to facilitate connection of the first retainer with the first side wall;

wherein the second side wall of the track has the second connection feature positioned proximate to the open side of the channel and configured to facilitate connection of the second retainer with the second side wall.

5. The system of claim 1, wherein the first track has a channel having an open side facing toward the screen;

wherein when the first retainer and the second retainer are disconnected from the first track, the first screen receiver is removable from the first track through the open side of the channel of the first track by turning the screen receiver at an angle relative to the channel and moving the screen receiver out of the channel through the open side.

6. The system of claim 1, wherein the first screen receiver includes a channel configured to receive and hold a first interlock connected to the first side edge of the screen;

wherein the first interlock is movable within the channel of the first screen receiver thereby permitting the screen to be raised and lowered.

7. The system of claim 1, wherein the first screen receiver includes a channel configured to receive and hold a first interlock connected to the first side edge of the screen;

wherein the first interlock is movable within the channel of the first screen receiver thereby permitting the screen to be raised and lowered;

wherein the first screen receiver includes a first funnel positioned proximate to an upper end of the first screen receiver;

wherein the first funnel is configured to facilitate insertion of the first interlock into the channel of the first screen receiver.

8. The system of claim 1, further comprising a set of compressible members connected to the first retainer and the second retainer;

wherein when the first retainer and the second retainer are connected to the first track, the first screen receiver is movable within a channel of the first track between a retracted position and an extended position, wherein the first retainer and the second retainer are configured to engage the first screen receiver when the first screen receiver is moved to the extended position and thereby prevent the first screen receiver from coming out of the channel;

wherein the set of compressible members are configured to reduce noise caused by engagement between the first screen receiver and the first retainer and the second retainer;

further comprising an end wall extending between the first side wall and second side wall;

wherein the first retainer has a channel facing in a direction toward the end wall;

wherein the second retainer has a channel facing in a direction toward the end wall;

wherein a first compressible member of the set has a connection feature configured to be held within the channel of the first retainer to connect the first compressible member with the first retainer;

wherein a second compressible member of the set has a connection feature configured to be held within the channel of the second retainer to connect the second compressible member with the second retainer.

9. The system of claim 1, wherein the first retainer and the second retainer extend the length of the first track.

10. The system of claim 1, further comprising a first bracket;

the first bracket having a bracket channel;

wherein the bracket channel of the first bracket is configured to receive the first track therein with close and tight tolerances so as to provide additional structural support to the first track.

11. The system of claim 1, further comprising:

a second track;

a second screen receiver positioned within the second track;

wherein the second screen receiver is configured to operably connect with and hold the second side edge of the screen while permitting the screen to be raised and lowered;

a third retainer connected to a first side wall of the second track;

a fourth retainer connected to a second side wall of the second track;

wherein the third retainer and the fourth retainer prevent the second screen receiver from coming out of the second track.

12. The system of claim 1 further comprising:

the-sercon-weigh er ede a set of compressible members connected to the first retainer and the second retainer;

wherein when the first retainer and the second retainer are connected to the first track, the set of compressible members are configured to reduce noise caused by engagement between the first screen receiver and the first retainer and the second retainer.

13. The system of claim 12, wherein the set of compressible members are woolpile.

14. The system of claim 12, wherein the set of compressible members are brushes.

15. The system of claim 12, wherein the set of compressible members are foam rubber.

16. The system of claim 12, wherein the set of compressible members are non- metallic.

17. The system of claim 12, wherein the set of compressible members are plastic.

18. The system of claim 1, further comprising: a set of extension members configured to be connectable with and removable from the first retainer and the second retainer; wherein when the set of extension members are connected to the first retainer and the second retainer, the set of extension members are configured to hold the first screen receiver in the retracted position by engaging the first screen receiver.

19. The system of claim 1, further comprising a lever tool configured to apply the force to the first retainer to cause the first retainer to become connected to the first side wall.

20. The system of claim 1, further comprising a lever tool configured to apply the force to the first retainer to cause the first retainer to become connected to the first side wall; wherein the lever tool has an elongated shaped body extending from a first end to a second end;

wherein the lever tool includes a first arm and a second arm extending outward from a side of the body proximate to the second end;

wherein the first arm and the second arm are separated from one another by a distance such that the lever tool can be moved to a position in which the first side wall and first retainer are positioned between the first arm and the second arm;

wherein when the first side wall and first retainer are positioned between the first arm and the second arm, movement of the first end of the lever tool causes the first arm or the second arm to apply the force to the first retainer to cause the first retainer to become connected to the first side wall.

21. The system of claim 1, further comprising, a set of extension members configured to connect with the first retainer and the second retainer;

wherein when the set of extension members are connected to the first retainer and the second retainer, the set of extension members are configured to hold the first screen receiver in the retracted position by engaging the first screen receiver.

22. A method for installing a screen system having a magnetic track assembly for an opening of a structure; comprising:

attaching a screen assembly to the structure along an upper edge of the opening; the screen assembly having a screen and a roller tube;

the screen extending a height between an upper edge and a lower edge;

the screen extending a length between a first side edge and a second side edge;

the roller tube extending a length from a first end to a second end;

the screen connected to the roller tube such that when the roller tube rotates in a first direction the screen is raised and when the roller tube rotates in a second direction, opposite the first direction, the screen is lowered;

attaching a first track to the structure along a first side of the opening;

the first track including a first side wall, a second side wall, and an end wall extending between the first side wall and second side wall;

the first side wall having a first inward facing surface;

the second side wall having a second inward facing surface;

wherein the first side wall includes a first connection feature positioned on the first inward facing surface an interior side of the first side wall;

wherein the second side wall includes a second connection feature positioned on the second inward facing surface an interior side of the second side wall;

positioning a first screen receiver within the first track between the first side wall and the second side wall;

wherein the first screen receiver is configured to operably connect with and hold the first side edge of the screen while permitting the screen to be raised and lowered;

connecting a first retainer to the first side wall of the first track by positioning the first retainer in contact with the first connection features feature and applying force to the first retainer in a direction away from the second side wall and toward the first side wall;

connecting a second retainer to the second side wall of the first track by positioning the second retainer in contact with the second connection features feature and applying force to the second retainer in a direction away from the first side wall and toward the second side wall;

wherein the first retainer and the second retainer prevent the first screen receiver from coming out of the first track;

wherein a first magnetic component is operably connected to the first track;

wherein a second magnetic component is operably connected to the first screen receiver; and wherein a magnetic bond is formed between the first magnetic component and the second magnetic component pulls the first screen receiver into the first track, thereby applying tension to the screen.

23. The method of claim 22, wherein the attaching of the first track to the structure along the first side of the opening attaches the first track to the structure with the first side wall or the second side wall in contact with the structure.

24. The method of claim 22, wherein the attaching of the first track to the structure along the first side of the opening attaches the first track to the structure with the end wall in contact with the structure.

25. The method of claim 22, wherein when the first retainer and the second retainer are connected to the first track, the first screen receiver is movable within a channel of the first track between a retracted position and an extended position, wherein the first retainer and the second retainer prevent the first screen receiver from coming out of the channel.

26. The method of claim 22, wherein the first track has a channel having an open side facing toward the screen;

wherein when the first retainer and the second retainer are disconnected to the first track, the first screen receiver is removable from the first track through the open side of the channel of the first track.

27. The method of claim 22, wherein the first track has a channel having an open side facing toward the screen;

wherein the first connection feature is positioned on the first side wall proximate to the open side of the channel and is configured to facilitate connection of the first retainer with the first side wall;

wherein the second connection feature is positioned on the second side wall proximate to the open side of the channel and is configured to facilitate connection of the second retainer with the second side wall.

28. The method of claim 22, wherein the first track has a channel having an open side facing toward the screen;

wherein when the first retainer and the second retainer are disconnected to the first track, the first screen receiver is removable from the first track through the open side of the channel of the first track by turning the screen receiver at an angle relative to the channel and moving the screen receiver out of the channel through the open side.

29. The method of claim 22, further comprising inserting a first interlock connected to the first side of the screen into a channel of the first screen receiver;

wherein the channel of the first screen receiver is configured to receive and hold the first interlock;

wherein the first interlock is movable within the channel of the first screen receiver thereby permitting the screen to be raised and lowered.

30. The method of claim 22, further comprising inserting a first interlock connected to the first side of the screen into a channel of the first screen receiver;

wherein the channel of the first screen receiver is configured to receive and hold the first interlock;

wherein the first interlock is movable within the channel of the first screen receiver thereby permitting the screen to be raised and lowered;

wherein a first funnel is positioned proximate to an upper end of the first screen receiver to facilitate the inserting of the first interlock into the channel.

31. The method of claim 22, wherein a set of compressible members are connected to the first retainer and the second retainer;

wherein when the first retainer and the second retainer are connected to the first track, the first screen receiver is movable within a channel of the first track between a retracted position and an extended position, wherein the first retainer and the second retainer are configured to engage the first screen receiver when the first screen receiver is moved to the extended position and thereby prevent the first screen receiver from coming out of the channel;

wherein the set of compressible members are configured to reduce noise caused by engagement between the first screen receiver and the first retainer and the second retainer.

32. The method of claim 22, wherein the first retainer and the second retainer extend the length of the first track.

* * * * *